US012307838B2

United States Patent
Sobol et al.

(10) Patent No.: US 12,307,838 B2
(45) Date of Patent: May 20, 2025

(54) METHOD AND SYSTEM FOR CONNECTIVITY AND CONTROL OF A HAZARD-PRONE ENVIRONMENT USING A LOW POWER WIDE AREA NETWORK

(71) Applicant: CareBand Inc., Chicago, IL (US)

(72) Inventors: Adam G. Sobol, Dayton, OH (US); Paul Sheldon, Arlington Heights, IL (US); Harish Natarahjan, Hoffman Estates, IL (US); Joseph T. Kreidler, Arlington Heights, IL (US); Brian A. Donlin, Chicago, IL (US); Jon G. Ledwith, Palatine, IL (US); Patrick J. McVey, Wheeling, IL (US); Ross D. Moore, Winnetka, IL (US); Peter Nanni, Algonquin, IL (US); Dwayne D. Forsyth, Deer Park, IL (US); Todd Sobol, Dayton, OH (US); John D. Reed, Dayton, OH (US); Reid B. Erekson, Arlington Heights, IL (US); Sam H. Viesca, Lafayette, CO (US); Steven L. Russek, Glendale, WI (US)

(73) Assignee: CareBand Inc., Chicago, IL (US)

(*) Notice: Subject to any disclaimer, the term of this patent is extended or adjusted under 35 U.S.C. 154(b) by 397 days.

(21) Appl. No.: 17/974,759

(22) Filed: Oct. 27, 2022

(65) Prior Publication Data

US 2023/0084106 A1 Mar. 16, 2023

Related U.S. Application Data

(63) Continuation-in-part of application No. 17/236,358, filed on Apr. 21, 2021, now Pat. No. 11,503,434.

(Continued)

(51) Int. Cl.
*H04W 4/80* (2018.01)
*G07C 9/00* (2020.01)
(Continued)

(52) U.S. Cl.
CPC .......... *G07C 9/00182* (2013.01); *G07C 9/29* (2020.01); *H04W 4/021* (2013.01); *H04W 4/80* (2018.02)

(58) Field of Classification Search
CPC ....... G07C 9/00182; G07C 9/29; H04W 4/80; H04W 4/021
(Continued)

(56) References Cited

U.S. PATENT DOCUMENTS 8,903,416 B1 * 12/2014 Perkins .................. H04L 67/12
340/572.1
9,652,955 B1 * 5/2017 Ray ........................ H04W 4/023
(Continued)

FOREIGN PATENT DOCUMENTS

WO 2021025873 A 2/2021

*Primary Examiner* — April G Gonzales
(74) *Attorney, Agent, or Firm* — John D. Reed

(57) ABSTRACT

A personal area network that includes a wearable electronic device, a system and methods of using the personal area network that includes a wearable electronic device. The wearable electronic device can act as an aggregator of the data that is being acquired by the one or more sensors and from other devices that are within wireless signal range of the personal area network in order to send some or all of the data over a wireless low power wide area network to remote locations within a larger network for subsequent processing, user notification, analysis of location-determination, contact tracing or the like. Data may flow in a bidirectional manner between the wearable electronic device and at least some of the other devices within the personal area network. In one form, the aggregated data may be used to control access to (Continued)

a hazard-prone environment in order to reduce the likelihood of exposure of a service technician to unsafe conditions within such environment. In one form, a communication network formed by the wearable electronic device is used with the hazard-prone environment in order to control access, while in another to control a lockout/tagout procedure.

19 Claims, 27 Drawing Sheets

Related U.S. Application Data

(60) Provisional application No. 63/101,273, filed on Apr. 22, 2020.

(51) Int. Cl.
*G07C 9/29* (2020.01)
*H04W 4/021* (2018.01)

(58) Field of Classification Search
USPC .......................................................... 455/41.2
See application file for complete search history.

(56) References Cited

U.S. PATENT DOCUMENTS

| | | | | |
|---|---|---|---|---|
| 9,722,803 B1* | 8/2017 | Ellingson | .................. | H04L 9/30 |
| 9,928,359 B1* | 3/2018 | Vargas | .................. | G06F 21/78 |
| 10,244,392 B2 | 3/2019 | Caracas et al. | | |
| 10,335,060 B1* | 7/2019 | Kahn | .................. | A61B 5/7246 |
| 10,341,343 B2 | 7/2019 | Bauer et al. | | |
| 10,532,266 B2* | 1/2020 | Genova | .................. | H04W 4/21 |
| 11,070,467 B1 | 7/2021 | Shukla | | |
| 11,147,459 B2* | 10/2021 | Sobol | .................. | H04W 4/80 |
| 11,162,983 B2 | 11/2021 | Bolouri-Saransar | | |
| 11,215,646 B2 | 1/2022 | Balid et al. | | |
| 2007/0287923 A1* | 12/2007 | Adkins | .................. | A61B 5/02438 |
| | | | | 600/485 |
| 2011/0234397 A1* | 9/2011 | Fetzer | .................. | G08B 25/016 |
| | | | | 340/539.13 |
| 2011/0245633 A1* | 10/2011 | Goldberg | .................. | A61B 5/165 |
| | | | | 600/323 |
| 2015/0048814 A1 | 2/2015 | Bugaris | | |
| 2015/0143125 A1* | 5/2015 | Nix | .................. | H04L 9/0861 |
| | | | | 713/171 |
| 2015/0244699 A1* | 8/2015 | Hessler | .................. | H04W 12/062 |
| | | | | 726/7 |
| 2015/0334554 A1 | 11/2015 | Song et al. | | |
| 2015/0350857 A1* | 12/2015 | Lim | .................. | H04W 4/80 |
| | | | | 455/41.2 |
| 2016/0018278 A1* | 1/2016 | Jeter, II | .................. | G16H 40/63 |
| | | | | 340/665 |
| 2016/0139273 A1* | 5/2016 | Sobol | .................. | A61B 5/1112 |
| | | | | 342/357.52 |
| 2016/0142868 A1* | 5/2016 | Kulkarni | .................. | H04W 4/80 |
| | | | | 455/456.5 |
| 2016/0173359 A1* | 6/2016 | Brenner | .................. | A61B 5/02438 |
| | | | | 709/224 |
| 2016/0174022 A1 | 6/2016 | Nhu | | |
| 2016/0270126 A1* | 9/2016 | Adams | .................. | H04W 76/50 |
| 2016/0294828 A1* | 10/2016 | Zakaria | .................. | H04L 63/0876 |
| 2016/0313386 A1 | 10/2016 | Bugaris et al. | | |
| 2016/0314255 A1* | 10/2016 | Cook | .................. | G06F 16/906 |
| 2017/0006003 A1 | 1/2017 | Zakaria et al. | | |
| 2017/0006595 A1* | 1/2017 | Zakaria | .................. | H04L 67/025 |
| 2017/0006606 A1 | 1/2017 | Matsuo et al. | | |
| 2017/0013569 A1* | 1/2017 | Braxton | .................. | G08B 21/0263 |
| 2017/0017822 A1* | 1/2017 | Zimmerman | .................. | G06K 7/1452 |
| 2017/0053267 A1* | 2/2017 | Abel | .................. | G06Q 20/4014 |
| 2017/0109656 A1* | 4/2017 | Cook | .................. | G06N 5/02 |
| 2017/0134171 A1* | 5/2017 | Woxland | .................. | H04W 12/086 |
| 2017/0163685 A1* | 6/2017 | Schwartz | .................. | H04W 12/088 |
| 2017/0173262 A1* | 6/2017 | Veltz | .................. | G16H 20/17 |
| 2017/0193787 A1* | 7/2017 | Devdas | .................. | G08B 25/005 |
| 2017/0202484 A1* | 7/2017 | Al-Shaery | .................. | A61B 5/08 |
| 2017/0208426 A1* | 7/2017 | Komoni | .................. | H04W 4/80 |
| 2017/0237719 A1* | 8/2017 | Schwartz | .................. | G06F 21/602 |
| | | | | 713/153 |
| 2017/0272842 A1 | 9/2017 | Touma et al. | | |
| 2018/0001184 A1* | 1/2018 | Tran | .................. | G16H 50/20 |
| 2018/0014150 A1 | 1/2018 | Elias | | |
| 2018/0042513 A1* | 2/2018 | Connor | .................. | A61B 5/369 |
| 2018/0085058 A1* | 3/2018 | Chakravarthi | .................. | G16H 40/67 |
| 2018/0160907 A1* | 6/2018 | Verma | .................. | G06Q 50/22 |
| 2018/0168464 A1* | 6/2018 | Barnett, Jr. | .................. | A61B 5/6861 |
| 2018/0247713 A1* | 8/2018 | Rothman | .................. | A61B 5/02055 |
| 2018/0330293 A1* | 11/2018 | Kulkarni | .................. | G06K 7/10366 |
| 2018/0332434 A1* | 11/2018 | Kulkarni | .................. | H04W 4/80 |
| 2018/0375849 A1* | 12/2018 | Koskimies | .................. | H04L 9/3234 |
| 2019/0312752 A1 | 1/2019 | Nogueira-Nine et al. | | |
| 2019/0057189 A1* | 2/2019 | Frederickson | .................. | G08B 21/043 |
| 2019/0147721 A1* | 5/2019 | Avitan | .................. | G06F 1/3209 |
| | | | | 340/573.1 |
| 2019/0150134 A1* | 5/2019 | Kakinada | .................. | H04W 16/14 |
| | | | | 370/330 |
| 2019/0197864 A1 | 7/2019 | Hui et al. | | |
| 2019/0208363 A1 | 7/2019 | Shapiro | | |
| 2019/0349426 A1 | 11/2019 | Smith et al. | | |
| 2020/0178906 A1* | 6/2020 | Bevan | .................. | A61B 5/02055 |
| 2020/0268261 A1* | 8/2020 | Ikegami | .................. | H04W 4/70 |
| 2022/0080235 A1* | 3/2022 | Sobol | .................. | E04B 1/68 |
| 2022/0120790 A1 | 4/2022 | Balid et al. | | |
| 2025/0009237 A1* | 1/2025 | Russek-Sobol | .................. | H04W 4/38 |

\* cited by examiner

CONTACT REPORT
CASE: ANN
COVID-19 STATUS: CONFIRMED
DATE OF THE SYMPTOM ONSET: JUNE 5
EXPECTED INFECTIOUS PERIOD: JUNE 3 – ONGOING

| CONTACT | CONTACT DATE(S) | CONTACT TYPE | AVG DAILY CONTACTS | AGE RANGE | OTHER RISK FACTORS |
|---|---|---|---|---|---|
| CHARLY | JUNE 5, JUNE 3 | CLOSE PROXIMATE | 3 | 65-74 | NO |
| BETTY | JUNE 5 | DIRECT | 4 | 75-84 | YES |
| ALFRED | JUNE 4 | PROXIMATE | 3 | 75-84 | NO |
| ROSA | JUNE 4, JUNE 3 | CLOSE | 11 | <65 | NO |

FIG. 8

METHOD AND SYSTEM FOR CONNECTIVITY AND CONTROL OF A HAZARD-PRONE ENVIRONMENT USING A LOW POWER WIDE AREA NETWORK

CROSS REFERENCE TO RELATED APPLICATIONS

This application claims priority to and is a continuation-in-part of pending U.S. patent application Ser. No. 17/236,358 that was filed on Apr. 21, 2021 that in turn claims priority to U.S. Provisional Application Ser. No. 63/101,273 that was filed on Apr. 22, 2020.

The present disclosure relates generally to a wearable electronic device and corresponding personal area network (PAN) for monitoring data pertaining to and received by a wearer of the device, and more particularly to a PAN where the wearable electronic device automatically and wirelessly communicates such data to a larger network through low power wide area network (LPWAN) connectivity to provide location-based safety and health solutions.

BACKGROUND

The relatively recent emergence of the Internet of Things (IoT) has made it possible for sensor-based devices to collect unprecedented amounts of data. Unfortunately, traditional telecommunication architectures such as a cellular one using a smartphone—sometimes in conjunction with a shorter-range network and protocols such as a local area network (LAN) that may include Bluetooth (including its low-energy (BLE) variant), radar-based or WiFi or related networks based on ANT™, Infrared Data Association (IrDA), radio-frequency identification (RFID), Zigbee, Z-Wave or the like—are not capable of acting as an intermediary for promptly and efficiently offloading the generated data to a remote location where the information contained within the data may be put to use. For example, data collected from endpoint IoT devices often requires long-range transmission capability while also being power-limited. While some of the aforementioned protocols may meet a limited number of power requirements, they are incapable of long-range (that is to say, a kilometer or more) signal transmission. Similarly, cellular-based protocols may satisfy long-range requirements, but their high power consumption make them prohibitive for devices that need long battery life. As such, without a significant redesign and rebuild of the hardware, issues such as cost, security, battery power, bandwidth utilization or the like may hamper the ability of IoT-compatible devices to connect to an end user of the collected data through these limiting intermediaries on their way to an internet protocol (IP)-based network. Moreover, in cases where these devices are being used in medical or related health-care situations, they may have already been subjected to rigorous FDA medical device approval and clearance in their current embodiments. At least in these situations, it may be difficult, expensive and time-consuming to repurpose the devices to be able to serve populations of people using them, particularly for such people who may have neither ready access nor inclination to connect via LAN, cellular or other traditional telecommunication architectures.

A PAN allows communication between a larger network (such as the internet) and one or more end user devices. The PAN needs a way to get the data that is coming from these devices to the larger network and that may use or otherwise manage the data, including storage, cleansing, training and inference for analysis and related end-use. Traditionally, such connection necessitates additional infrastructure within the PAN in the form of high-bandwidth, comprehensive communication protocols. These protocols typically leverage licensed parts of the spectrum through an extensive array of wired or hybrid networks, including those associated with a public switched telephone network (PSTN) or mobile wireless network such as those that operate under the $3^{rd}$ Generation Partnership Project (3GPP) and their related standards such as Long-Term Evolution (LTE) or the Global System for Mobile Communications (GSM). The corresponding additional cost and complexity associated with such infrastructure is in many cases prohibitively expensive and inconvenient for the user of the PAN.

Contact tracing is the process of identifying individuals who may have been exposed to a contagious disease or related communicable agent, typically through another infected individual, animal or other source. A non-exhaustive list of such diseases includes tuberculosis, as well as vaccine-preventable infections such as measles, sexually transmitted infections, blood-born infections, some serious bacterial infections, viruses and novel infections such as the coronavirus that produces COVID-19, SARS-COV or the like. With contact tracing, once a person has been identified as having a confirmed case of a communicable disease, proximity information (which may be thought of as a subset of location information) may be gathered on other individuals who may have had sufficient interaction with the confirmed person so that these other individuals may in turn be monitored for signs or symptoms associated with infection of the disease Known approaches of determining the location of persons under a contact tracing analysis involve the use of conventional cellular-based devices and communication protocols similar to the aforementioned IoT and PAN scenarios. The challenges or limitations with such devices and approaches may include: the inability to get fine (that is to say, granular) indoor location information; the use of an active rather than passive process for the application software which in turn necessitates that it is always operational rather than merely residing in the background; and the consumption of significant amounts of battery power and the need for universally unique identifiers (UUIDs) in order for the receiving device to know which other broadcasting device to listen for, particularly if the other device does not intend on advertising to the public.

SUMMARY

With the foregoing in mind, the authors of the present disclosure have developed a PAN that may be used to collect data from nearby sensors or other devices and then wirelessly send the data to a larger network without having to rely upon cellular infrastructure as an intermediary telecommunication platform. Understanding that a sensor-enabled PAN needs a way to get the data that their sensors have collected to a remote location for subsequent management, storage or use of such data, the authors of the present disclosure discovered a simple low-cost communication network that allows wireless connectivity and data transfer between the PAN and the remote location using LPWAN as the intermediary.

The authors of the present disclosure have further developed the PAN to be a particularly efficacious way to perform real-time disease identification and propagation monitoring. By tracking the location of infected persons using the wearable electronic device PAN and LPWAN disclosed herein, significant reductions in disease spread may be achieved through one or more of interrupting ongoing transmission of the disease, alerting contacts to the possibility of infection, offering preventative counseling or prophylactic care, assisting in diagnosis, counseling and treatment to already-infected individuals to help prevent their reinfection, as well to learn about the epidemiology of a disease in a particular population. As such, in situations where time is of the essence, the devices, systems and methods disclosed herein for identifying contacts allow decision-makers to ensure that infected persons do not interact with others in order to reduce or eliminate further spread. In this way, a disease outbreak and spread may be traced quickly as a way to assist public health officials with more adequately addressing the spread of an infection, even in regions or areas that do not have significant existing communication infrastructure.

The PAN disclosed herein uses the wearable electronic device to act as a coordinator, reconfigurator or aggregator for various devices within a larger system in order to form an end-to-end approach to track and trace contacts, document outbreaks and manage cases, as well as to inform employers, visitors and staff (such as those associated with hospitals, senior living facilities or related businesses that provide health care and related services) for of a potential exposure. In another context, the PAN may be employed for other forms of socialization and measuring that operate in a manner analogous to contact tracing, such as for people-to-people, as well as for workplace scenarios such as people-to-staff or people-to-boss. Details associated with a comprehensive embodiment of such wearable electronic device and its associated LPWAN may be found in US Published Application 2019/0209022 entitled WEARABLE ELECTRONIC DEVICE AND SYSTEM FOR TRACKING LOCATION AND IDENTIFYING CHANGES IN SALIENT INDICATORS OF PATIENT HEALTH that corresponds to pending U.S. patent application Ser. No. 16/233,462 that was filed on Dec. 27, 2018, is owned by the Assignee of the present disclosure and the entirety of which is incorporated herein by reference. In one form, the PAN and methods disclosed herein include some or all of the components and associated functionality associated with the wearable electronic device that is disclosed in US Published Application 2019/0209022.

In one form, the LPWAN is based on a LoRa chipset with its chirp spread-spectrum radio-frequency (RF) signal generation such that the devices and systems disclosed herein may utilize compatible stack protocols such as LoRaWAN (which is IEEE 802.15.4g-compliant) as a way to establish a PAN-to-IP network communication channel. More particularly, when viewed within the context of an IP suite conceptual model in general and the transmission control protocol (TCP) and the IP in particular, the LoRa chipset defines the physical layer (PHY) while LoRaWAN defines the Media Access Control (MAC) layer (as well as the network layer and other layers) to define the basic architecture for a full-stack protocol for use as the intermediary between the wearable electronic device and the end-use IP-based network. In this way, the PAN can leverage inexpensive sensors, beacons and associated components that are situated in nearby data-acquisition devices that are within the communication range of the PAN in order to aggregate the information contained within these other devices, yet take advantage of only requiring the single master (that is to say, source node) device to perform the downstream communication functions. In one form, nearby sensors that are on other devices that are within communication range of the PAN, as well as on-body sensors of the wearer, could send data to the master device for subsequent conveyance via LPWAN to the larger network. In this way, the PAN as disclosed herein may be used in conjunction with an individual or group of individuals to communicate and exchange data that in turn may be analyzed for determination of one or more characteristics of the person or people associated with the wearable device or devices.

By using a LoRa-based approach to communicating acquired data between the PAN and a wirelessly remote end-use application as disclosed herein, the authors of the present disclosure have found that certain expenses and infrastructural complexities associated with conventional high-bandwidth cellular-based approaches, including those that may use one or more of the LTE, GSM, code division multiple access (CDMA), time division multiple access (TDMA), Universal Mobile Telecommunications System (UMTS), General Packet Radio Service (GPRS), Voice over IP (VoIP) or the like, may be reduced or eliminated.

According to a first aspect of the present disclosure, a PAN that uses a wearable electronic device as a source node is disclosed. The wearable electronic device includes a wireless communication module configured to receive at least one incoming signal from a remote device, a non-transitory computer readable medium, a processor electrically coupled to the non-transitory computer readable medium and a set of machine codes stored in the non-transitory computer-readable medium and operated upon by the processor. The set of machine codes includes a machine code to cause the wireless communication module to receive from a mobile beacon of a one or more peripheral nodes that are within range of the PAN at least device identifier information that uniquely identifies the mobile beacon and associated peripheral node, and event data associated with the peripheral node. The set of machine codes also includes a machine code to cause the wireless communication module to transmit the received event data using an LPWAN protocol. In one form, the PAN is used for one or more of testing, contact tracing, proximity monitoring and geofencing.

According to a second aspect of the present disclosure, a wearable electronic device is disclosed. In one form, the wearable electronic device is used for one or more of testing, contact tracing, proximity monitoring and geofencing.

According to a third aspect of the present disclosure, a non-transitory computer readable medium that has executable machine code that upon execution on a machine causes the machine to operate a PAN. In one form, the resulting PAN is used for one or more of testing, contact tracing, proximity monitoring and geofencing.

According to a fourth aspect of the present disclosure, a method of monitoring an individual with a wearable electronic device is disclosed. In one form, the method is used for one or more of testing, contact tracing, proximity monitoring and geofencing.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 8 depicts a contact report shown by a notional display and that is used with the PAN disclosed;

Figure 1:
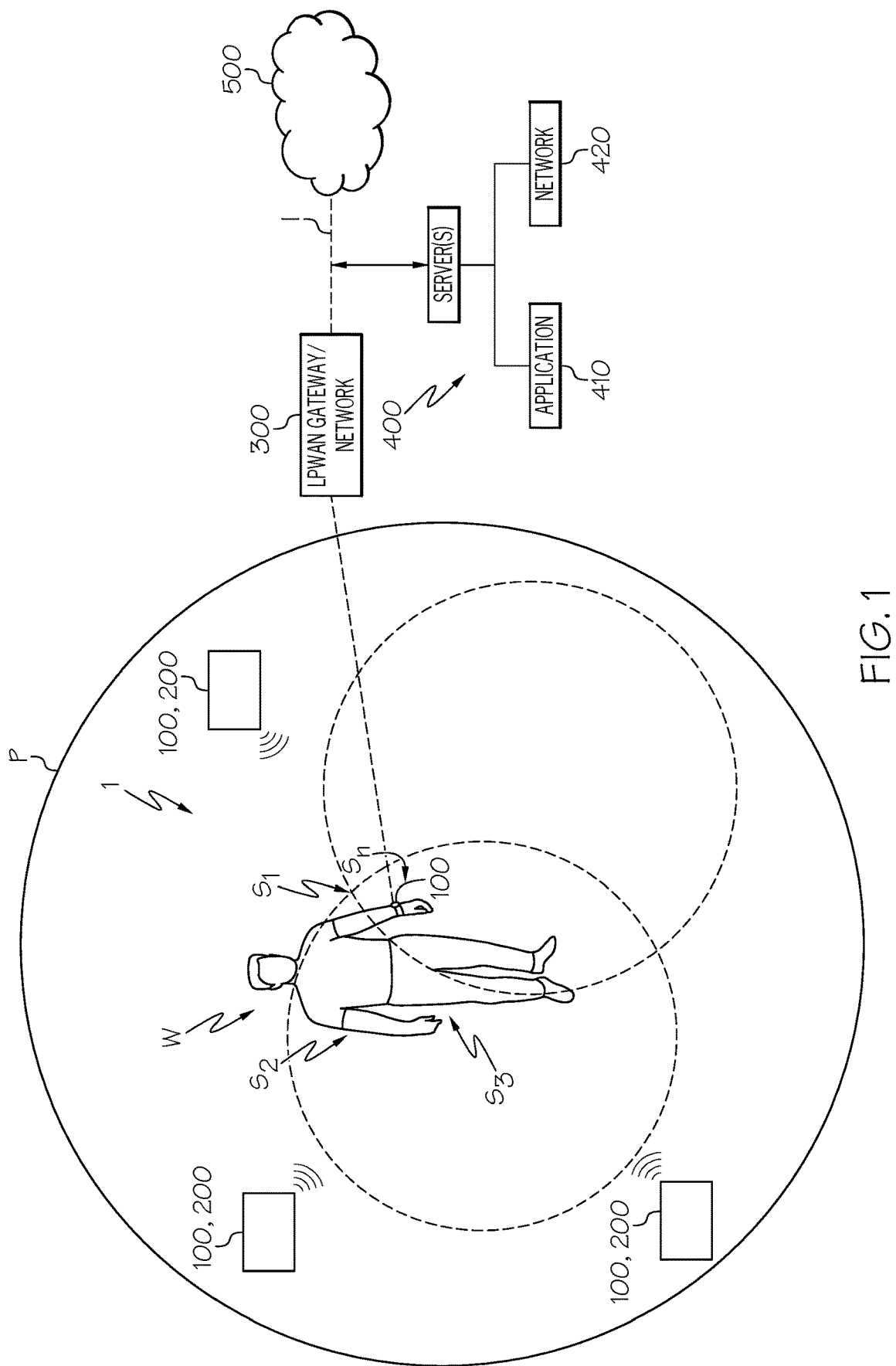
FIG. 1 depicts a simplified view of wireless signal connectivity between a wearable electronic device that forms a PAN and the internet through an LPWAN gateway or network, as well as how the PAN may be used to form a geofence, all according to one or more embodiments shown or described herein.

It will be appreciated that for the sake of clarity, elements depicted in the drawings are not necessarily to scale, and that certain elements may be omitted from some of the drawings. It will further be appreciated that certain reference numerals may be repeated in different figures to indicate corresponding or analogous elements.

DETAILED DESCRIPTION

Figure 2:
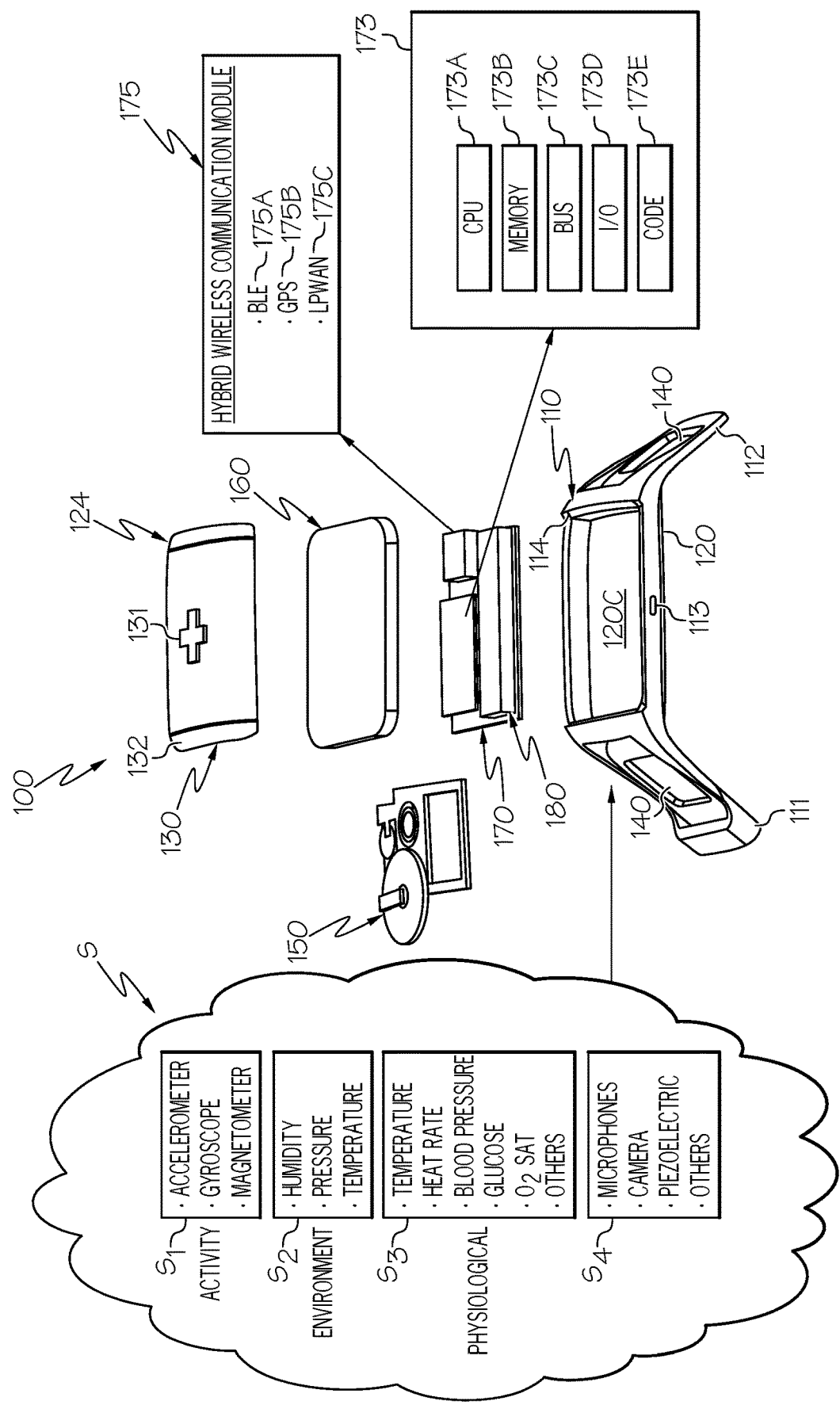
FIG. 2 depicts an exploded upper perspective view of the wearable electronic device of FIG. 1, as well as a block diagrammatic representation of its logic device, various sensors and hybrid wireless communication module.

The disclosed devices, systems and methods allow for real-time tracking through a PAN to provide data-informed insights of people and activities that are within communication range of the PAN. While much of the present disclosure emphasizes the wearable electronic device, PAN and peripheral components and systems for use in providing information pertaining to the potential or actual spread of a virus or related disease that if left unchecked could to cause an epidemic, pandemic or the like, it will be appreciated that such devices, components and systems may be used for other applications as well, such as for acquiring other forms of location, environmental, activity, physiological (LEAP) or other data associated with the individual to whom the wearable electronic device is attached. For example, accelerometer data may be grouped as activity data, while heart rates, blood oxygenation, cardiac, temperature, incontinence (such as through diaper moisture sensing) may be grouped as physiological data, temperature, humidity and barometric pressure may be grouped as environmental data; all of these are directly-measurable forms of data. It will be appreciated that other types of data may be derived, such as through analysis or computation, including that arising out of conducting machine learning analyses such as those discussed herein; one example of such derived data may include activities of daily living (ADL) data that in one form is correlated to accelerometer data through machine learning. Likewise, some data may have both direct and derived attributes, such as location data that may be both relative and absolute via radio signal strength indication (RSSI) variables derived therefrom. It will be appreciated that these and other forms of data (such as depicted in FIG. 2) may be subjected to additional analysis in order to perform one or more of the contact tracing, proximity monitoring, geofencing or related activities disclosed herein. The PAN disclosed herein refers to the interconnection of peripheral information technology devices, sensors, beacons or the like (individually or collectively referred to as peripheral nodes) that are within the environment of an individual user that is associated with the wearable electronic device (also referred to as a source node). In one non-limiting form, such peripheral nodes are within about ten meters of the source node.

The prevention of communicable disease spread may be enhanced through a combination of functions that are within the capability of the PAN. Such functions include—among others—testing, contact tracing, proximity monitoring and geofencing. While clinical-based testing of an individual is beyond the scope of the present disclosure, the authors herein have additionally determined that the acquisition of various types of sensed data by the wearable electronic device—in conjunction with on-device real-time analysis based on such data—can accurately predict whether the individual being monitored by such device has a high likelihood of contracting the communicable disease. This in turn can lead to the device, PAN and system to perform additional activities relating to one or more of location tracking, contact tracing, proximity monitoring and hotspot detection, as well as corresponding informing functions of such likelihood through dashboards, reports, messages or the like that can be conveyed to caregiver, employees, family, friends, public health policy organizations or the like on a mobile device, computer screen or the like. In one form, the inclusion of one or more beacons (such as in a hospital, retirement community, assisted living community or related healthcare facility) may be used to promote additional location tracking; this latter form is particularly useful for hotspot detection, that is, to know within a building where the sites are where the most contact between people has been occurring. Once these hotpots (such as bathrooms, or break rooms, random hallways or the like) and their corresponding levels of increased risk are identified, the resulting information can be of use for planning, risk avoidance or related measures.

In one form, the contact tracing may include logging interaction details of the individual being monitored, including details associated with elapsed time, distance, device identifiers or the like. In this way, and using validated exposure notification protocols, suitable interaction recording and associated notifications may be made by one or more of the devices, PAN and system. In one form, geofencing or related zone monitoring may include sending or receiving notifications when the individual being monitored enters or exits a designated, geofenced area. In one form, proximity monitoring may include sending or receiving device alerts (such as through audible, visual or haptic means) when the wearable electronic device is within a preset distance (for example, six feet, per current Centers for Disease Control (CDC) guidelines) of another such device. In one form, when two wearable electronic devices such as those disclosed herein experience an interaction where they come within such preset distance, the devices are configured to exchange data (such as through anonymized tokens or the like), where such data may include the duration of the interaction and the date and time of the interaction. This information is then sent to a remote location (such as a secure cloud-based location) where it can be retrieved in the event that a disease outbreak has been detected. As mentioned elsewhere, device and system-based operations associated with these activities are in one form automated.

In one form, the proximity monitoring may include the detection of other devices in order to ensure that minimum distances are being maintained, as well as providing visual, haptic, audio or related alerts, warnings or the like when such minimums have been breached to serve as a reminder to adhere to social distancing guidelines. In one form, machine learning (including on-device machine learning) may be used to help with such proximity monitoring. As previously mentioned, information gleaned from proximity monitoring may be thought of as a subset of location information; however, it does not necessarily mean that proximity monitoring is the same as location tracking. For example, in situations where increased security or user privacy may be important to the users of other devices within the PAN, if the beacons or other sources of RF signals being transmitted from such other devices do not include GNSS, their own static geofences or other sources of absolute (or quasi-absolute) frame of reference locationing, then the proximity information acquired by the central device within the PAN becomes more anonymized, due at least in part to its ever-changing (that is to say, dynamic) nature.

In one form, hotspot detection may include having the wearable electronic device cooperate with adjacent (that is to say, those within wireless signal communication range) beacons to gain a more accurate representation of indoor location and interpersonal interaction. In one form, the identity of the people making such interactions may be anonymized, while still allowing a system administrator (such as those associated with a nursing home, assisted living community, group home or the like) the ability to monitor the interactions and adjust protocols accordingly.

In one form, a dashboard or other display-based approach may be used to provide various organization management functions. For example, when the organization is a place of employment, place of public accommodation, healthcare facility or other entity where groups of people can be expected to congregate, the dashboard may be made to provide notification functions, as well as the results of analytic-based assessments (such as those from one or more machine learning algorithms as is discussed in more detail herein), as a way to view organization-wide risks, create and track infection cases, send automatic messages (such as short message system (SMS), push or voice notifications), as well as—in the case of a healthcare facility—to manage staff, residents and visitors. In configurations where machine learning is being used to analyze data collected by the wearable electronic device and its associated PAN, one form involves using the machine learning model to evaluate a health condition of an individual being monitored. In a more particular form, such evaluation is taking place at the edge (that is to say, on the device). Likewise, regardless of whether such machine learning takes place at the edge (that is to say, on the wearable electronic device) or in a remote computer, server or other platform or system, the analysis or inference produced therefrom may be made analyzing the health condition of an individual being monitored, perform contact tracing on infected persons, perform proximity monitoring or other related functions. In another form, other uses beside health condition evaluation may be performed by the device, PAN and system disclosed herein. For example, sensing and associated analysis, reporting or the like may be used to help evaluate an environmental issue around the person being monitored, such as in an industrial or related setting where high levels of a gas or dangerous chemical may be present. It is understood that all such uses and scenarios are within the scope of the present disclosure.

In one form, a notional display such as a mobile phone screen, tablet screen, computer screen or the like may be used to present notification, warnings or the like. For example, an API loaded onto the mobile phone of an employee of a healthcare facility may provide summary information, testing recommendations or the like in order to give employees access to risk levels based on sensed interactions. In addition, an analysis of historical or past interactions may be presented, as can a list of resource such as local healthcare providers, testing center locations and hours of operation. In addition, it allows the person to manage his or her bubble. Within the present disclosure, such a bubble may be a user interface or related component on an a mobile or website-based application programming interface (API) that allows the individual to see the number of interactions and risk level of a group of other people (such as friends, family, co-workers or the like) with which the individual may have frequent encounters. In one form, the bubble also can serve as a safegroup whereby the people in that bubble are known contacts and may categorized differently that other people (such as a random stranger) that is outside such group. One form of different categorization may include not counting the people in the group in the same way for contact tracing purposes, while another form may include assigning a different risk level or priority level to people in the group than outside the group owing to known behavior or interaction patterns. In a related way, this may allow the selective disabling of certain functions (such as social distancing alerts) of the device for people in the bubble when they are near each other.

Referring first to FIG. 1, a system 1 is shown in the form of a network-based or network-accessible computing platform configured to perform various data acquisition activities associated with the operation of a PAN P. In one form, system 1 may be referred to as a network-capable computing platform to perform software as a service (SaaS), cloud services, on-demand computing, platform computing, data center computing or the like. A wearable electronic device (also referred to herein as a source node) 100 is used as a central part of the PAN P and may be affixed to a wearer W so that data related to one or more of the wearer W location, environment, activity and physiological (LEAP) attributes may be collected by sensors $S_1, S_2, S_3 \ldots S_n$ or other devices (collectively referred to as peripheral nodes or end nodes) 200 in order to be wirelessly conveyed to the internet I through at least one LPWAN gateway 300 (also referred to herein as gateway 300, only one of which is shown) and then to the cloud 500. In one form, the internet I may include— among other things—various servers 400 that in turn may be made up of various network servers 410, application servers 420 or the like, all of which are understood by those skilled in the art as being useful in order to establish backhaul connectivity throughout the internet I. In one form, the network server 410 may perform various transmission functions, such as—among other things—acknowledgement of a transmission, selection of which of several gateways 300 is to be used for sending any necessary downlink transmissions to the wearable electronic device 100 or gateway 300, as well as for eliminating duplicate receptions. In one form, the network server 410 may receive uplink transmissions from multiple gateways 300, but might only send downlink transmissions to a single one of such gateways 300. Likewise, application server 420 may function as a computing nerve center for system 1 to run protocols and interfaces, such as web-based APIs or the like in order to perform LoRa-based message handling and archiving, end user identification, notification-sending rules, security and software or firmware upgrades, among other functions. Within the present context, the servers 400, internet I and cloud 500 may form the backhaul that, depending on the configuration, may be situated at one of numerous geographic locations, including a geographically remote location with respect to PAN P, and that all such variants are deemed to be within the scope of the present disclosure. In one form, server 400 may include built-in redundancy features. For example, communication between the wearable electronic device 100 and the gateway 300 may be configured such that up to six different LoRaWAN network credentials may be stored. This in turn permits hopping between credentials to take place seamlessly such that network 300 or server 400 isn't available (such as through a loss in connectivity), the data acquired through the PAN P and transmitted by the wearable electronic device 100 is still conveyed to its end use destination. Such functionality may also work in situations when a private network between the various components is being employed (such as for a nursing home, hospital, assisted living facility or the like) and there becomes a need to switch to a public network (such as that provided by internet service providers (ISPs) for example).

The use of LoRa-based chipsets, coupled with various protocols and system architectures such as those associated with a wireless telecommunication protocol such as LoRaWAN, allows long-range, low-power communication for low-to-medium bandwidth data requirements such as those being delivered from PAN P in general and the wearable electronic device 100 in particular to such backhaul while taking advantage of (in one form) a star network topology (more particularly, a star-of-stars protocol) such that the gateways 300 act as a transparent bridge between one or more wearable electronic devices 100 and the backhaul. Within the present disclosure, in a star-of-stars topology, the various wearable electronic devices 100 are wirelessly coupled to one or more of the gateways 300 via single-hop LoRa link, while the gateways 300 are connected (such as through the internet I, for example) to a common network server 400 (such as server 400). In fact, the star-based topology is consistent with the LoRaWAN protocol in that the protocol does not support direct communication between the wearable electronic devices 100. As mentioned elsewhere, such data acquisition—as well as related analysis and wireless transmission of such data—is performed automatically. Within the present disclosure, such automated operation may include having the wearable electronic device 100 join an LPWAN network (such as a Helium Hotspot or related peer-to-peer wireless network, for example) that encompasses one or more of the gateways 300, forwarding the data that was received by the gateway 300 to the internet-based servers 400 such that the network server 410 will forward the data to a backend (such as AWS IoT Core, for example) for one or more of recordation, processing, analysis or the like, and enable frontend APIs to retrieve the recorded, processed, analyzed data such that a localized report of contact tracing data may be presented to the individual associated with the wearable electronic device 100, family members, caregivers, public health and policy centers, government agencies or other interested people or institutions. In one form, the LPWAN network is configured to offer cryptographic proof of the transmission of various data (such as time and location) from the wearable electronic device 100 to the gateway 300; such proof may be in the form of permanent recordation on a distributed ledger such as Blockchain.

In one form, the LPWAN signal used to convey data collected by the wearable electronic device 100 is predominantly used in a one-way flow of such information in an uplink manner to the gateway 300, while in another form, two-way (that is to say, bidirectional) mode of communication that includes downlinks is possible. In this latter mode, information that is generated, processed or otherwise acquired from a remote location such as the backhaul server 400, cloud 500 or the like may be returned to the PAN P through the wearable electronic device 100 in its capacity as the master device within the PAN P. Also in this latter mode, and consistent with any of Classes A (ALOHA-style), B (with time-synchronized, scheduled receiving slots to promote additional downlink capacity and lower latency) or C (where downlink and associated wearable electronic device 100 ability to receive transmissions is on substantially all of the time) communication, some form of downlink may also be employed in order to establish security updates, data transmission (i.e., received packet) acknowledgement, other over-the-air (OTA) updates, activations or the like. Significantly, this provides the opportunity for the wearable electronic device 100 to change its class dynamically depending on the level of data being shared via the PAN P. For example, if more data is required in a particular downlink, the wearable electronic device 100 could switch to a Class C device for more frequent or more bidirectional modes of communication, after which it can then switch back to a Class A or Class B mode after either completion of the transmission, a set amount of time specified or by default. Furthermore, the use of downlink capability is such that a downlinked inquiry can be made of the wearable electronic device 100 to have it in turn inquire of the devices in the PAN P for data, as well as to give it instructions about what data is to be received at the backend. Considerations for choice of class may be based on various operational considerations such as power usage (which corresponds to battery life), duty cycle and latency requirements, message content and broadcasting status (that is to say, unicast versus multicast), situation exigency, threshold-exceeding movement, communication-initiation source or the like. Moreover in such downlink communication, an application server 420 that is part of the backhaul server 400 may communicate with a network server 410 that is also part of the backhaul server 400 and that in turn sends each downlink message to a single gateway 300 that then transmits the message to the wearable electronic device 100. Furthermore in this latter mode, the gateway 300 may act as a duplicating, packet-forwarding device by first receiving LPWAN radio signals from events recorded and stored in the wearable electronic device 100 and then forwarding them to the backhaul server 400. In this mode of operation, the wearable electronic device 100 is capable of encrypting and decrypting packets, as well as be observant of duty cycles and perform network authentication functions.

As previously discussed, in one form where the signal transmission protocol is based on LoRaWAN, various functionalities are enabled, including the ability of a large number of the wearable electronic devices 100 to be monitored simultaneously, the ability to engage in adaptive data rate (ADR) transmission (which can reduce the need for signal-hopping), the ability to have bidirectional end-to-end communication, OTA software or firmware upgrades, range-versus-message duration tradeoffs, more accurate localization and the ability to roam between gateways 300 without a disruption in connectivity in a manner that substantially mimics the movement of a mobile telephone between cell towers. Furthermore, communication between the wearable electronic device 100 and the gateway 300 may be configured such that up to six different LoRaWAN network credentials may be stored to allow seamless (that is to say, automatically and without a substantial break in connectivity) hopping between credentials, as well as public-private network switching, depending on the circumstance or need. When multiple credentials are used, they may be further set up to prioritize a particular order, such as first, second, third and so on. In one form, each gateway 300 can serve numerous (for example, in excess of a thousand or more) wearable electronic devices 100. Having multiple gateways 300 may be helpful in establishing a star topology for a network formed between such gateways 300 and the PAN P through one or more of the wearable electronic devices 100. By having this bidirectional capability, the wearable electronic device 100 and associated PAN P can—in addition to operating in a passive mode for monitoring location, activity, behavior or the like—operate in an interactive way with other components within the system 1 or other devices within a particular environment, including within the PAN P itself.

In this latter form, the bidirectional exchange of information within the PAN P between the wearable electronic device 100 as the source node and the remaining peripheral nodes 200 (whether in the form of beacons, other wearable electronic devices 100, sensors $S_1, S_2, S_3 \ldots S_n$ or the like and all of which are in signal communication with the source node) may be used to conduct handshaking between them. Such handshaking, as well as the repeated bidirectional communication between source and peripheral nodes 100, 200 within the PAN P, ensures that a substantial entirety of the data being transmitted back and forth actually reaches its intended destination. For example, by including a checksum or related algorithmic function, potential errors in the transmission of the data may be readily identified and corrected. Thus, in situations where integrity of the data is required or otherwise important, data acquired by and contained by the peripheral node or nodes 200 may only be removed from its internal queue of data once the peripheral node has been assured from the source node 100 that the data has been correctly received and processed. Such assurance may use checksum or other suitable algorithms in responses from the source node 100 to the peripheral node 200 after data transmission. By way of example when the intra-PAN P wireless transmission is using a BLE-based protocol, BLE indications from the peripheral node 200 (as a BLE server) are made to the source node 100 as a BLE client as a way to establish suitable acknowledgment rather than mere notification; this in turn results in confirmed data transmissions. The use of a cyclic redundancy check (CRC) and parity check may further help to ensure transmitted data validity, while the assurance of specific types of data may similarly be undertaken in the form of a data assurance transmission method, algorithm or the like.

Within the present disclosure where health, medical and related disease-spread information may be transmitted both within the PAN P and between the PAN P and gateway 300, servers 400, cloud 500 or other outside systems, networks or the like through the bidirectional wireless signal communications discussed herein, data validity measures such as these are particularly beneficial. As discussed elsewhere, the use of bidirectional intra-PAN P communication may further help with power management functions. For example, active transmission of data from the peripheral node 200 to the source node 100 is initiated by the source node and can be made to only occur when the source node 100 can reasonably assume that transmission is needed and that the transmission will succeed based on its internal state, measured values of its environment and the peripheral node 200. In other words, the source node 100 will not connect to download data from the peripheral node 200 unless it detects a sufficient signal strength from the peripheral node 200, and for a sufficient amount of time. This in turn may include the use of machine code to prioritize certain kinds of peripheral nodes 200, as well as prioritizing based on how much data the source node 100 can detect has been backlogged by the peripheral node 200. This has the effect of minimizing wasted dataflow traffic and the concomitant unnecessary usage of battery power by both source and peripheral nodes 100, 200.

This relatively high degree of interactive (rather than merely passive) involvement enabled by bidirectional communication that is used to ensure validity of the data being transferred in turn allows for the formation of a self-configuration network (or a self-organizing network (SON)) such that the PAN P may manage itself. By way of example, machine code that is discussed in more detail herein may cause the PAN P to perform at least one of configuration, registration and calibration. This in turn enables various updates to the same, including those to software or firmware, including to the peripheral node or nodes 200. Non-limiting examples of configuration updates may include those for the selective engagement or disengagement of certain functions (such as a panic button on the wearable electronic device 100), LPWAN power level changes, such as to get extended distance or range versus extended battery life and changing request and response status between the source and peripheral nodes 100, 200 to acquire certain forms of LEAP data, among others. In this last example, by assuring bidirectional communication between the source and peripheral nodes 100, 200, the PAN P enables requests for a particular peripheral device 200 to acquire a measurement, such as an electrocardiogram (EKG) reading or the like. Such targeted (rather than indiscriminate) requesting is especially beneficial for measurements that are taken at peripheral devices 200 that consume larger amounts of power during the measurements but low power during idle as a way to conserve battery power. In another use for self-administered configuration changes, restrictions may be made on the number or type of possible networks that can join the PAN P; this has the effect of conserving power on the various peripheral devices 200. In addition, further measures may be undertaken to ensure proper data transmission within the PAN P. For example, data transmission from the peripheral node (or nodes) 200 to the source node 100 is only allowed to occur when the signal strength threshold between them is great enough to ensure complete transmission and when the data to be transmitted can be assured to be completed in full (such as through checksum or other suitable algorithms). It will be appreciated that these are but a few examples of how the bidirectional communication between the source node of the wearable electronic device 100 and the peripheral nodes 200 promotes a SON.

Within the present disclosure, registration could be achieved by placing the wearable electronic device 100 in close proximity with a measurable parameter of interest (such as a heartbeat being sensed by a heart rate monitor) for a short period of time (for example, around five seconds) in situations where near-field communication (NFC) or related wireless communication is enabled. Registration could also be conducted through a registration process, through an exchange of keys back and forth or through a BLE connection that accepts the two devices as a part of the PAN P of the source node 100. Likewise, calibration could be applicable to numerous features. In one form, the source node 100 may be used to calibrate or configure one or more of the peripheral nodes 200. Using the previously-discussed detection of heart rate as an example, calibration of the heart rate monitor may take place such that it monitors for a duration (for example two hours) at predetermined rate (for example, every one minute) after which it reverts back to its default monitoring rate. Self-calibration is also possible in that in a situation where a sensor or related device may have to adjust to a new, updated standard, it can reset, balance out and then confirm that it was calibrated to the new standard, as well as send a status update upon completion. In a similar manner, the bidirectional nature of the communication between the source and peripheral nodes 100, 200 may be used to conduct diagnostic tests, system information or related status updates for the various components that make up the PAN P, such as when such diagnostics, tests or status information is transmitted to the source node 100 from the one or more peripheral nodes 200. For example, an error code or an update (such as an update on the number of battery charge cycles or an indication that it is time for some predictive or preventative maintenance of a particular device) may be transmitted in order to allow machine code (such as that resident on the wearable electronic device 100) to conduct an analysis, prepare a report or the like.

Furthermore, data compression may take place on the wearable electronic device 100 before sending such data to the gateway 400 and backhaul. As discussed elsewhere within the present disclosure in conjunction with a machine learning workflow 1000, one form of such data compression may be in the form of data cleaning in general, with a more particular form being dimensionality reduction. As a corollary, native intelligence on the wearable electronic device 100 helps to promote some measure of self-backhauling, which is beneficial in situations where access to the backhaul server 400 is not available. Moreover, such bidirectional capability may help with registration of the various devices, such as through short range RFID, BLE or NFC connectivity. In one form, the registration may be event-based.

In one form, the sensors $S_1$, $S_2$, $S_3$ . . . $S_n$ may be distributed over various places on or adjacent the wearer W such that they are physically distinct components that are separate from the wearable electronic device 100, while in another, the sensors $S_1$, $S_2$, $S_3$ . . . $S_n$ may be contained within the wearable electronic device 100, while in still another, some of the sensors $S_1$, $S_2$, $S_3$ . . . $S_n$ may be separate components while others are part of the wearable electronic device 100. In yet another form, one or more of the sensors $S_1$, $S_2$, $S_3$ . . . $S_n$ may form autonomous or semi-autonomous data-collecting devices. Within the present disclosure, a sensor detects events or changes within the environment in which it is placed, and may record, indicate, forward or otherwise respond to a particular physical property that is being measured. Depending on the configuration, and as will be discussed in more detail as follows, in one form, communication between the various sensors $S_1$, $S_2$, $S_3$ . . . $S_n$ and the wearable electronic device 100 may be thought of as an intra-PAN construction, while in another as an inter-PAN construction where the former is that which takes place within the PAN P while the latter is that which takes place outside of the PAN P. It will be appreciated that both variants are deemed to be within the scope of the present disclosure. By way of example, in one form, an inter-PAN communication may be formed between the wearable electronic device 100 and sensors $S_1$, $S_2$, $S_3$ . . . $S_n$ and other devices external to the PAN P, while in another form, a substantial majority or entirety of the acquired data may be conveyed to the wearable electronic device 100 from devices that form part of the PAN P. Moreover, in configurations where one or more of the various sensors $S_1$, $S_2$, $S_3$ . . . $S_n$ are physically distinct components that are separate from the wearable electronic device 100, they may be made to establish signal communication with the wearable electronic device 100 through one or more short-range or very short-range radio signals using a suitable NFC, or in the alternative through one or more short-range protocols or wireless interfaces such as Bluetooth, WiFi, Zigbee, BLE, 6LoWPAN, IrDa, RFID or the like.

In one form, the sensors $S_1$, $S_2$, $S_3$ . . . $S_n$ form so-called "smart devices" in that they are made IoT-compatible through suitable RF connection such that data that they acquire may be conveyed based on certain triggering criteria. In one form, the acquired data may be conveyed based on triggering criteria established by logic contained within the sensors $S_1$, $S_2$, $S_3$ . . . $S_n$ or wearable electronic device 100, while in another form via logic contained within the gateway 300, servers 400 or cloud 500. In one form, such triggering may involve the transmission of previous measurements that may have been acquired by—and locally stored upon memory contained within—one or more of the sensors $S_1, S_2, S_3 \ldots S_n$. Regardless of where such logic is situated, it will be appreciated it may exist in a known form, such as through a software development kit (SDK) or the like, and that in addition to performing various calculations and event-triggering or event-responding activities, may also detect and interpret wireless and related radio broadcasts that take place between the various components that make up PAN P.

Examples of how various triggering events may be used to initiate action by the wearable electronic device 100 include text, call or e-mails from outside sources, as well as certain threshold-exceeding or time-based events. Within the present disclosure, events are those situations, conditions, locations or related measurable quantities that may have an impact on contact tracing, proximity monitoring, geofencing or related functionality associated with the wearable electronic device 100, system 1 or PAN P. These events and triggers may take place regardless of whether the wearer W is being monitored for location, health and related physiological data, contact tracing, ambient environment conditions, activity or purposes as may be discussed herein. As shown in exemplary form, example, sensors $S_1, S_2, S_3 \ldots S_n$ may include chemical sensors, radiation sensors, accelerometers (such as to detect vibrations, falls, extreme movements or the like), cathodic protection sensors (such as for pipelines or other remote or hard-to-reach locations where the use of a LoRaWAN-based approach would be particularly beneficial), various physiological sensors (including temperature sensors that may include infrared (IR) or related thermal imaging functionality) and others that may be signally coupled to the servers 400 through a public or private LoRa-based network that establishes wireless communication between the wearable electronic device 100 and the gateway 300.

In one form, the sensors $S_1, S_2, S_3 \ldots S_n$ can receive communication from the LPWAN through the gateway 300, but can only send information to the LPWAN through the wearable electronic device 100. In this way, the common device credentials associated with each of these and other components within PAN P gives the appearance to the LPWAN that the PAN P is a single device. In another form, the sensors $S_1, S_2, S_3 \ldots S_n$ may possess some measure of both send and receive communication with the LPWAN through the wearable electronic device 100. By way of example for this latter configuration, the wearable electronic device 100 may send out a signal to wake up a first sensor $S_1$ in order to initiate a task such as to first clear a memory (not shown) in sensor S1 and then to have sensor $S_1$ start performing its particular data-acquisition process, such as measuring heart rate, $O_2$ saturation or the like. Additionally, time limits (for example, one minute) may be placed on the length of time for sensor $S_1$ to acquire the data, after which it may then be instructed to transmit the acquired data back to the wearable electronic device 100. In certain operating modes such as the one associated with the form where one or more of the sensors $S_1, S_2, S_3 \ldots S_n$ may possess some measure of both send and receive communication from the LPWAN, certain commands (such as that to clear and retest) need not include having to route such commands through the wearable electronic device 100 for handling other than for the purpose of having it act as the communication gateway. Likewise, in certain operating modes such as the one associated with the form where one or more of the sensors $S_1, S_2, S_3 \ldots S_n$ may possess only send communication capability to the LPWAN, the wearable electronic device 100 may take on a more comprehensive role as the command handler.

In one form, the data generated by the one or more of the sensors $S_1, S_2, S_3 \ldots S_n$ and that is delivered to or otherwise managed by the wearable electronic device 100 may be delivered directly from the wearable electronic device 100 to the cloud 500 through the gateway 300. This obviates the need for intervening infrastructure such satellites (either terrestrial, space-based or nano satellite-based) or a cellular tower, thereby allowing a wireless connection to be established between the PAN P and an end user of the data on the cloud 500 through the internet I without the presence between the wearable electronic device 100 and the cloud 500 of a cell phone, mobile phone, smartphone or the like, while reducing—if not outright eliminating—the need for WiFi. Such a configuration is particularly suitable in situations where analytics, predictions or the like based on such acquired data needs to take place in real-time or near real-time situations such as infectious disease contact tracing, wearer W wandering, health monitoring, location determination or the like. In this way, the insights gleaned from the acquired data may be more quickly put into a form suitable for decision-makers or other interested individuals.

Within the present disclosure, it is understood that the cloud 500 may exist in two forms. First, it may be on the internet I such that it is reached by the gateway 300 through the server 400. Second, it could be locally transferred from the gateway 300 to an intranet or to a specific server (neither of which are shown). Either variant of cloud 500 cooperation with the wearable electronic device 100 and gateway 300 is within the scope of the present disclosure.

Depending on the extent of physical connectivity between the sensors $S_1, S_2, S_3 \ldots S_n$ and the wearable electronic device 100, the latter may be configured to be coupled to the wearer W in various form factors, including wrist-worn (as shown), bandage, article of clothing, or other on-body format, as well as attachable to the wearer W through an external device attached onto a belt clip, in a pocket, on a necklace, on a shoe, helmet, hardhat, safety glasses or the like, in addition to being affixable to a purse, backpack, a subcutaneous implantable (that in one form may be charged like a pacemaker) or the like. Additionally, the wearable electronic device 100 may be configured as a smartwatch, a smartband, smartring or the like, while the sensors $S_1, S_2, S_3 \ldots S_n$ may either on the wearable electronic device 100 or placed somewhere on or adjacent the wearer W, such as through nearby a sensor patch, embedded in or on the clothing, as a subcutaneous implantable sensor (such as a thermometer, insulin detector that—as mentioned previously—can be charged like a pacemaker) or the like. Furthermore, the wearable electronic device 100 and PAN P may be used in various applications, including by way of example and not by limitation: insulin devices, wearable heart rate patches, seizure-monitoring apparati, body-mounted sensors for falls, smart clothing or as an add-on product.

In one form, the wearable electronic device 100 acts as the aggregator or master node of the PAN P, while sensors $S_1, S_2, S_3 \ldots S_n$ or other external devices 200 may act as peripheral data-acquisition nodes, and as such are also referred to herein (depending on the context) as peripheral nodes, peripheral devices, BLC-capable devices, beacons, mobile beacons or the like. In one non-limiting form, the external devices 200 may include personal digital assistants (PDAs), mobile telephones, personal computers (PCs), laptop computers, mobile phones, fitness trackers, headphones, heart rate monitors or other radio-equipped platforms, as well as IoT-based beacons, radio-equipped sensors such as the sensors $S_1, S_2, S_3 \ldots S_n$ all of which may form part of an individual's living or work space. Within the present disclosure, one or more additional wearable electronic devices 100 may also be included among these PAN-compatible devices when they are not acting in their capacity as the source node or master aggregator of PAN P. Within the present context, many if not all of these peripheral devices will include BLE or other short-range protocol modes of transmission. Likewise, many or all of the peripheral device may include locationing functionality through GNSS or related satellite-based inertial frame of reference positioning system sources, as well as relative locationing functionality through triangulation or related cooperation with other similar devices. It will be understood that even in situations where one or more of the sensors $S_1, S_2, S_3 \ldots S_n$ are integral with (that is to say, forms a part of) the wearable electronic device 100, they may still be considered to be peripheral nodes for functional purposes. In acting as the master or aggregator node, the first or primary wearable electronic device 100 manages communication between the sensors $S_1, S_2, S_3 \ldots S_n$ and the LPWAN gateway 300, as well as various management, control and network access and connectivity functions as a way to connect one or more endpoints to a broader network. Within the present disclosure, this aggregator capability allows such wearable electronic device 100 to operate as a full function device (FFD) which—in addition to other functionality—allows it to be configured to have a full infrastructure network access protocol, as well as full control and user plane functionality, including the ability to adaptively change data rates or the like. In this way, application-specific data may be conveyed in MAC frames between various end node devices and the network server 410. Likewise, the MAC frames may be used to transmit control plane data between the end nodes and the network server 410. The structure of the signal and data (that is to say, the payload being carried) may be established within known frameworks within the various headers or control frames as is known in the art. Moreover, various known network-joining strategies and infrastructure may be used within the LPWAN network that includes gateway 300, including—among other things—the use of network address (NwkAddr), application extended unique identifier (AppEUI), device extended unique identifier (DevEUI), application key (AppKey) and the IP address-like device address (DevAddr). To enhance security of the wearable electronic device 100, the AppKey (which is subject to the 128 bit Advanced Encryption Standard, (AES) with public key and private key components), as well as the derived application payload encryption key (AppSKey) and the MAC commands and application payload key (NwkSKey) may receive additional security through their use with—or incorporation into—a secure element. In one form, such a secure element may be thought of as a processor-based physical module with cryptographic code capability to cooperate with a suitably configured API. It will be appreciated that in the use of a secure element, IoT-specific and LPWAN-specific considerations may be made in the design thereof to account for data payload limitations within the communication link. In such circumstance, some form of adaptive cryptographic keys may be used to be responsive to expect future upgrades to IoT devices such as the sensors $S_1 \ldots S_n$ or the peripheral nodes in the form of BLE beacons 200 to ensure additional security of LPWAN IoT communications such as those discussed herein.

In one form, one or more of the various data-acquisition nodes (which in one form may be the same as, or form a part of the peripheral nodes 200) such as those associated with one or more of the sensors $S_1, S_2, S_3 \ldots S_n$, BLE-capable devices 200 or the like may do more than merely passively acquire data. For example, one or more of these nodes may further include active features. Thus, for instance, if the first sensor $S_1$ (which in one form may be an accelerometer, gyroscope or the like) detects that the wearer W has fallen, the sensor $S_1$ in combination with the wearable electronic device 100 may send out a signal to a braking device that is affixed to a walker or related mobility aid (not shown) that is known to be associated with—and currently being used by—the wearer W in order to engage the brakes and stop or reduce additional movement of such mobility aid.

Communication (both one-way and two-way, depending on the need) between the PAN P and the gateway 300, servers 400, internet I or cloud 500, also allows for ease of parameter reconfiguration within the wearable electronic device 100 through suitable files, instructions or related updates from one or more backhaul sources that either form part of or are otherwise connected to the gateway 300, servers 400, internet I or cloud 500. As such, the PAN P may operate in two different link modes: first as a link between it and the LPWAN; and second as a link between the wearable electronic device 100, sensors $S_1, S_2, S_3 \ldots S_n$ (and optionally other components—such as the BLE-capable devices 200 that may be cooperative with the wearable electronic device 100) within the PAN P.

In one form, the wearable electronic device 100 as an FFD may act as an intermediary between two more or more of the sensors $S_1, S_2, S_3 \ldots S_n$ in order to deliver a function without having to backhaul the information to the cloud 500. For example, in such a configuration, the other external devices such as the BLE-capable devices 200 may transmit data to the wearable electronic device 100 which then determines that one or more of the data content, signal strength or other parameter of interest is too low to be of value. This in turn may cause the wearable electronic device 100 to provide some indicia of a potential problem with the acquired data or signal, such as through vibration of a haptic motor, flashing light, audible alarm or the like, as well as possibly communicating back to the BLE-capable device 200 of interest for a similar alert or alarm at the local site of the particular BLE-capable device 200. Relatedly, in situations where the data being offloaded from the sensors $S_1, S_2, S_3 \ldots S_n$ to the wearable electronic device 100 may be present in various forms, including summary data, continuous data or the like, the wearable electronic device 100 may contain configured or pre-set parameters stored in its memory to allow it to determine what type, frequency, size or other attributes of the data to send through the LPWAN gateway 300 and what data to ignore. In addition, these parameters could be adjusted somewhere within other parts of the system 1 (such as the servers 400) as needed based upon current and future desired performance implementations of the wearable electronic device 100. Due to limited resources of—among other things—memory and power, the ability of the wearable electronic device 100 in one form to discriminate between various types of data allows it to allocate resources in an efficient manner to ensure the correct type of data gets transmitted rather than indiscriminately sending all sensed data.

By way of example, predetermined actions may be initiated by the wearable electronic device 100 based on the data acquired from the sensors $S_1, S_2, S_3 \ldots S_n$ or other peripheral devices 200. Furthermore, such acquired data need not be related to the particular functionality of the wearable electronic device 100, PAN P and system 1, such as when they are configured to perform contact tracing or the like. For example, if a detected heart rate of the wearer W is very low, then the wearable electronic device 100 could initiate an action to call emergency services instead of sending data to the cloud 500.

In a similar way, various other data discrimination or filtering protocols may be established within the wearable electronic device 100 and PAN P. For example, in more densely-populated situations, a list of people or maximum number of other devices the wearable electronic device 100 can "listen in" on may be included, such as by a lookup table or the like in the memory of the wearable electronic device 100. This could be configurable based on various needs, including user input, device capacity, mode of operation or the like. Thus, for example, if the wearer W is on a train, it may be undesirable for every nearby BLE-capable device 200 to share data with the wearable electronic device 100. In one form, the wearable electronic device 100 could prioritize other wearable electronic devices 100 or BLE-capable devices that are within the PAN P, as well as on the nature of the information that these other devices carry. In one form, one could adjust the distance the PAN P is around the wearer W, or the number of devices it is monitoring for new data or the people of those devices.

Figure 10:
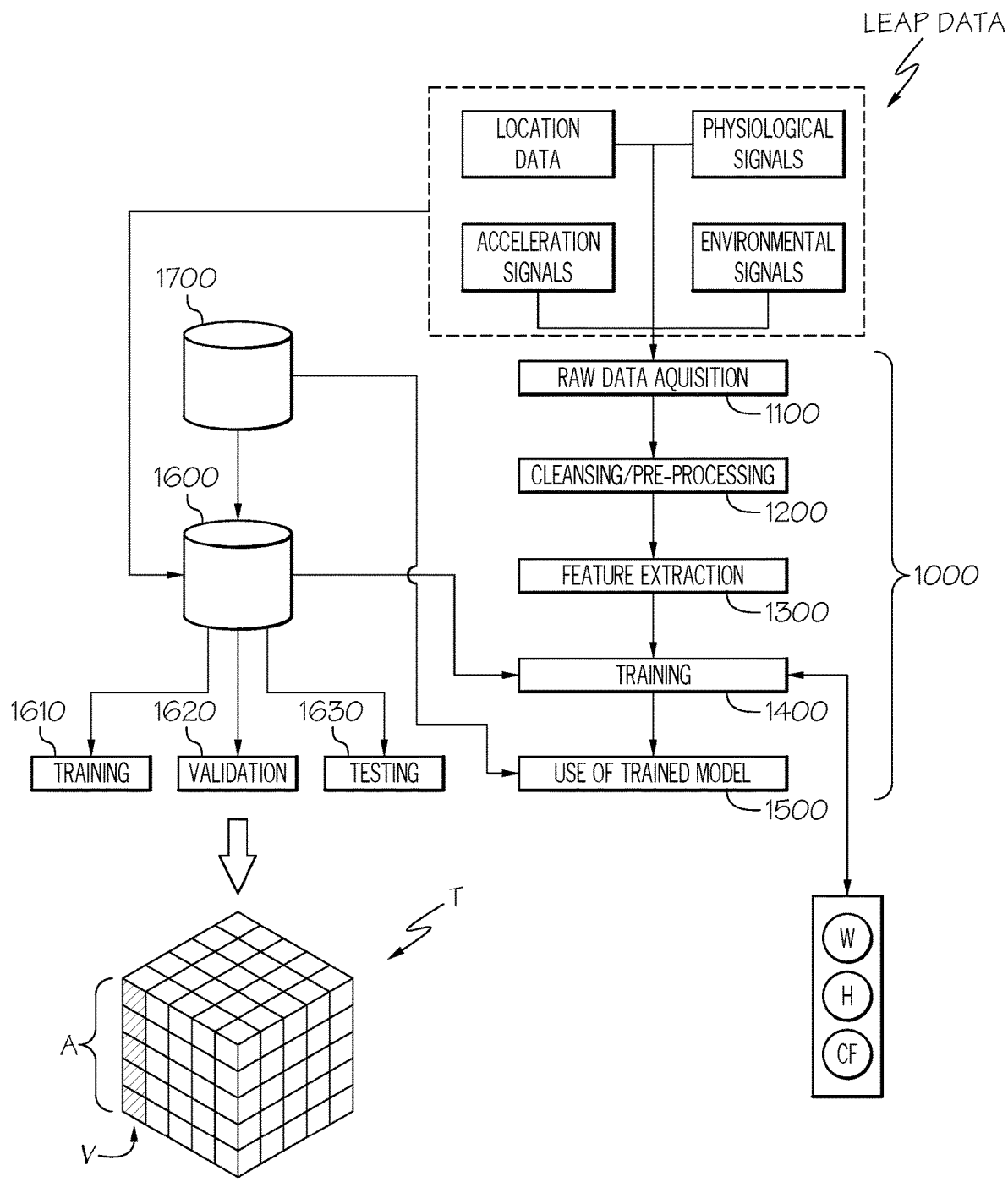
FIG. 10 depicts a program structure in the form of a flow diagram of how the wearable electronic device may be used to develop a machine learning model according to one or more embodiments shown or described herein.

In addition to allowing the wearable electronic device 100 to determine certain data acquisition functions based on need, computational capabilities of the various parts of system 1 may be configured based on data processing needs, including how such computational capacity (including data storage, operation of one or more parts of the machine learning workflow 1000 of FIG. 10, for example) needs may be met either locally at the wearable electronic device 100 or remotely in other parts of the system 1. In a similar manner, the authors of the present disclosure anticipate that such computational and data storage capacity will become significantly greater in the future as their underlying chipsets and peripheral equipment adapt and improve over time, possibly allowing for increasing amounts of computation to take place locally on the wearable electronic device 100. In addition, when coupled to machine learning capability, the wearable electronic device 100 may be tailored to adjust to the behavior of the wearer W, as well as to optimize its operation (including battery power usage) for efficiency during a particular mode of operation.

In one form, the PAN P is configurable to maintain certain preset or other prescribed parameters. For example, in one form, such parameters may include those which are set by an end user such as a physician, caregiver, data analyst, system administrator or the like. Thus, in addition to being used for contact tracing, the PAN P may be used to provide real-time information on maintaining social distancing or the like in order to fulfill at least a portion of its proximity monitoring function. In another form, the PAN P may be configured for resource management, such as the frequency of transmission between the wearable electronic device 100 as the FFD and the larger (IP) network or other backhaul infrastructure, as well as the adjustment of power-consuming functions (which could be initiated either on the wearable electronic device 100 or by a remote user, either automatically or by a system administrator) such as those tied to frequency or immediacy of certain data requirements, as well as for energy use throttling in situations where excessive energy use has been identified. Similarly, the use of on-board memory within the wearable electronic device 100 could be adjusted depending on the needs of the data being acquired, in addition to time-sequencing and prioritization of such data such as a preference to get the most recent data and deleted older data that could not be transmitted with a particular time allotment.

While in one form the topology between the PAN P and backhaul is configured in a star-based configuration, other topologies within the PAN P that may be supported include mesh/peer-to-peer (P2P), cluster trees or the like. As such, at least at the less granular system 1 level, there may be hybrid topology attributes, while at the more granular level, the topologies exhibit their own unique characteristics. In one form, this helps promote how the wearer W of the wearable electronic device 100 may serve as the focal point for communications within PAN P while also allowing such wearer W to serve as a caregiver for patients. By way of example in a hospital, residential care facility or the like, a nurse may have his or her wearable electronic device 100 configured as an FFD in order to monitor numerous patients within the facility who may be wearing their own FFD or RFD devices that are signally operating within the PAN P. Additional details of the wearable electronic device 100 acting as part of a star topology may be found in the previously-discussed US Published Application 2019/0209022, while more details of a mesh-based topology will be discussed herein relating to a geofencing capability of PAN P. Moreover, the wearable electronic device 100 may be configured to have different capabilities, depending on the end use. For example, it can be configured to include one or more of indoor location tracking, outdoor activity tracking, activity monitoring, touch-activated buttons (including, for example, a panic button), wireless charging and advanced sensor fusing (for gesture recognition). One such use depicted by the notional interaction of FIG. 1 between the wearable electronic device 100 and various telecommunication infrastructure is for use for triangulation or related location-determining or communication services.

Referring next to FIG. 2, in one form, the cooperation of the sensors $S_1, S_2, S_3 \ldots S_n$, wearable electronic device 100 and LPWAN gateway 300 form system 1 that is configured for use in tracking the spread of a contagious disease. In a known disease outbreak situation, the location wearer W may have been identified as having been infected with (or at least exposed to) the contagious disease. Likewise, other people who may not be suspected as having been infected may be outfitted with or otherwise have ready access to the one or more BLE-capable devices 200 with which low data content messages may be sent or received. In such capacity, the BLE-capable device or devices 200 form a reduced function device (RFD) that in contrast to the FFD functionality of the wearable electronic device 100 can only transmit to the PAN P (such as to the wearable electronic device 100) rather than both transmit and receive within the PAN P. As such in this form, the RFD that is embodied in the BLE-capable device 200 serves the role of a simple switch or sensor that in one form may emulate the functionality of the one or more of sensors $S_1, S_2, S_3 \ldots S_n$ disclosed herein and that have no routing functionality. In such capacity, the peripheral node or nodes 200 cannot serve as the PAN P coordinator or master in the manner of the wearable electronic device 100.

A logic device 173 includes a processor 173A, executable instructions stored in a non-transitory computer readable medium (such as memory) 173B, bus 173C, input/output 173D and machine code 173E that in one form may reside on memory 173B. Significantly, the machine code 173E is predefined to perform a specific task in that it is taken from a machine language instruction set known as the native instruction set that may be part of a shared library or related non-volatile memory that is specific to the implementation of the processor 173A and its particular Instruction Set Architecture (ISA). In such circumstance, the ISA acts as an interface between the hardware of the processor 173A and the system or application software through the implementation of the machine code 173E that is predefined within the ISA. The machine code 173E imparts structure to the successive architectures of processor 173A, logic device 173, PCB assembly 170 and wearable electronic device 100, specifically in the form of a program structure that may be made up of a set of one or more individual codes. Individual portions of the machine code 173E, such as the machine code to cause a wireless communication module 175 to receive location or event data from a mobile beacon of a peripheral node 200 or the signally cooperative sensors $S_1 \ldots S_n$ and to transmit the received data using an LPWAN protocol form finite, tangible and identifiable structural limitations to the logic device 173, the hybrid wireless communication module 175 and wearable electronic device 100. Within the present disclosure, and absent any specific indication to the contrary, the term "event data" may include one or both of sensor-derived parameters from the sensors $S_1 \ldots S_n$ and location-derived data from various sub-modules 175A, 175B and 175C of the hybrid wireless communication module 175.

The hybrid wireless communication module 175 is made up of at least first, second and third wireless communication sub-modules 175A, 175B and 175 C. The wireless communication module 175 is hybrid in the sense that it employs various forms of wireless signal receiving and transmitting. For example, the signals being transmitted from the beacons 200 as peripheral nodes can be received by a BLE, WiFi, RFID, NFC or related short-range signal-compatible radio that makes up a part of the first wireless communication sub-module 175A, while locationing signals being transmitted by a GNSS or related satellite-based source are received by the radio that makes up a part of the second wireless communication module 175B, and a third wireless communication sub-module 175C includes a radio for outgoing (that is to say, transmitted) LPWAN signals from the wearable electronic device 100 and the gateway 300. It will be appreciated that any combination of two or more of these different wireless communication approaches (as well as their related signal transmission protocols) may be within the scope of such hybrid wireless communication. Together, the logic device 173 and its structural components may cause the third wireless communication sub-module 175C to preferentially transmit the data received by the first wireless communication sub-module 175A when the wearable electronic device 100 is within a predetermined distance from a source of a signal emanating from the corresponding BLE beacon or other peripheral node 200, as well as cause the third wireless communication sub-module 175C to preferentially transmit the data received by the second wireless communication sub-module 175B when the wearable electronic device 100 is beyond the predetermined distance from a source of the BLE beacon 200 signal.

Within the present disclosure, the BLE-capable devices 200 may either form part of a larger system 1 that is based upon the PAN P and wearable electronic device 100, or in another form as an RFD that the PAN P and wearable electronic device 100 have access to and knowledge of its complete configuration. For example, in this latter form, the PAN P and wearable electronic device 100 may have significant identification information of the person assigned to the BLE-capable device 200 that is acting as the RFD. In addition, in situations where one or more of the wearable electronic devices 100 are within communication range with one another, their cooperation could provide indicia of them encountering the same population of BLE-capable devices 200. As such, contact tracing, proximity monitoring and related tracking may be performed on both healthy and already-infected people within a larger population with a greater degree of certainty. In situations such as this, additional security may in one form be achieved through an additional layer of encryption that would apply to devices and components such as the one or more BLE-capable devices 200 or other wearable electronic devices 100 that are within the communication range of PAN P.

In situations where enhanced levels of user privacy may be required (and in addition to the previously-discussed keys), recordkeeping of the sensed data could be achieved through additional anonymizing steps in order to correlate particular device ownership without the use of sensitive personal data (such as social security numbers, residence addresses, personal health data or the like). In one form, the BLE-capable devices 200 communicate a fingerprint or related device-specific data package, indicia or signature, such as the UUID, personal UUID, RSSI-based transmission protocol or the like. In one form, a rotating UUID may be used, where a beacon associated with a particular peripheral node 200 may broadcast an identifier that changes periodically. As long as some form of resolving service is coupled to the beacon to share an encryption key between them, such identifier can be resolved to stable, useful information. In one form, these devices could communicate a fingerprint/signature including UUID, personal UUID, RSSI information or the like as part of a recognition process. In one form, verification of the messages would be sourced through the wearable electronic device 100 and forwarded to the gateway 300 servers 400 and to the cloud 500. In addition, post-processing of the data may occur at various ones of these locations along the way, depending on the intended end-use of such data, computational requirements, time, expense or the like. Thus, in situations where the data may need to be anonymized and where at least a portion of such data is acquired by third-party BLE-capable devices 200, cooperative agreements may be formed by working with the manufacturers of such BLE-capable devices 200 to correlate security, wearer ownership, data anonymity or the like prior to contacting or otherwise notifying authorities of a potential disease outbreak. In this way, these third-parties may be thought of as a list of so-called "trusted vendors", particularly in situations where third-party variants of the BLE-capable devices 200 are not advertising or otherwise broadcasting to the public. Such an arrangement would allow the wearable electronic device 100 and the trusted vendor to communicate freely in the transfer of information that could be helpful in mitigating the spread of a virus or other contagious disease. In one form, such free exchange of information may take place at the cloud 500 where personal information would be transferred using high cyber-security assurance such as that available through known encryption technologies. It would also allow the wearable electronic device 100 to filter the noise of other devices and only focus on the ones of value or that are involved in the system. In another form, the security may be affected at the PAN P level such that encryption may take place between the BLE-capable devices 200 and the wearable electronic device 100 in an autonomous fashion.

Figure 3:
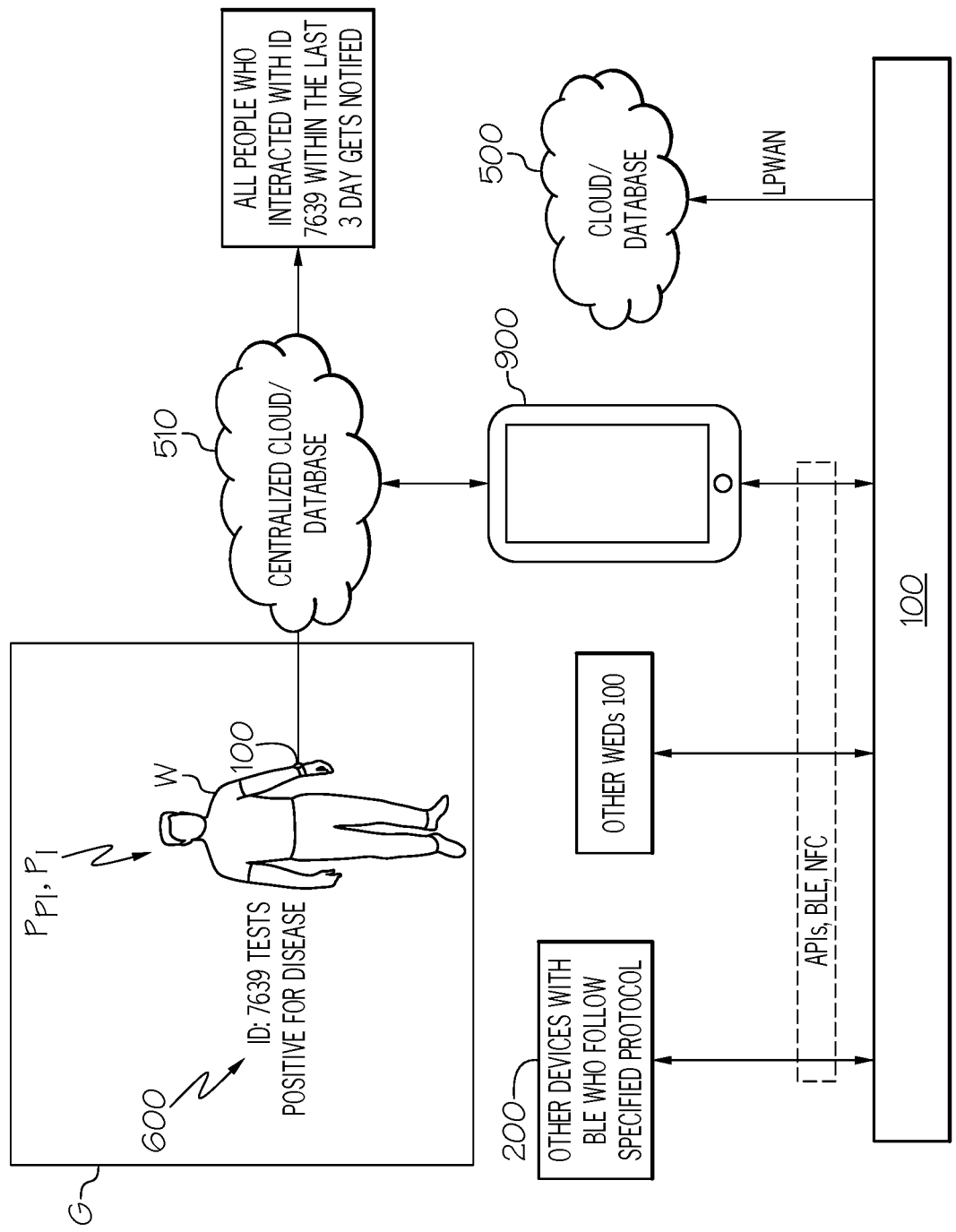
FIG. 3 depicts a simplified view of using the PAN of FIG. 1 to track a wearer that may or may not have been identified as being infected with a contagious disease.

Referring next to FIG. 3, in operation, the wearable electronic device 100 acts as the source (that is to say, primary, central or aggregator) node that dictates the operation of the PAN P can detect the presence of other wearable electronic devices 100 and BLE-capable devices 200 (collectively, the peripheral nodes) that are in the vicinity using BLE beaconing and scanning. Upon receipt of information (such as numerous positive ID tests for a given disease such as COVID-19 or the like), the wearer W may be considered at-risk as a possibly infected person $P_{PI}$ or infected person $P_I$.

In one form of contact tracing, instead of streaming all interaction data to a central database and querying that database when there is a confirmed (or otherwise positive) case and then notifying other people within a given at-risk population, the process may proceed in the reverse in a manner generally similar to computer virus software detection and reporting. As can be seen, the nature of communication between the wearable electronic device 100 and other devices such as mobile phones, other wearable electronic devices 100, BLE-enabled devices such as the BLE-enabled devices 200 that are discussed herein, NFC devices, other devices with suitably-equipped communication protocols and cloud 500 (which in one form may include numerous databases with which to store the acquired data from sensors $S_1, S_2, S_3 \ldots S_n$) is such that these other devices may serve as beacons. The dual direction shown by the arrows indicates that information taken from these other sources could be sent to the other wearable electronic devices 100. Various databases contained within the cloud 500 may include a centralized database 510 and a more specific database 520 that can cooperate with the data that is collected by the sensors $S_1, S_2, S_3 \ldots S_n$) and received through LPWAN from the wearable electronic devices 100, as well as with data taken from other sources as will be discussed next.

Continuing with the computer virus analogy, periodically (for example, every week, every month or the like), the centralized database 510 may be used to store information pertaining to all of the known virus cases, such as through digital signatures 600. Through suitable algorithmic or related analysis, the cloud 500 may in effect scan itself and the centralized database 510 to determine from all of the digital signatures 600 which ones meet a certain criteria, notably those where a particular virus or other infectious disease is confirmed (rather than merely suspected). Based on this analysis, the cloud 500 instructs the centralized database 510 to push a list of the digital signatures 600 of infected persons $P_I$ down to the more specific database 520. In this way, instead of having the centralized database 510 maintain of all of the interaction data of every individual everywhere, the more specific database 520 may be used to contain information pertaining to only the confirmed cases of infected persons $P_I$. Then every so often, display devices 900 (such as the mobile phone shown) will get an update of the list of confirmed cases within a given area (for example, within 10 miles of a GNSS location of the display device 900). Each display device 900 may then store an individual's personal interaction data and compare the confirmed cases with a history of that individual's personal interaction data. If a positive match is identified, an alert may be generated to bring to the attention of the individual associated with the display device 900 the need to get tested. In one form as shown, the display device 900 may also share this information through known telecommunication protocols to the wearable electronic device 100 to alert its wearer W.

In one form, a table of secure history of acquired data from a recent period (for example, from the last 14 days) may be stored in memory on the specific cloud database 520, after which periodic updates of confirmed cases of infection may be transmitted back to the wearable electronic devices 100 for an alert to be generated. In this way, the overall configuration depicted in FIG. 3 allows the system 1 to be adapted for performing contact tracing or proximity monitoring on one or more infected persons $P_I$ using peripheral devices 200 and the two-way communication between them and the wearable electronic device 100.

Thus, in this version as shown, the display devices 900 (as well as their telecommunication equivalents such as watches, tablets, personal digital assistants (PDAs) or the like) act as a beacon broadcasting and transmitting a suitable protocol such as Bluetooth, BLE or other IEEE 802.15.4-compatible modes of communication, particularly those configured for mesh-based interactivity. It is understood that BLE can be within such phone or smart device, thereby allowing such devices to act as the aforementioned beacons in the manner of the peripheral nodes 200. In such circumstance, the wearable electronic device 100 senses the RSSI or related beacon-based signal and converts it to a distance, as well as receives an anonymous token or related UUID to help identify the device from which the transmitted signal is being received. This information (about who the person is, and distance to the wearable electronic device 100, person-to-person or the like) may then be sent to the specific database 520 and then to the centralized database 510. If an individual within the population contracts a certain infectious disease (such as COVID-19 that is spread by the coronavirus), then the centralized database 510 is notified after which a notification may be sent to people who were interacted with during a certain time with the individual within the population that has contracted such disease. In one form, the LPWAN message that is transmitted from the wearable electronic device 100 to the specific database 520 could be to a Bluetooth gateway that then uses a LoRa-based or LoRa-supported) backhaul, as well as to other backhauls, such as WiFi or cellular, if needed.

By the operation of the system 1 in the manner depicted in FIG. 3, the disease rather than the person is being tracked. In that way, the functionality differs from that of tracking the location of an individual wearer W as discussed elsewhere herein, as well as in US Published Application 2019/0209022.

A geofence G may be formed around the various devices that make up PAN P as a way to provide privacy-enabled virtual location boundary alerts when other devices (including other wearable electronic devices 100 being worn by other individuals) move beyond or within a pre-established range. As shown, the geofence G may define various locations within its boundaries at a particular site, including that of the wearable electronic device 100 as a source node location, a range or distance (such as an RSSI or related straight-line distance) from the wearable electronic device 100, a communication range of the various non-source (that is to say, peripheral) nodes 200 within the PAN P, transmission times for message information, hop limits or the like. In one form, the geofence G may be defined as a static one to surround a physical structure within a given site, such as a building or similar structure. Although the geofence G is notionally shown having a rectangular boundary, it will be appreciated that such shape is non-limiting, and that geofence G may be defined as having any shape, whether geometrical or arbitrary. In another form, the geofence G may be defined as a dynamic geofence G consistent with the mobile nature of the wearable electronic device 100. Thus, unlike a static geofence G, the dynamic version of the geofence G may adapt to changing circumstances, which in turn provide a more accurate representation of other devices coming and going out of the PAN P. Geofence G may acquire location information for the source node wearable electronic device 100 or the non-source/peripheral nodes 200 through absolute or relative frames of reference. For example, an absolute frame of reference includes those available through a global navigation satellite system (GLASS), while a relative frame of reference includes those from localized sources such as RSSI, RFID, multi-beacon triangulation or the like.

In one form, the wearer W need not have been an infected person $P_I$, but instead could be anyone in a community, locality or region of interest. In such a circumstance, the wearer W may be able to track elderly individuals, children, physically or mentally handicapped persons or other people of interest in large, dense crowds such as at sporting events, cultural, religious or civic gatherings, or the like. In these high human density environments, the venue could be populated with multiple gateways 300 using their well-known positions and triangulation methods in order to help monitor the location of an at-risk population or other people of interest. Such a configuration may also be useful in establishing absolute (or near-absolute) location for contact tracing, quarantine monitoring and enforcement or the like in situations where the risk of a contagious disease spread is imminent or identified. In such circumstance, the wearable electronic device 100 could pick up any signals from nearby peripheral devices 200 as the wearer W moves about. In such a scenario, the wearable electronic device 100 acts as a mobile aggregator of BLE signals that it is receiving from these RFID-emulating BLE-capable devices 200, ingesting data and then conveying such data via the LPWAN gateway 300. In one form, the wearable electronic device 100 could ingest data in one of various ways, such as (i) encountering another wearable electronic device 100 that is within communication range, (ii) as a BLE-capable device 200 that in one form may function similar to a nurse call ID beacon, room beacon, elopement beacon or the like and (iii) as another external BLE-capable device 200 with fingerprint/signature capability through RSSI, UUID or the like. In the configurations depicted in both FIGS. 2 and 3, distance or relative location between the wearable electronic device 100 and one or more other wearable electronic devices 100 and peripheral devices 200 may be determined through various algorithmic approaches, such as coordinate transformation computations that use various RSSI, triangulation or trilateration approaches.

If the wearer W has been identified as having a particular condition such as a contagious disease that may require some measure of quarantining, and has in fact been confined to their home, a geofencing (or virtual boundary) capability of the wearable electronic device 100 can be employed in order to provide data (suitably transformed into distance or location) that is useful to an end user. This in turn allows wearers of BLE-capable and related peripheral nodes 200 to be signaled through the PAN P that they may be at heightened risk for infection through proximity to the infected wearer's wearable electronic device 100. Likewise, governmental authorities or other decision-makers may be signaled that other such wearers of the BLE-capable devices 200 may be at risk. In one form, when family members must self-segregate, PAN P could help alert other members of the family that they are getting too close to one another; as mentioned elsewhere within the present disclosure, such alerting may take place through haptic motors, visual or audio alarms. In a similar manner, nursing home, group home or prison population segregation may be better enforced. As such, besides using the wearable electronic device 100 for analyzing the change in an individual's health condition (including infected portions of a given population), other applications, such as for firefighters, schools (particularly those that deal with autistic children), military personnel, construction workers, police officers, emergency medical technicians (EMTs) and prison inmates or the like are also within the scope of the present disclosure. References in the present disclosure to the various forms of the wearable electronic device 100, as well as to the previously-mentioned aspects, are meant to indicate that such forms or aspects may include one or more particular features, structures or related characteristics particular to the end-use need, but that each such form or aspect need not necessarily include all such particular features, structures or characteristics, and that any claimed combination of such features, structures or characteristics in part or in their entirety as described herein is has a basis in—and is therefore deemed to be within the scope of—the present disclosure.

In one form, the static version of the geofence G may be enabled by beacons placed at points of ingress or egress, such as doors or windows. In another form, beacons may be placed on adjoining properties, such as on a neighbor's residence. In one form, such alerting as to a breach (whether ingress or egress) of the geofence G may again be through haptic, visual or audio means within the PAN P, as well as having the information sent to the backhaul after which a text message is then generated and sent to the person or persons of interest, keeping in mind that such an approach is slower than when sending the message exclusively within the PAN P. In one form, the peripheral devices 200 disclosed herein may possess the necessary beacon capability, while in another form, stationary or other mobile beacons as discussed in US Published Application 2019/0209022 may be used to assist the wearable electronic device 100 and PAN P in its geofencing functionality. It will be appreciated that while the beacons that may make up one or more of the peripheral devices 200 are generally understood within the present disclosure to be of a mobile variant (in that they may be affixed to a person, animal, robotic drone, or other readily-movable host), there is no need that all such beacons must be. For example, one or more of the beacons may be stationary (such as those that are affixed a building wall, or on permanently-installed equipment), and that either variant is within the scope of the present disclosure.

As mentioned previously, PAN P may in one form be configured to have mesh topology for use in the geofence G and related tracking. Within the present disclosure, a node within a mesh network is any signal connection point that can receive, generate, store or transmit message information along one or more routes that are defined within the network. Regardless of whether each node is a source node or a non-source mode, it is clear from the figure that they may be situated at different locations within PAN P. The wearable electronic device 100 generates messages and related information for exchange with these one or more non-source nodes 200 within the geofence G as long as these non-source nodes 200 are within communication range of the wearable electronic device 100. In response, one or more of the BLE-capable devices 200 and one or more sensors $S_1$, $S_2$, $S_3 \ldots S_n$ may be made to respond to the geofenced information such that they can then transmit such information for reception to other BLE-capable devices 200 and one or more sensors $S_1$, $S_2$, $S_3 \ldots S_n$ that are within a communication range of the particular non-source node 200 that is initially receiving the information from the wearable electronic device 100. Moreover, when configured as a mesh network, the various BLE-capable devices 200 and remote sensors $S_1$, $S_2$, $S_3 \ldots S_n$ may assume additional hierarchical attributes; for example, a first of the BLE-capable devices 200 may receive the geofenced message information from the wearable electronic device 100 and then retransmit such information for reception by one or more other downstream non-source BLE-capable devices 200 that are within communication range of the first non-source BLE-capable device 200. In addition, the first of the BLE-capable devices 200 may determine whether its location is within the geofence G.

As previously mentioned, location or position information of the BLE-capable devices 200 and remote sensors $S_1, S_2, S_3 \ldots S_n$ relative to the boundary of geofence G may be determined by various indoor or outdoor approaches, such as through (at least in outdoor geofence G situations) GNSS or related global positioning system (GPS), information provided by one or more fixed beacons or other approaches as disclosed in US Published Application 2019/0209022, while an indoor equivalent to geofence G may rely upon RSSI, triangulation or other known means. Based on information received from one or all forms of such indoor and outdoor sources, the location of the BLE-capable devices 200 and remote sensors $S_1, S_2, S_3 \ldots S_n$ relative to the boundary of the geofence G may be ascertained with a relatively high degree of accuracy.

In one form, the wearable electronic device 100 could be placed on a robotic device (such as a drone or autonomous vehicle) in its data aggregation capacity. Such an approach could be particularly beneficial for situations where a disease outbreak is either suspected or already underway, thereby reducing unnecessary exposure of health-care workers and other personnel that are either tracking or responding to the outbreak.

Figure 4:
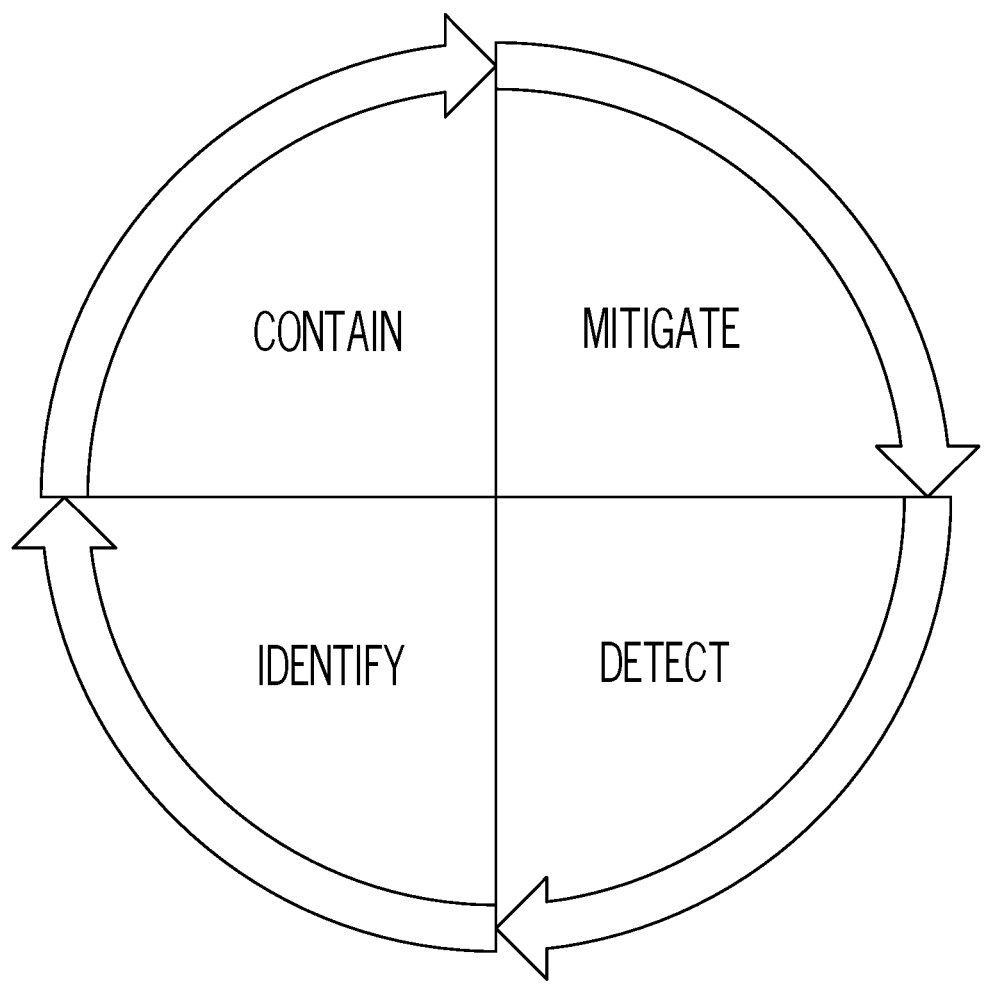
FIG. 4 depicts a perpetual circle showing a summary of strategies used to control the spread of a contagious disease and that includes identification and testing functions that can be performed by the PAN discussed herein.

Referring next to FIG. 4, a perpetual circle showing how to control the spread of a communicable disease or related event through a combination of mitigation, detection, identification and containment. The identification component of the perpetual circle can be in the form of contact tracing and other functions discussed herein through the use of the wearable electronic device 100, system 1 and PAN P. With the knowledge gained through the identification component, mitigation activities such as the use of personal protective equipment (PPE), adhering to social distancing guidelines and (in the case of individuals who are in a group environment) visitor control. Likewise, detection may include the use of testing, temperature screening and symptom monitoring. Lastly, containment may be in the form of isolating exposed individuals and quarantining positive cases. Because the wearable electronic device 100 may be used to track and perform contact tracing, while the dashboard 700 and contact report 800 (both as discussed as follows) may be used to document and inform interested individuals.

Figure 5A:
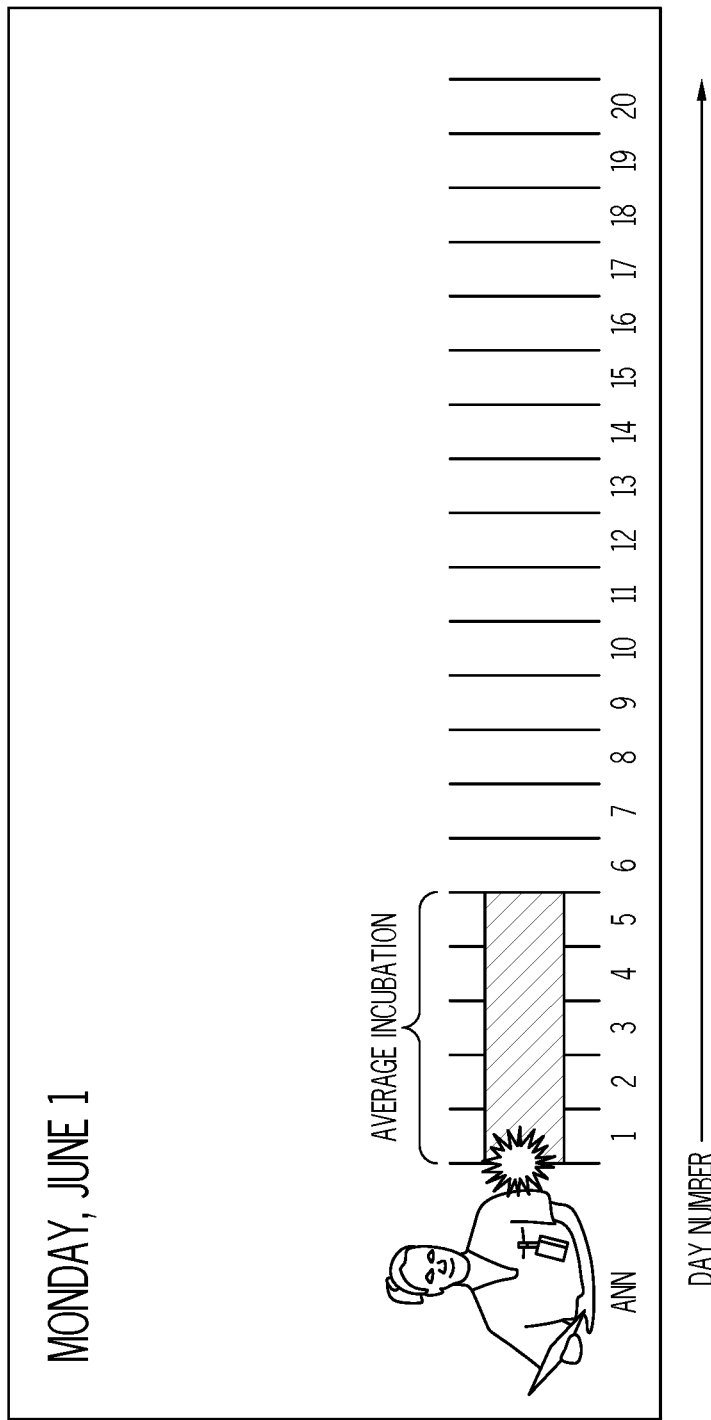
FIGS. 5A through 5D depict a conventional sequence of events of how an employee of a health care or related facility may infect at-risk residents of such facility to a contagious disease.
Figure 5B:
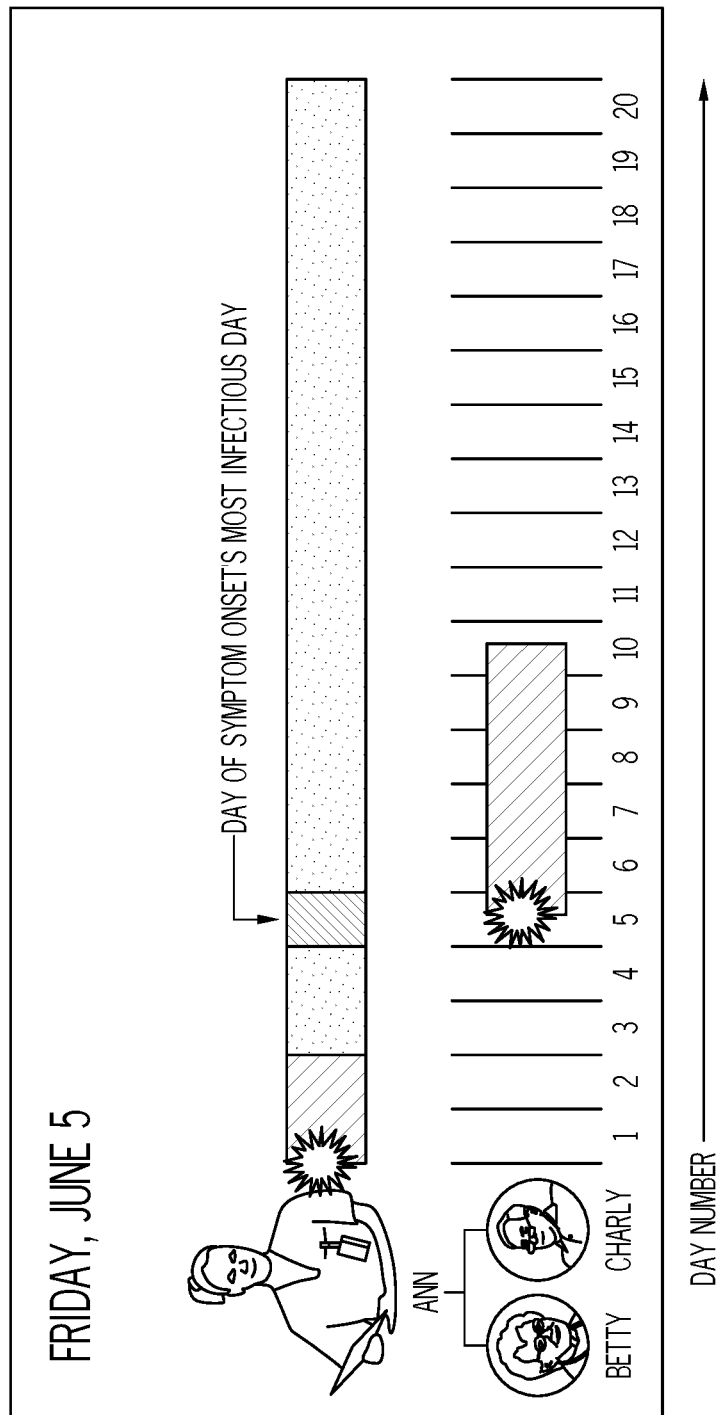
Figure 5C:
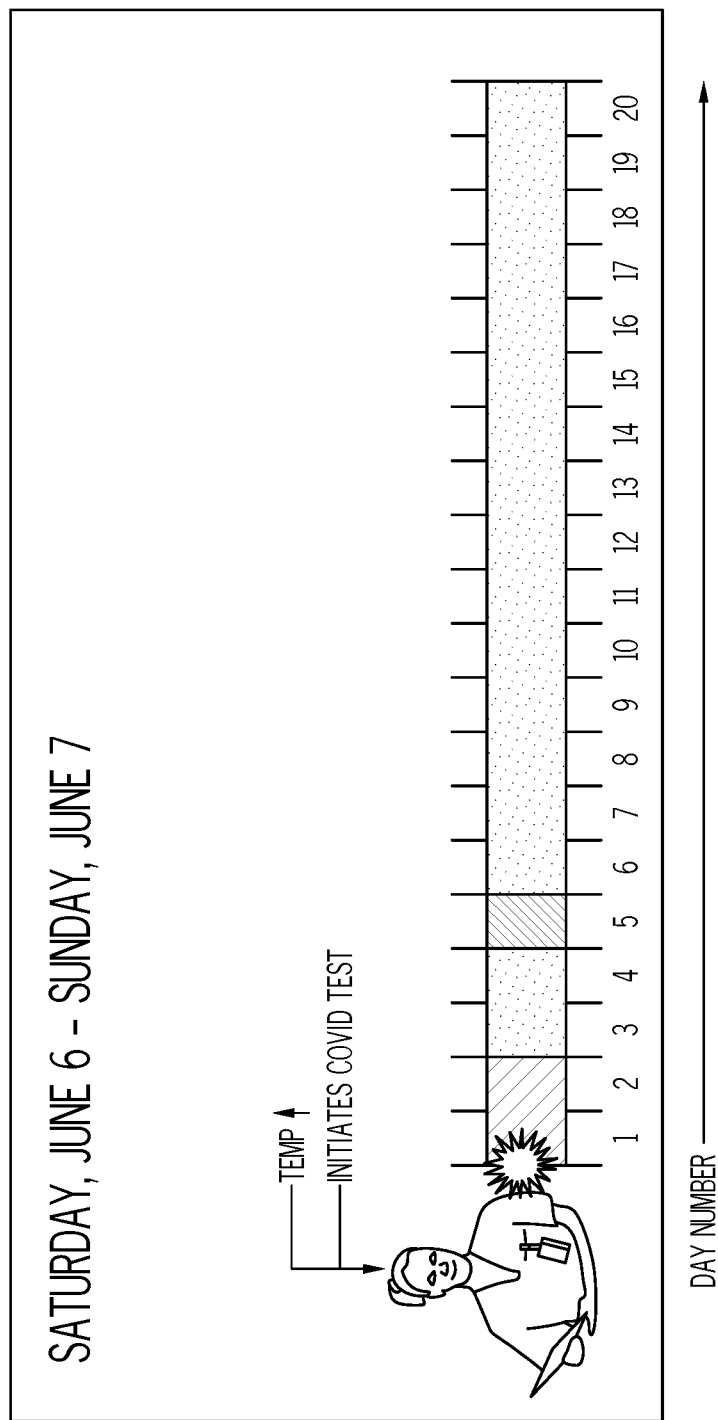
Figure 5D:
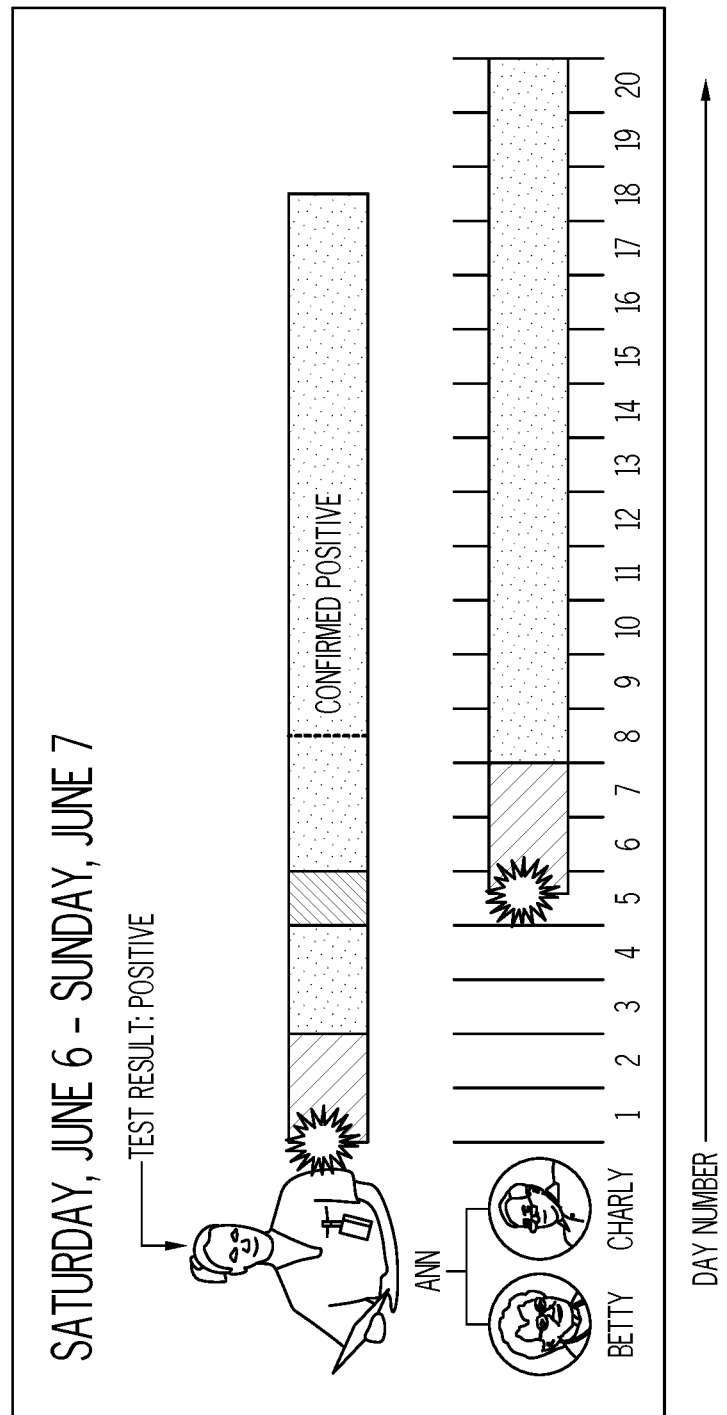

Referring next to FIGS. 5A through 5D, an example of a conventional approach to performing contact tracing is shown. Referring first to FIG. 5A, Ann, a nurse at Daisy Senior Living Facility, is exposed to SARS-CoV-2 on Monday, June 1. This is indicated as Day 0 on the horizontal timeline. It has been previously reported that due to known incubation periods, it may take approximately five days for Ann to begin developing any symptoms. Referring next to FIG. 5B, by Friday, June 5, Ann notices a runny nose and sore throat that she attributes to her allergies. Her temperature at this time is normal. While she doesn't realize it, this is the day that Ann is most infectious. Referring next to FIG. 5C, by Saturday morning, Ann has developed a fever and suspects that she may have COVID-19. She alerts her supervisor at Daisy Senior Living and goes for a COVID test. Unfortunately, her COVID test results will take a few days and the Director of Nursing that is in charge of contact tracing will not be back at Daisy Senior Living until Monday. Referring next to FIG. 5D, Ann's test comes back positive, and the Director of Nursing interviews Ann and also reviews last week's nursing assignments for the residents in order to determine who may have been exposed. During the interview, Ann recalls helping Charly with dinner but does not recall her brief but direct contact with Betty.

Referring next to FIGS. 6 through 9 in conjunction with FIGS. 1 and 3, use of the wearable electronic device 100 to overcome the shortcomings of the conventional contact tracing of FIGS. 5A through 5D is shown. In particular, by automating the contact tracing process, large teams of people, along with the concomitant potential for missed or incorrectly assessing a potential disease-spreading scenario are reduced or avoided. In this way, the accuracy with which contact tracing, proximity monitoring and hotspot detection on an infected person $P_I$ (such as Ann from the example discussed in conjunction with FIGS. 5A through 5D) is shown. In one form, it is important to keep data associated with the potentially infected person $P_{PI}$ confidential and secure, as not all cases identified as being potentially infected are in fact infected. Moreover, in certain circumstances, it may be important to keep data associated with the infected person $P_I$ similarly confidential and secure. One way to determine if an individual is infected is to subject the individual to testing or other procedures. Upon testing and the attainment of certain metrics (some of which may be determined by the machine learning models and analysis discussed herein), the potentially infected person $P_{PI}$ may be labeled or otherwise identified as testing positive and thus designated as an infected person $P_I$. In any event, all individuals who have been tested may be given a digital signature 600.

Figure 6:
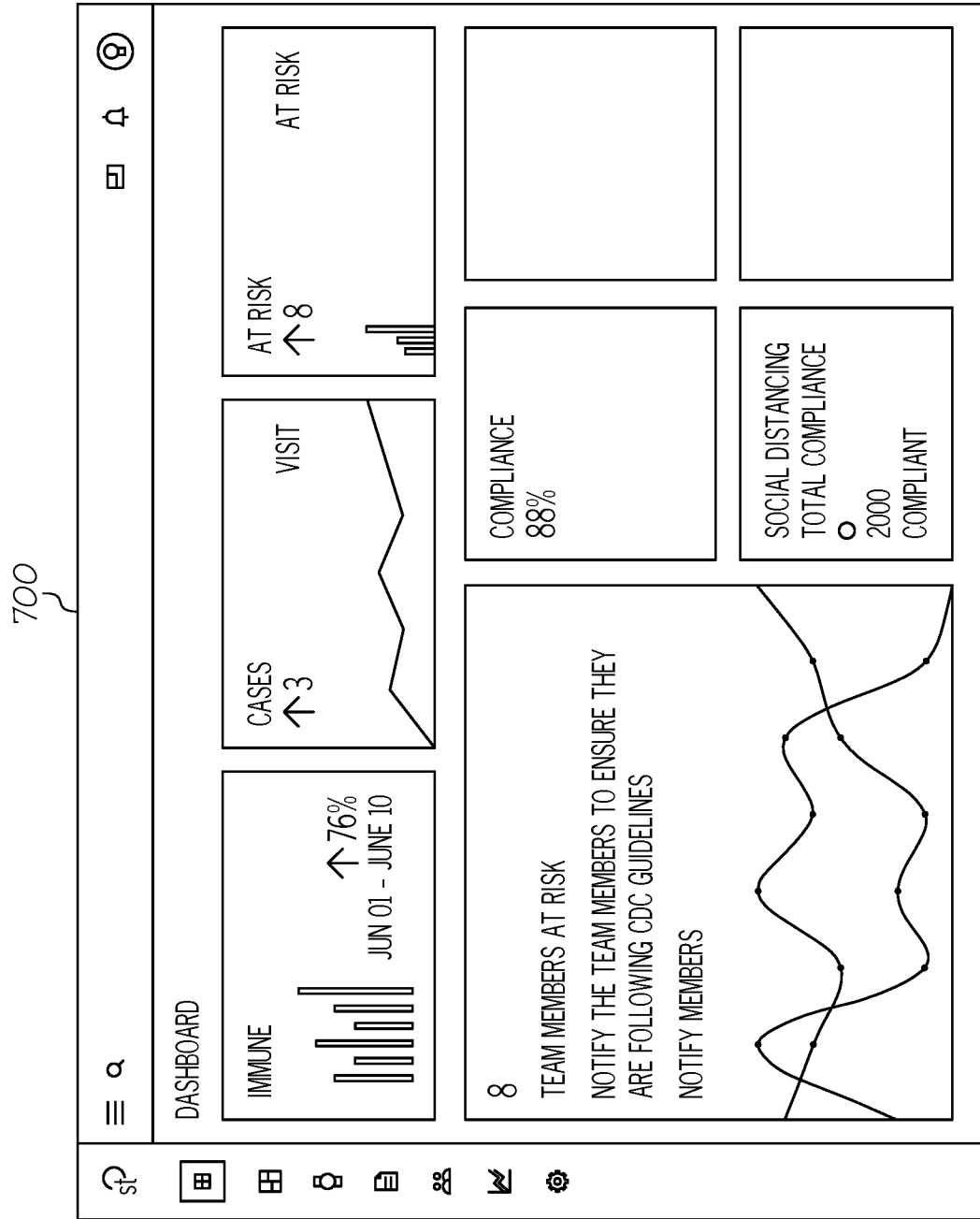
FIG. 6 depicts a notional dashboard used with the PAN disclosed herein to provide organization management for persons who may be at elevated risk of potential exposure to a contagious disease.

Referring with particularity to FIG. 6, a dashboard 700 may be used to provide displayed-based information of an event or analysis (including machine learning analysis) of an event. In one form, the dashboard 700 is configured as a web-based enterprise dashboard that can be customized (such as for a system administrator) to better manage devices, users, reports or the like. In one form, the dashboard 700 may be used for registration functions, including configuring an event-based registration such that attributes associated with people, locations, timing, incidents, adjacent environment and related content for a particular situation may be collected, recorded and categorized so that profiles may be generated for subsequent use. In one form, the dashboard 700 may be used to provide user-defined rules for the detection, proximity monitoring, contact tracing and hotspot monitoring discussed herein. In this way, when a disease outbreak occurs within a local community, the system 1 automatically generates a report of all individual that were within certain criteria thresholds such as one or more of minimum distancing, duration or the like.

Figure 7:
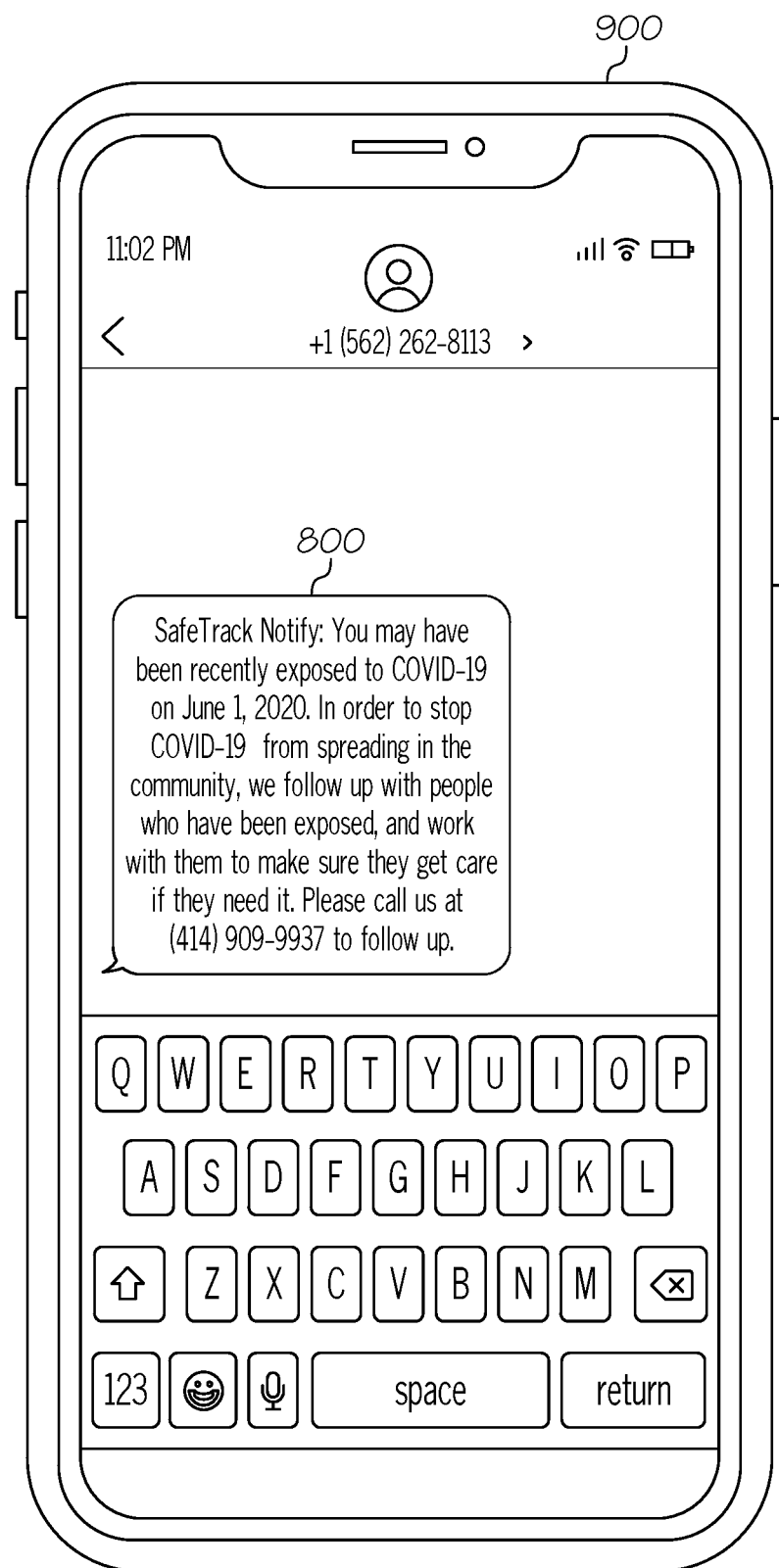
FIG. 7 depicts a notional display such as a mobile phone screen and that is used with the PAN disclosed herein to provide a notification to the one viewing the display that they may be at elevated risk of potential exposure to a contagious disease.

Referring with particularly to FIG. 7, a contact report 800 may be generated and sent to the display device 900 (such as a mobile phone screen or the like) for viewing. In one form, the dashboard 700 of FIG. 6 may be used to help configure information provided to the display device 900. For example, if the display device 900 is an employee's mobile telephone, a mobile API can be used to work in conjunction with the dashboard 700 to provide employee access to risk levels based on identified interactions, analyze past interactions, provide testing resources, healthcare provider contact information or the like. In one form, the report can be run for a specific case or group of contacts. The report 800 can be made to connect with an electronic medical record (EMR) or a case management software. The report 800 may also aggregate or display information from a nearby public health authority (PHA) or related organization that is tracking the spread of particular disease. In this way, once a case of an identified or identifiable disease occurs, the system 1 can automatically notify all close contacts through e-mail, SMS, texts, telephone calls or the like. In one form, additional functionality such as periodic check-ins with the infected person $P_I$, visitor management or the like is also provided.

Referring with particularly to FIG. 8, the contact report 800 may be in the form of a notification 810 that may be generated and sent to the display device 900 that is presently within the infected person's PAN P. In one form, the same display device 900 may receive the message if such display device 900 was determined to have been within the infected person's PAN P of the infected person $P_I$ within a preset prior time frame. In one form, use of one or more of the wearable electronic device 100, system 1 and PAN P automatically identifies direct contacts, close contacts and proximate contacts. By way of example in a healthcare facility context where nurses and other employees that are expected to have interaction with patients or residents have access to the information being generated by such wearable electronic device 100, system 1 and PAN P, such information may be used to allow the nurse or other employee to quickly generate the contact report 800 or its associated notification 810.

Figure 9:
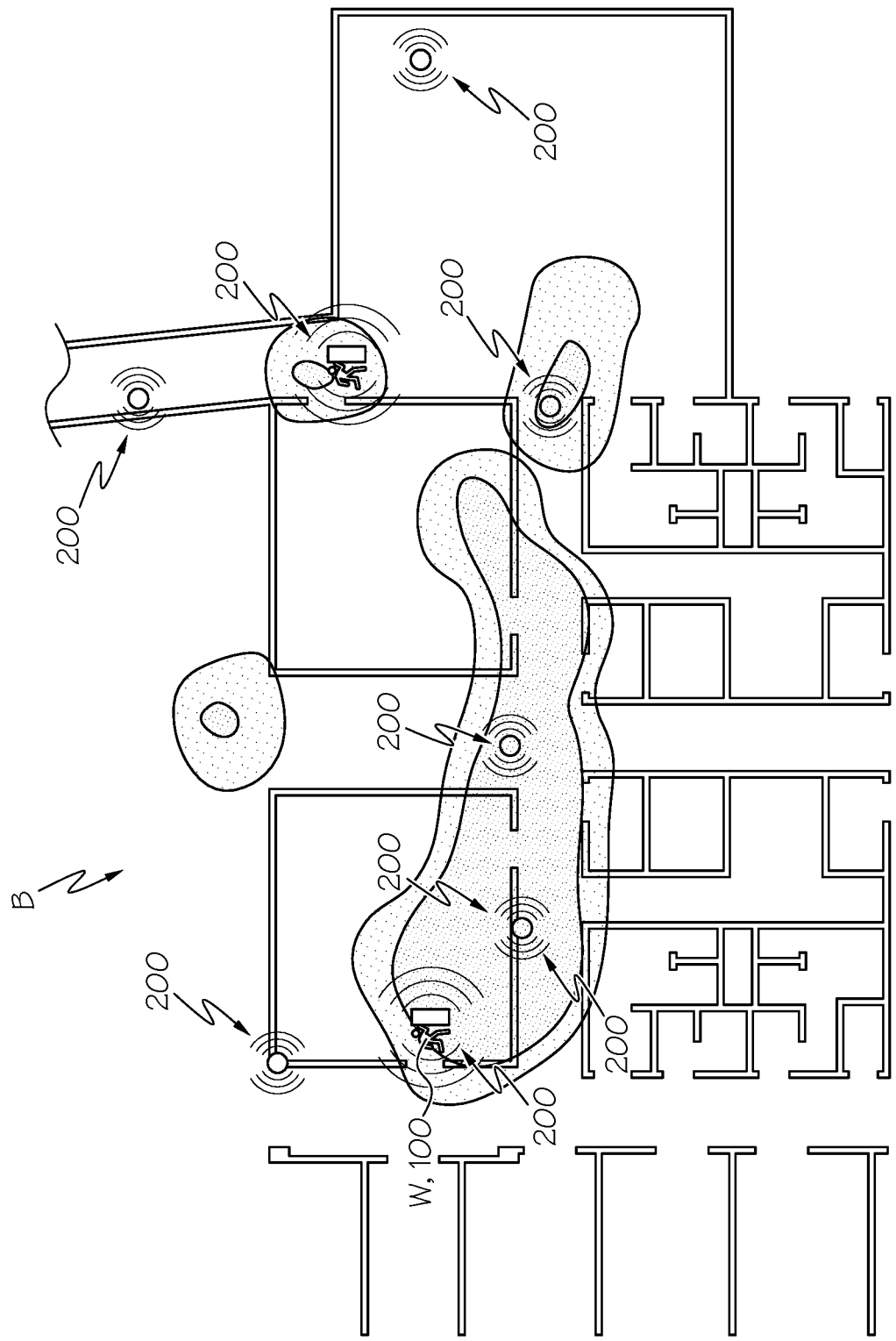
FIG. 9 discloses a room-based indoor tracking within a multi-room building where both point-of-departure warnings and color-coded representations of locations within the building of an individual that is being monitored with the wearable electronic device of FIG. 2.

Referring with particularity to FIG. 9, a thermal map hot-spot is shown overlaid on a multi-room building B. This shows the frequency with which a wearer W that is associated with the wearable electronic device 100 spends in a particular location, where such amount can be one or both of an aggregate of the number of times the individual visits a particular location as well as the amount of time (for example, in seconds, minutes or hours) spent in such location. For example, if the location is indicated to be a bathroom, and sensor data additionally acquires movements consistent with tooth brushing (such as turning on a water faucet, reaching for a toothbrush or toothpaste, and repeated small movements adjacent the individual's mouth), an inference can be drawn that the individual is brushing his or her teeth. In another form, if certain devices within the building B are configured with IoT capability (such as a smart toothbrush, to continue the present example) such that they can form one or more of the peripheral nodes 200, the wearable electronic device 100 and is associated PAN P can sense such data and proceed accordingly. It will be appreciated that such ability to acquire an individual's movement and location data is particularly helpful when other sources of wireless signal transmission (such as WiFi) are not available due to location, signal blockage, depth below ground or thickness of the building B or the like.

Referring next to FIG. 10, a flow diagram of how the wearable electronic device 100 and the data acquired therefrom may be used to develop a machine learning model. In one form, the machine learning model and related algorithms and approaches disclosed herein may be part of a larger endeavor known as human-in-the-loop (HITL) learning where additional insights gleaned from the human labeling or annotation of at least a portion of the data is used along with subsequent (often empirically-based or experienced-based) validation, particularly during training and associated testing activities.

In particular, the flow diagram forms a program structure in that it is depicted as an ordered sequence of particular and tangible steps associated with the previously-mentioned machine learning workflow 1000. In one form, this ordered sequence may be used to provide predictive analytics to assist in contact tracing or related diagnoses as discussed herein. This sequence may include one or more of the following steps: (1) a raw data acquisition (first) step 1100; (2) a raw data cleansing or preprocessing (second) step 1200; (3) a feature extraction (third) step 1300 of derived values which may include placing the data into feature vector or related form; (4) a training (fourth) step 1400 for iterating the machine learning algorithm through testing, calibration or (in the case of HITL) additional insights gained from human experience or other observations; and (5) a model use or (fifth) step 1500 with which to operate the trained machine learning model on some or all of the acquired data in order to draw inferences from such acquired data. It will be appreciated that the first three steps 1100, 1200, 1300, as the data management portion of the machine learning workflow 1000, may be performed independently—as well as part of—the training step 1400 and inference step 1500 for any particular machine learning-based analysis. Likewise, some or all of these steps may be performed on a remote computing platform, where at least the first, second, third and fifth steps may be performed either on the wearable electronic device 100, and that all such variants are within the scope of the present disclosure. In one form, the process of converting data that is taken from sensors $S_1$, $S_2$, $S_3$ . . . $S_n$ into a form suitable for use in a machine learning algorithm may form part of an activity known as extraction, transformation and loading (ETL) that may make up part of the previously-discussed second and third steps 1200, 1300 of the machine learning workflow 1000. Within the present context, ETL may be used to decompose multi-sensor data into a suitable feature vector within a given feature space.

The use of the information generated by collection of sensed data (such as the aforementioned LEAP data, including data acquired by the various sensors $S_1$ . . . $S_n$) by the wearable electronic device 100 and PAN P may be done in a spatio-temporal way that helps to better perform a time series analysis to in turn better identify the likelihood of spread of a communicable disease. In one form, the time series nature of the acquired data (for example, ambulatory data) can be subjected to predictive analytics (including analytics arising out of the use of one or more of the machine learning models discussed herein) as a way to predict or otherwise forecast arbitrary future location, activities or behaviors.

Such temporal data may include—in addition to time stamping—frequency of occurrence, duration of occurrence, elapsed time between occurrences, running averages of occurrences or the like. In one form, the measurement of the temporal data helps in establishing norms, such as those that may form part of an inter-patient or intra-patient baseline data. This indexing of the data over the time dimension is valuable in helping to identify movement traits, patterns or the like that in turn may be correlated to interactions with other people and which may bring to bear additional data for the determination of a possible spreading event. As with other forms of acquired data, the temporal data may be subjected to a feature extraction process (such as included in step three of the machine learning workflow 1000) in order to allow comparison of potentially disparate pieces of information. For example, because various activities $S_1$, $S_2$, $S_3$ . . . $S_n$, it may be beneficial to recognize such activities over one or more time-sampled sliding windows. Because the received data is unlikely to be identical (even for the same individual performing the same activity), it may be helpful to use statistical or structural filters in order to transform the raw data into a set of feature vectors for each given window.

Figure 11:
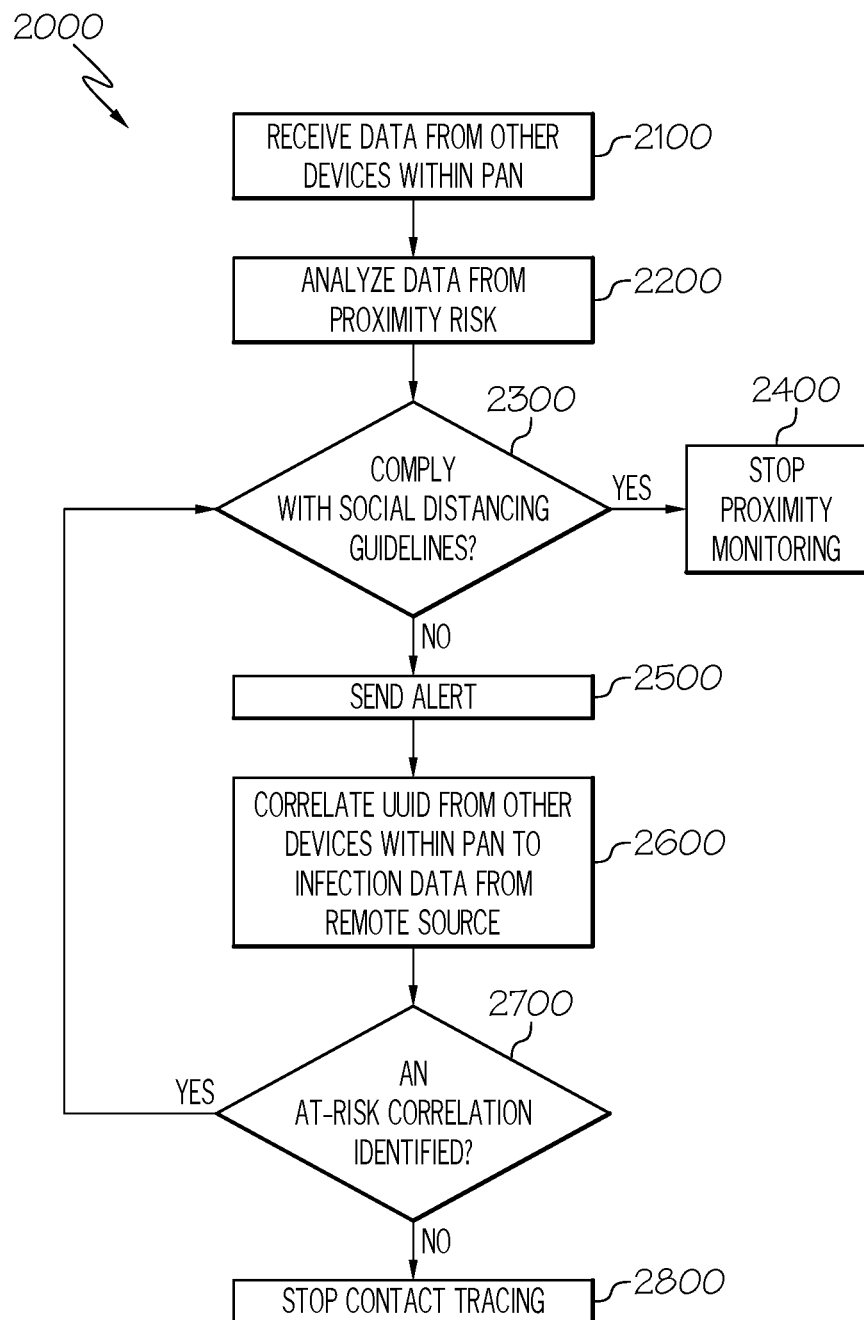
FIG. 11 depicts a program structure in the form of a flow diagram of how to perform at least one of contact tracing, proximity monitoring and hotspot detection.

Referring next to FIG. 11, a program structure 2000 in the form of a flow diagram of how to perform at least one of contact tracing, proximity monitoring and hotspot detection is shown. Although not shown, it will be appreciated that the geofence G of FIG. 3 may be set up in addition to—or in place of—one or more of these functionalities. In one exemplary form, the flow diagram forms the program structure 2000 while various arrays (including multidimensional arrays) of event data, linked lists, trees or the like form data structures. Both of these forms of structures constitute specific, tangible features or elements that may recited in one or more of the claims and that help to illustrate the architecture and operation of the various forms of the wearable electronic device 100, PAN P and system 1. Thus, by describing the various computer software elements in conjunction with the various functional activities that are depicted in the flow diagram of FIG. 11 (as well as all related flow diagrams that are not presently shown but that correspond to particular contact tracing, proximity monitoring, hotspot identification or geofencing activities as discussed herein), the machine code 173E cooperates with one or both of the processor 173A and memory 173B to perform a set of particular manipulations of the acquired event data (including its LEAP data variants) to constrain the operation of one or both of the wearable electronic device 100, PAN P and system 1 in a particular way for the purposes of identifying patterns that may be useful in preventing the spread of a communicable disease.

Initially, event data is received from one or more of the peripheral nodes 200 (which may correspond to one or more devices associated with, carried by or worn by other people) into the wearable electronic device 100, this is shown as event 2100. Second, proximity risk data may be analyzed based at least in part on location data that corresponds to a distance between the wearable electronic device 100 and the peripheral node (or nodes) 200, this is shown as event 2200. Next, an inquiry may be made in event 2300 may be generated to determine if social distancing guidelines are satisfied by the proximity risk data. In the event that such distancing guidelines are satisfied, no further proximity monitoring may be needed, as shown in event 2400, while event 2500 shows that an alert be sent in the event that social distancing guidelines are not satisfied by the proximity risk data. Event 2600 includes correlating information that uniquely identifies particular ones of the peripheral nodes 200 to infection data (such as that from the cloud 500 or other remote database) in order to determine at event 2700 whether or not a contact risk has been confirmed. Depending on whether there is or is not a risk determines whether the inquiry returns to event 2300 or terminates at event 2800).

In one particular form (not shown) of the program structure 2000, a method of contact tracing may include configuring a wearable electronic device to form a source node for a personal area network, determining, by the wearable electronic device, if at least one peripheral node is within wireless signal communication of the personal area network, acquiring, by the wearable electronic device, event data that is being transmitted thereto from the at the least one peripheral node, wirelessly transmitting, by the wearable electronic device, at least a portion of the acquired event data to a receiver using an LPWAN that is enabled by the wireless communication module, wirelessly receiving over the LPWAN, by the wearable electronic device, information pertaining to a first individual, correlating, by the wearable electronic device, the information pertaining to the first individual to the at least one peripheral device and in the event that the correlation establishes a positive match, informing, by the wearable electronic device, a second individual that such second individual is at risk of being exposed to a communicable disease.

As previously discussed in conjunction with FIG. 1, the wireless signal connectivity between the wearable electronic device 100 that forms the PAN P may be used to form a geofence G, including either of the aforementioned static or dynamic variants. As noted, geofence G may be used to perform zone or proximity monitoring so that when the wearable electronic device 100 enters or exits a designated region that is defined by the geofence G or is within a preset distance of certain signally-cooperative components, signal communication between the wearable electronic device 100 and such components is enabled. In one form, this dynamic interaction takes places when the wearable electronic device 100 is affixed to the wearer W such that his or her movement patterns may be made to coincide with the geofence G. As will be apparent from FIGS. 1 and 3, proximity data related to the geofence G flows from the wearable electronic device 100 through an LPWAN-based protocol and gateway 300 and associated backhaul such as the servers 400 or cloud 500 to these or other remote locations for collection, storage, analysis, visualization or the like.

Moreover, and as previously mentioned, the wearable electronic device 100 may take on various form factors, depending on to whom or what it is to be affixed, attached, secured or otherwise associated. Likewise, as discussed herein, in some embodiments or configurations, the wearable electronic device 100 may take on various form factors that are unrelated to those affixed to or otherwise associated with a human wearer W, and as such may be either stationary or mobile so long as it remains in signal communication through its multimodal wireless functionality with such machinery, equipment, device or other asset. Thus, there may be numerous wearable electronic devices 100 in service simultaneously within a particular industrial setting (such as the PAN P among others, as will be discussed in more detail as follows) such that one or more may be worn by respective wearers W as mobile form factors while others are affixed or otherwise secured to a particular piece of machinery or equipment as a static or stationary form factor. It will be appreciated that in some embodiments where the wearable electronic device 100 is affixed or otherwise situated on or near a particular industrial asset, it may assume a non-wearable form, including those with supplemental means with which to affix it to such asset. Such supplemental means may include adhesives, fasteners or other related and known approaches. In such form factors, each is still referred to as the wearable electronic device 100 notwithstanding that it is not actually worn by an individual.

Referring next to FIGS. 12 through 18, it is with the foregoing in mind that the authors of the present disclosure have discovered that it is helpful to define secure, objective criteria by which individual workers, managers, safety compliance or other interested personnel associated with the industrial setting can make a data-informed determination about when it is safe for individual workers (such as service technicians or the like) to gain access to various industrial assets, including those within or that make up a hazard-prone environment (HPE) 3000 where—among others— excessive risks of bodily harm (such as due to mechanized equipment), toxic exposure (whether gaseous, liquid, powder or the like), electrical shock or unavailability of breathable air may be present.

Figure 12:
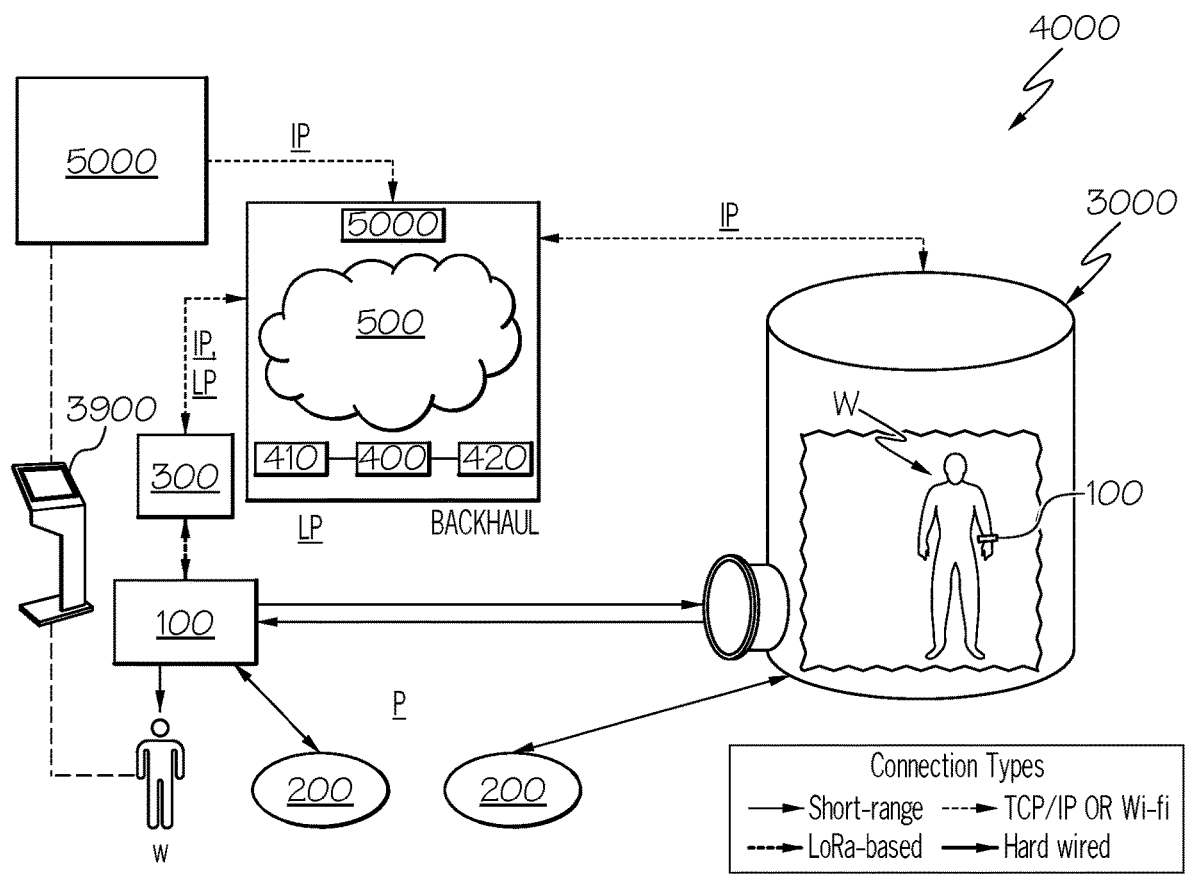
FIG. 12 depicts an embodiment of a system architecture for the communication network that is configured to operate with the wearable electronic device of FIGS. 1 and 2 on a hazard-prone environment.

Referring with particularity to FIG. 12, a communication network 4000 formed by the wearable electronic device 100 of FIG. 2 is particularly advantageous in situations within an industrial setting where a worker is placed in the HPE 3000. In a similar manner, remote monitoring through the communication network 4000 is particularly useful in situations where connected devices or nodes (shown presently as sensors $S_1$, $S_2$, $S_3$ . . . $S_n$ in a manner similar to those previously described) that are in signal communication through the PAN P are equally inaccessible, as well as in situations involving other connected devices that don't require hands-on human interaction for their normal operation. It will be appreciated that in situations such as these, the beacons as discussed herein may be affixed or otherwise placed adjacent (that is to say, in, on or next to) such HPE 3000, such as shown with particularity in FIG. 13. In one form, the beacons such as the sensors $S_1$, $S_2$, $S_3$ . . . $S_n$ and related peripheral nodes 200 are so-called IoT-compatible "smart" devices that may possess optional embedded data processing and other so-called "intelligent" functionality) and may be configured as either mobile or stationary devices, depending on the role they play in data gathering within the HPE 3000.

Industries where the communication network 4000 is particularly useful include construction, manufacturing, oil & gas, mining, pharmaceuticals, food and beverage, automotive, aviation, railroads and utilities. Relatedly, examples of industrial settings where such HPEs 3000 may be encountered include those associated with chemical or nuclear processing equipment, mining and related mineral extraction, oil & gas (including one or more of extraction, refining, transportation or storage, as well as offshore oil platforms) or related energy production facilities (including electric power utilities and related grid electric demand management), steel plants, automobile assembly lines, wastewater treatment facilities, order-fulfillment facilities, scrap metal recycling facilities or the like. It will be appreciated that all of these industries and individual industrial settings, as well as how the HPEs 3000 are used therein, are within the scope of the present disclosure.

In the form shown for the HPE 3000, the sensors $S_1$, $S_2$, $S_3$ . . . $S_n$ or other peripheral devices may be configured to detect one or more gases such as carbon monoxide (CO), hydrogen sulfide ($H_2S$), oxygen ($O_2$) deficiency and combustible (LEL) gases, among others. Likewise, for applications in the chemical process industries (CPI), mining or the oil & gas industries, such devices may be configured as other types of portable gas monitors as understood by those skilled in the art. Furthermore, in manufacturing industries, such devices may be configured to detect rotary or reciprocating motion of motors, pumps, fans, compressors or the like. Moreover, such devices may be configured as sensors, detectors, transducers or the like for detecting a physical presence such as flame, metals, leaks, levels or gas and chemicals, among others while—as previously noted— some are configured to sense physical properties such as temperature, pressure, radiation, humidity, sound or the like may be sensed and signally communicated, while still others can detect motion or proximity. In one example, the device is a video camera with computer vision and edge processing capability such that upon detection of one or more events, it could then send the received (and optionally analyzed) signal out as another form, thereby acting as another sensor or signal-generating device. In such case, the camera could detect an event thing with a high degree of confidence, and because it need not be connected to the internet, it can process the received data locally and then report it out. It will be further understood that these and other devices may operate in a variety of manners and upon various measurable quantities selected from various fields such as electromagnetic fields, optics or others, and that sensors so configured are within the scope of the present disclosure.

As previously noted, the communication network 4000 is a wearable electronic device 100-centric network that includes one or more of the PAN P, the IP network IP and the LPWAN LP as sub-networks. In a manner similar to the relationship depicted in FIGS. 1 and 3 between the wearable electronic device 100 and the other devices within the PAN P, wireless signal communication takes place between the wearable electronic device 100 as a source node and data-generating or instruction-receiving peripheral nodes when these other devices are configured as part of a BLE, WiFi, RFID, NFC or related short-range communication functionality protocol. Significantly, the LPWAN LP sub-network acts as the backbone of the communication network 4000 in that it forms the intermediary between the IP network IP as one sub-network and the PAN P as another sub-network through at least one gateway 300 and the wearable electronic device 100 source node. In this way, various forms of registration and credential information (including personal and related identifying data of the wearer W as well as ID token or related UUID of the peripheral nodes or devices or comparable identification of a particular one of the wearable electronic devices 100) are exchanged between the corresponding devices within the communication network 4000 as well as with the facility administration portal 5000. In this way, the combined wearable electronic device 100 device registration and user credentialling process associates the user and the device such that for the purpose of servicing, installation, inspection or related activities that are commensurate with the user's official duties, the user is qualified to work inside a particular HPE 3000 while wearing the device.

It will be appreciated that the present depiction of some or all of the equipment associated with the backhaul (including one or more of the servers 400 and cloud 500) may be part of either a centralized or distributed architecture the latter of which being where the various components may physically reside in disparate locations. Regardless of the physical situs of such equipment, it will be understood that the inclusion or exclusion of one or more pieces of such equipment as being a part of the facility administration portal 5000 will be apparent from the context. Examples of such software include that used for system administration or management, as well as that used for a kiosk 3900 for credentialling a person (for example, a service technician) and associating or otherwise coordinating him or her to a particular one of the wearable electronic devices 100. Thus, in one form, at least some of the data generated at the edge, such as within the wearable electronic device 100 or the PAN P, may be operated without recourse to the facility administration portal 5000. In such edge-related form, data being generated and conveyed may achieved through either the PAN P alone or the PAN P in conjunction with the LPWAN LP-based portion (that is to say, sub-network) of the communication network 4000. It will further be appreciated that control of at least portions of the communication network 4000 or a system working in conjunction therewith may reside in the backhaul. Such control may be effected by local or remote application-based software (including that used to authenticate, authorize and grant access to a user), as well as that to control HMIs, identification and operation of the machines, devices or equipment that make up the HPE 3000 (including safety states or the like), facility-specific rules and procedures (including those specific to lockout/tagout), other guidelines, procedures or regulations (such as those implemented by the United States Occupational Safety & Health Administration (OSHA)), National Fire Protection Association (NFPA, including its Standard NFPA 70E), SIL 3 per IEC 61508-1, the Joint Commission on Accreditation of Healthcare Organizations (JCAHO), the Mine Safety and Health Administration (MSHA) or the like, training, credentialling or related certification, operation of various energy isolating devices and control of parameters associated with operation of the LPWAN protocol (such as controlling one or more of the adaptive characteristics of the wearable electronic device 100), among others.

Figure 13:
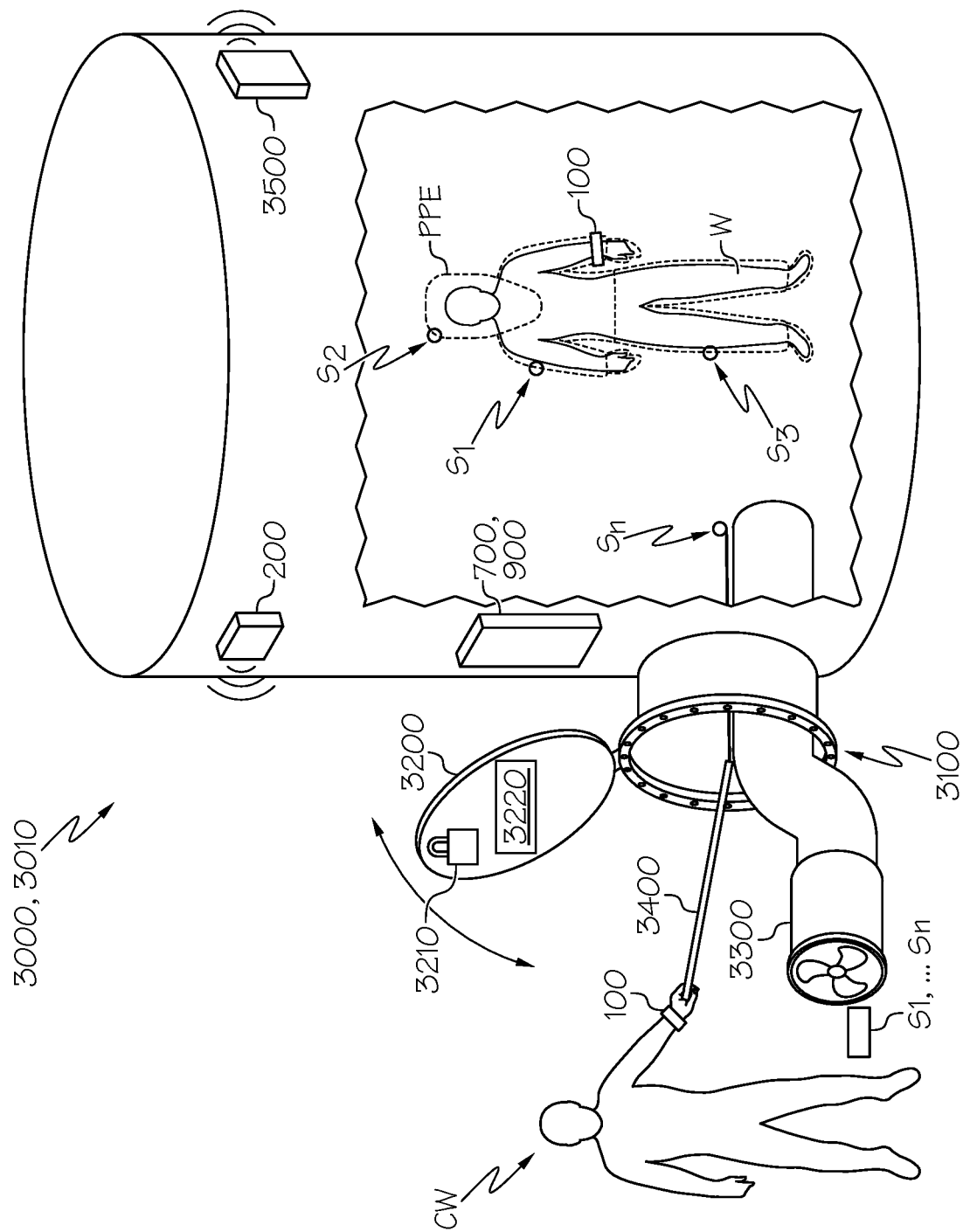
FIG. 13 depicts an embodiment of the hazard-prone environment of FIG. 12 as a confined space where a continuous monitoring process is taking place.

Referring with particularity in FIG. 13, details of the HPE 3000 are shown presently as a confined space (also referred to as a permit defined space, a permit-required confined space or the like) 3010, where a continuous monitoring process of the wearer W who is inside takes place. In one form, the continuous process takes place only after the pre-entry (PE) process (that will be discussed in conjunction with FIG. 16C) has taken place. Within the present disclosure, the confined space (as defined by OSHA) may include tanks, vessels, silos, storage bins, hoppers, vaults, pits, manholes, tunnels, equipment housings, ductwork, pipelines or the like, as well as other situations such as cabinets in server farms, valuable item storage, inventory control or the like where access may be limited such as through cordoned-off or fenced-in areas, individual rooms within a larger space or the like. In addition to having potentially compromised atmospheres, confined spaces 3010 may also be dark, as well as located in out-of-the-way places where response times (in the event of an emergency) could be lengthened. An access portal 3100 that in one form may have a door or related cover 3200 that when closed restricts the passage of the wearer W into or out of the confined space 3010. Within the present disclosure, the door 3200 may be in the form of a door, flap, lid or related structure (including hinged variants of each) as is known to those skilled in the art such that when placed relative to the access portal 3100 in order to block a path therethrough, the latter becomes a covered access portal. A ventilation sub-system 3300 is shown where air or other gas exchange between the inside and outside of the confined space 3010 takes place. An extensible probe, wand or related data-gathering device 3400 may be inserted into the confined space 3010 (such as through the door 3200 or access portal 3100). In one form, the extensible probe 3400 functions as a multi-gas meter such that airborne various toxins and gas levels may be detected. In one form, a so-called "buddy system" may be used such that a co-worker CW may be situated adjacent—but outside—the confined space 3010. As shown, the co-worker CW may use the extensible probe 3400 with which to either continuously or frequently monitor the atmosphere of the confined space without having to subject the co-worker CW to the same potentially hazardous conditions as that of the wearer W. In fact, under OSHA guidelines, atmospheric testing (such as that which may be accomplished by the extensible probe 3400) must be performed in the following order: first for oxygen, second for combustible gases and third for toxic gases and vapors. It is understood that the co-worker CW is monitoring the safety of the confined space 3010, as well as to help if an emergency arises, in addition to calling for backup assistance if necessary. Although not shown, it will be appreciated that other sub-systems that perform supporting or ancillary functions for the confined space 3010 in a manner generally similar to the confined space ventilation sub-system 3300 may also be configured as a peripheral device or end node 200, as may other equipment associated therewith, such as motors, pumps, valves, linear actuators, rotatory actuators, switches or related equipment that would ordinarily be found within the industrial setting. Although not shown, it is understood that such equipment is deemed to be within the scope of the present disclosure. Relatedly, in one form (as shown) the co-worker CW is also equipped with his or her own wearable electronic device 100; in this way, the co-worker CW not only may participate in the PAN P but may also use the wearable electronic device 100 to form a separate PAN P (not shown). In one form, this could enable the co-worker CW to conduct various processing and logic checks before a pre-entry test PE that is similar to that of FIG. 16C is passed.

As shown, the wearer W (who has been granted access) is further wearing appropriate personal protective equipment PPE that itself may include various sensors $S_1, S_2, S_3 \ldots S_n$ or other devices or end nodes 200 such as atmospheric or gas sensors, physiological sensors (such as for heartrate, breathing rate, body temperature or the like) that can have their measured values sent by or to the wearable electronic device 100 (as depicted in FIG. 1) to determine if the values are within an acceptable range. In this way, they are able to collect, measure, detect or receive one or more of health and environmental data that could be processed to show potential health or exposure risks. Likewise, the sensors $S_1, S_2, S_3 \ldots S_n$ or other devices or end nodes 200 may be used to measure the concentration of a flammable gas, measuring an environmental characteristic (sch as temperature) of the surrounding atmosphere. As previously noted, the interior of the confined space 3010 may be dark. In such case, one of the sensors $S_1, S_2, S_3 \ldots S_n$ or other devices or end nodes 200 may be used to detect such darkness such that the wearable electronic device 100 or backhaul may be prompted into turning on a light that is situated on the wearable electronic device 100 or on a signally-cooperative peripheral node within the PAN P) to enable the wearer W to see better. In addition, these or other sensors $S_1, S_2, S_3 \ldots S_n$ or other devices or end nodes 200 in or around the confined space 3010 may also monitor the operational state of certain equipment may be assessed by monitoring components or parameters such as motor, air flow, rotation rate, or other appropriate indica of how well facility-installed ventilation equipment is performing such that alerts, warnings or related notifications may be sent to the wearer W or an attendant designated to monitor the confined space. As with the wearable electronic device 100, the personal protective equipment PPE may be provided by appropriate facility personnel upon completion of the authentication process by the worker such that he or she becomes the wearer W as previously discussed. Upon having been authenticated (as will be discussed in conjunction with the authentication process of FIG. 15A), authorized (as will be discussed in conjunction with the authorization process of FIG. 15B) and passed HPE 3000 logic and pre-entry requirements (as will be discussed in conjunction with the pre-entry test process of FIG. 15C), the wearer W (or his or her co-worker CW in situations where the buddy system is used) sets up and starts the access-granting process (depicted in conjunction with FIGS. 16A and 16B) in order to engage in the continuous monitoring process of FIGS. 13 and 17.

During operation of the communication network 4000, the wearable electronic device 100 receives a message from the confined space ventilation sub-system 3300 indicating that it is operational. The operational state may be assessed by one or more of the sensors $S_1, S_2, S_3 \ldots S_n$ or other devices or end nodes 200 in order to monitor the motor, air flow, rotation rate, current use or other appropriate indica. In this way, if the operational state becomes unacceptable (such as by comparison of the sensed parameters to a database, lookup table or the like), the wearer W (or the co-worker CW) is notified through one or more of the wearable electronic devices 100, lighting (or other similar visual indicia), acoustic alerts (such as a siren or the like) or other forms of messaging. In one form, the extensible probe 3400 is configured as a handheld atmospheric gas meter, while in another its sensing features may be formed in the wearable electronic devices 100 that are being worn by the wearer W and co-worker CW. In one form, the values acquired by the handheld atmospheric gas meter are sent to the wearable electronic device 100 to determine if the values are acceptable to either permit entry (when first approaching the confined space 3010) or continued access within the confined space 3010 by the wearer W. Alternatively, the atmospheric gas meter makes the evaluation and transmits to the wearable electronic device 100 that the atmosphere within the confined space 3010 is either OK or not OK (also, by comparison to known standards or acceptable levels, such as a database, lookup table or the like). If the door 3200 is open and it is further determined that the operational state of the confined space ventilation sub-system 3300 is within acceptable parameters and a gas analysis corresponding to the atmospheric gas meter is OK, then the wearer W receives a message on the wearable electronic device 100 that he or she may enter the confined space 3010. In either event, the wearable electronic device 100 begins periodic monitoring of the various ones of the sensors $S_1$, $S_2$, $S_3$ ... $S_n$ that are worn by the wearer W, either directly or through their being embedded within the personal protective equipment PPE. The door 3200 can respond to a command in order to selectively lock or unlock, such as through an optional access control locking mechanism 3210 that is secured to or otherwise associated with the HPE 3000 in order to allow a user access to the inside of the HPE 3000 once various state-based conditional inquiries (as will be discussed in more detail as follows) are met. In addition, a door sensor 3220 is secured to the door 3200 to provide an indication of whether the door 3200 is opened or closed.

If any of the values of sensors $S_1$, $S_2$, $S_3$ ... $S_n$ that are being monitored by the wearable electronic device 100 are found to be unacceptable, or alternatively are determined to be heading to an unacceptable state in pre-set time, then the wearable electronic device 100 being worn by the wearer W notifies the backhaul of the situation (along with the specific sensor $S_1$, $S_2$, $S_3$ ... $S_n$ value that was unacceptable) so that such value may be recorded, such as for later evaluation or use. In this case, the backhaul notifies the wearable electronic device 100 that is being worn by the co-worker CW whereupon the co-worker CW takes quick action to ensure the safe removal of the wearer W from the confined space 3010. It is understood that in the present context, an unacceptable reading or related measurement includes those that are unavailable after a pre-defined number of values. It is further understood that in the present context, the wearable electronic device 100 that is being worn by the co-worker CW may be configured as either a peripheral node or a source node, depending on where control of the PAN P that is being set up between the source and peripheral nodes is desired. If all of the values of the sensors $S_1$, $S_2$, $S_3$ ... $S_n$ that are being monitored by the wearable electronic device 100 that is being worn by the wearer W are found to be acceptable, then such wearable electronic device 100 may provide suitable visual indicia, as well as transmit the information corresponding to the state or status to the backhaul that in turn may transmit to the co-worker CW.

Within the context of the communication network 4000, the door 3200, locking mechanism 3210, door sensor 3220 and even the confined space 3010 itself may be considered to be peripheral devices, while when coupled to suitable communication functionality become peripheral nodes that may participate in signal exchange within the communication network 4000, as well as be in signal communication with one another within the confined space 3010. Moreover within the context of the confined space 3010, the various components such as the door 3200, locking mechanism 3210 and door sensor 3220 are considered to be associated with the confined space 3010 if they are physically, signally or otherwise cooperative with it, and may include the confined space 3010 itself in configurations where it particularly (rather than or in addition to one of its components) is outfitted with the necessary communication functionality. In this way, when the confined space 3010 has signal connection to other devices such as the backhaul, the wearable electronic device 100 or the like, it will be understood that such connectivity may be either direct or indirect, depending on whether the confined space 3010 is relying upon one or more of the various components associated it and which possesses the necessary wireless communication functionality. It will further be understood that such connectivity will be apparent from the context and that all such variants are deemed to be within the scope of the present disclosure.

Referring with particularity to FIG. 13, an embodiment of a system architecture for the communication network 4000 is shown interacting with the confined space 3010. As with the computer-based features of the wearable electronic device 100 as depicted in FIG. 2, one or more portions of the backhaul (whether the servers 400, cloud 500, facility administration portal 5000 or other portions) include computer system functionality for implementing the various processes described herein. Such a system includes one or more processors and corresponding non-transitory computer readable medium (such as random access memory or read only memory) that are connected to one or more bus structures (such as system bus, local bus or the like), communication through input/output devices, mass storage (such as hard disk drives or removable media storage devices in the form of flash drives, DVD-ROM drives, CD-ROM drives, floppy drives or the like) and a network adapter or related interface controller. In addition, executable instructions (which may be stored in the non-transitory computer readable medium in the form of machine code that is predefined to perform a specific task in that it is taken from a machine language instruction set known as the native instruction set that may be part of a shared library or related non-volatile memory that is specific to the implementation of the one or more processor and their particular Instruction Set Architecture (ISA) such that the ISA acts as an interface between the hardware of the processors and the system or application software through the implementation of the machine code that is predefined within the ISA. It will be appreciated that the machine code configured to perform the various algorithmic and related computations of the communication network 4000 imparts structure to the successive architectures of processors, as well as the computer system of the backhaul, specifically in the form of a program structure that may be made up of a set of one or more individual codes.

In addition, it can be seen that the wearable electronic device 100 forms the basis of a communication network 4000 for use within the industrial setting. In such a configuration, the communication network 4000 may include numerous sub-networks. One such sub-network is the aforementioned PAN P that is controlled by the wearable electronic device 100 to communicate with various peripheral nodes through a short-range wireless communication protocol (such as the aforementioned RFID, BLE or the like). As will be discussed in more detail as follows, the signals in such a sub-network contain at least one of beacon data corresponding to identification of the devices throughout the PAN P, event data and personal data corresponding to the wearer W that is associated with the wearable electronic device 100. At this juncture, it is noted that while the terms "user", "worker", "individual" and "wearer" are used interchangeably, some context-specific delineation is helpful in understanding various states that are discussed in more detail in conjunction with FIGS. 14 and 15. In particular, a worker is the person (for example, a service technician) who requires access to a particular confined space 3010, the wearer W is what the worker becomes after having been associated with a particular wearable electronic device 100 through an authentication process for registration and credentialling (that is to say, at least one of entry and determination of the worker's access level), and an authorized wearer is what the wearer W becomes when he or she are proximate to the confined space 3010 and his or her access level is equal to or greater than that required to work within. Another sub-network is the aforementioned LPWAN LP that is controlled by the wearable electronic device 100 to wirelessly communicate signals between it and the backhaul through the gateway 300, while an internet protocol IP acts as a third sub-network between the LPWAN LP sub-network and the backhaul that is made up of one or more of the servers 400, internet I and cloud 500 and the facility administration portal 5000. As previously noted, the cloud 500 may exist in both internet I and intranet form. It will be understood that both forms may extend to the other parts of the backhaul as well. Within the present disclosure, the identification of the devices within not just the PAN P sub-network but either of the other two sub-networks can be in any known manner, such as through the QUID, uniform resource identifier (URI), object identifier (OID) or even through a facility-specific device identifier information data such as that which has been assigned through the facility administration portal 5000.

As previously noted, the PAN P collects data from nearby sensors or other of the aforementioned peripheral devices and then—depending on where the processing and analysis of such data takes place—wirelessly sends a portion of the data to a remote location through the wearable electronic device 100. Within the industrial context, such other peripheral devices may include one or more of component-specific sensors, commanded actuators or the like that are used in the service of a particular machine or process within an industrial setting. When such peripheral device also includes a beacon or other communication function, such as through BLE or other short-range wireless communication protocols as discussed herein, it becomes a peripheral node. In this way, it will be understood that in order for data to flow wirelessly from a peripheral device (such as a sensor, controller or the like) to a source within the PAN P, as well as to another location within the communication network 4000, such peripheral device must either include its own wireless peripheral node communication functionality or be in signal communication (such as through a wired connection) to a peripheral node that in turn may make its own wireless connectivity. By way of example, various forms of the sensors $S_1$, $S_2$, $S_3$ . . . $S_n$ or other devices that were collectively referred to as peripheral nodes or end nodes 200 in FIG. 1 may be attached, secured or otherwise made cooperative with the confined space 3010 or other components such the resulting assembly or related structure becomes—subject to also having the necessary communication functionality—one or more additional peripheral devices or nodes, particularly industrial peripheral devices or nodes. Of course, in situations where these various components can function as peripheral nodes, their inherent communication functionality allows them to be part of a distributed architecture that physically reside in disparate locations. In this way, attributes (such as identifications, access requirements or the like) of such a peripheral device may reside in the servers 400, cloud 500 or other parts of the backhaul. It will be understood that certain peripheral devices (such as various controllers) may also or alternatively exhibit wired connection functionality through a portion of its signal flowpath for messages being sent by it to the source node within the PAN P. For example, in situations such as that depicted in FIGS. 16A and 16B (which will be discussed in more detail as follows) where the HPE 3000 (in the general case) and the confined space 3010 (in the particular case shown in FIG. 13) sends a message (either directly or through an optional controller 3500 as shown) to initiate vibration of the wearable electronic device 100, it may be doing so through the internet protocol IP sub-network as a wired ethernet connection to the cloud 500 after which the cloud 500 forwards the message (either wired or wirelessly) to the gateway 300 and then over the LPWAN LP sub-network to the wearable electronic device 100. In one form, the beacon-based signal communication of the peripheral nodes or end nodes 200 only advertise to the wearable electronic device 100 or the controller 3500, although in another form (as shown), such communication can be bidirectional.

As shown, the controller 3500 can be mounted in or on the confined space 3010 in a manner similar to the beacon 200 and the dashboard 700 or display device 900. In one form, signal communication between the interface controller 3500 and sensors $S_1$, $S_2$, $S_3$ . . . $S_n$ or end nodes 200 other components within the confined space 3010 can be through wired connectivity, while in another through wireless connectivity (such as the aforementioned short-range protocol that is associated with the PAN P) and yet in another through a combination of both, such as when signals that are generated either by the controller 3500 or passing through it are then conveyed (such as through the LPWAN LP sub-network portion of the communication network 4000 or a wired (ethernet) connection under the internet protocol IP sub-network) to or from the backhaul. In one form, the controller 3500 and sensors $S_1$, $S_2$, $S_3$ . . . $S_n$ or end nodes 200 may be within the same vicinity, while in another remote from one another (although still within signal range). Moreover, in its capacity as either a mere device or a more comprehensive node (such as one of end nodes 200), the controller 3500 may in one form be embodied on any known system-on-a-chip (SoC) or other open single-board computer architecture (such as those based on Raspberry Pi or the like), while in another as part of a larger controller or related computer-based system (such as in the backhaul).

Significantly, the configuration of the wearable electronic device 100 and its interaction within the architectural framework of the communication network 4000 is such that it can perform various edge-related functions as previously discussed. In this capacity, the wearable electronic device 100 may cooperate with one or more peripheral nodes or peripheral devices (depending on whether such devices are directly or indirectly inclusive of a suitable communication functionality) in order to perform data acquisition, processing, cleansing, and analysis (including machine learning variants) either with or without the need for facility or cloud-based servers, computers or related backhaul, depending on the level of computational needs (in what can colloquially be referred to as thick edge, thin edge and micro edge capability). As previously mentioned, the wearable electronic device 100 may operate either in conjunction with or independent of the PAN P in order provide the communication network 4000 with access-control functionality for the confined space 3010 or the electronic components situated therein. In configurations where the wearable electronic device 100 operates independently (that is to say, it does not rely upon the PAN P in order to communicate with the confined space 3010 or its components), such environment or components would include their own, radio or other communication device along with a corresponding short-range communication protocol (BLE, WiFi, RFID, NFC, Zigbee, 6LoWPAN, IrDa or the like) to ensure compatible wireless communication with that of the first wireless communication sub-module 175A of the wearable electronic device 100 as a way to directly participate in the communication network 4000.

In one particular example, the confined space 3010 may additionally be signal-constricting. In such case, the wearer W may be working in an electromatic isolation space (such as a faraday cage or related metal box where the transmission of RF signals that is needed to provide one or more parameters of interest may be hindered. In a situation such as this, it will be appreciated that a supplemental means (such as through a repeater (not shown)) to achieving signal communication between the region within the cage and a region outside the cage may be used.

In addition to the confined space 3010, other assets (not shown) that may utilize the access control disclosed herein may form the HPE 3000, include—for example—those associated with a chemical production or process line (or portions thereof), an assembly line (or portions thereof) and an electricity production facility (such as a power-generating station or the like). Regardless of the industry, one asset that is frequently encountered when the energy being provided is electrical in nature (that is to say, electric voltage is being provided in order to generate electrical current with which to power such machinery, equipment or assets) is an electrical cabinet. Within the present disclosure, an electrical cabinet is understood to include any enclosure, box, control panel, or related housing for various electronic components, while the industrial setting is understood to include facilities or factories, as well as their related spaces; examples of such settings are those found in industrial titles described by the North American Industry Classification System (NAICS) Code and its respective sub-titles. In addition to the afore-mentioned industrial applications, other such enterprises may include commercial air, marine and ground transportation, mining and related mineral extraction, oil & gas or the like are understood to qualify as industrial settings. In one form, the wearable electronic device 100 and the resulting communication network 4000 that are disclosed herein for selectively granting user access to the electrical cabinet may be used as part of a more comprehensive industrial electrical safety regimen, such as that needed to comply with 29 CFR 1910.333 and related OSHA regulations where organizational measures and technical means are used to prevent harmful and dangerous effects on workers from well-known electrical hazards such as electric current, arcing, static electricity or the like. The electrical cabinet serves to—among other things—provide a centralized access point for circuit breakers, fuses, contactors, control panels, switches, knobs, displays, wiring, controllers, lighting or related electrical or electronic components, provide the ability of authorized users to selectively energize or de-energize connected components or systems, prevent electrical shock to equipment users, as well as to protect the contents from the ambient environment. As is further understood, the various electronic components contained within the electrical cabinet may include both low-voltage and high-voltage devices, and that further distinctions—such as based on whether they operate with or are exposed to low or high voltage will be apparent from the context.

Figure 14:
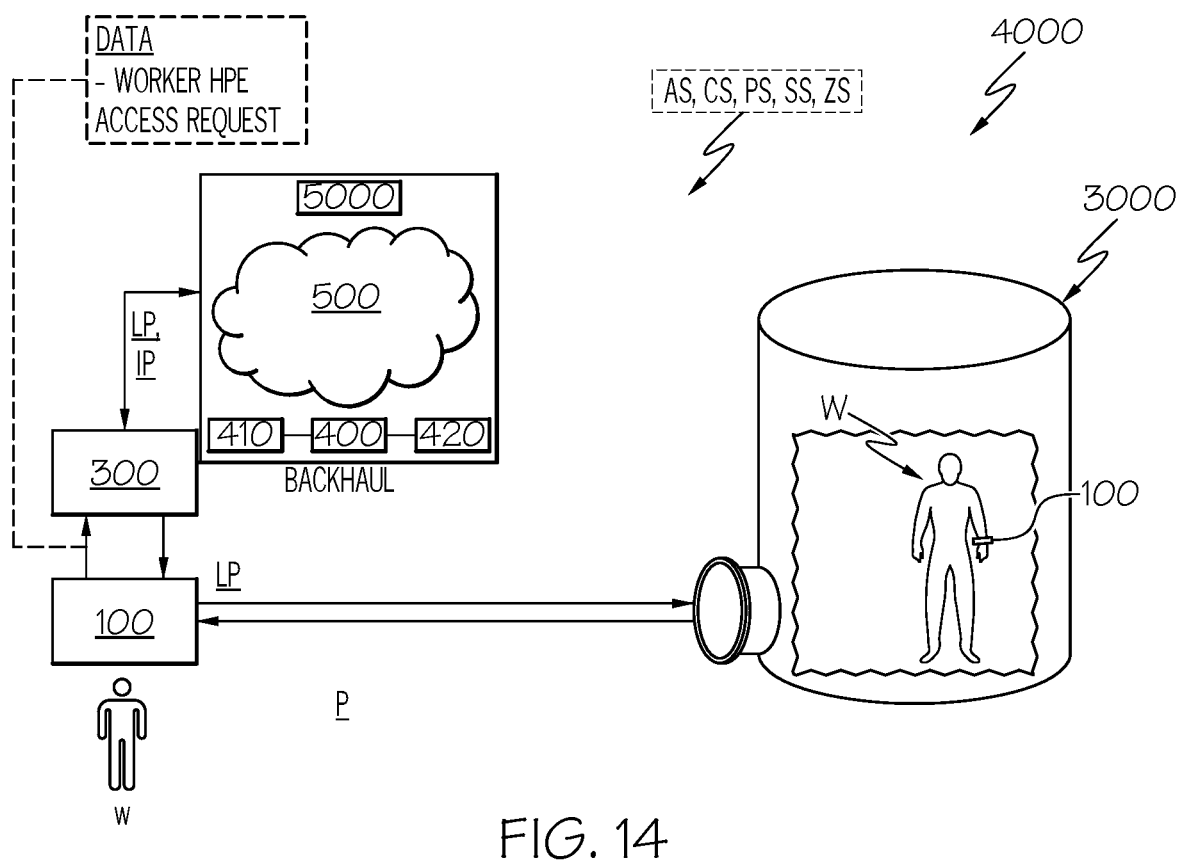
FIG. 14 depicts the various forms of data transmission and system states that take place within the communication network of FIG. 12.

Referring with particularity to FIG. 14, by the cooperation of the three sub-networks depicted in FIG. 12, data collected or generated by the various components may be conveyed through the communication system 4000. The data includes an HPE access request, as well as a resulting granting or denial of such request, whether authorization has been granted, whether a proximate threshold has been met, as well as state-based information including an authentication state AS, a commanded state (also referred to as a manipulated variable) CS, a proximate state PS, one or more sensor states SS and an authorized state ZS. As will be discussed in more detail in conjunction with FIGS. 15A through 15C, this data is used to provide answers to various Boolean-based conditional inquiries that are generated through various processes in order to allow the wearer W access to the HPE 3000. Thus, by algorithmically satisfying each of these inquiries and conveying the corresponding data and instructions through the communication network 4000 to the HPE 3000, one or more individuals may be apprised of whether it is safe to work in such environment and any equipment inside, as well as to gain access thereto. Each of the conditional inquiries leading to such data will be described in more detail after the following description of how event data, device identifier data and personal information data is acquired.

In one form, advanced message queuing protocol (AMQP), message queuing telemetry transport (MQTT), constrained application protocol (CoAP), hypertext markup language (HTML), web sockets or the like may be used as an application layer inter-machine protocol in order to aggregate the data that is being collected from the HPE 3000 and subsequently presented to the facility administration portal 5000 or other interested personnel through devices such as the dashboard 700 of FIG. 6 or on the display device 900 of FIG. 3 where one or both of these devices may optionally be included in the system architecture of the communication network 4000 that is depicted in FIG. 13.

Within the present disclosure, the sensor state SS and the proximate state PS are ascertained through the collection or generation of data by one or more of the connected devices. For example, signals indicative of the sensor state SS may be those acquired by the door 3200, door sensor 3220 or other sensors $S_1$, $S_2$, $S_3$ . . . $S_n$ or end nodes 200, while signals indicative of the proximate state PS—which is used to verify the association between the wearer W and his or her physical location relative to the HPE 3000—is determined by the signal communication between the wearable electronic device 100 and the HPE 3000 using known means, such as an advertised beacon from one or more of the aforementioned short-range protocols, as well as from an image from a camera (not shown) or related computer vision device, radar or ultra-wideband (UWB) in order to verify identity and distance. It will be appreciated that determination of the proximate state PS relative to other pieces of equipment within the industrial setting is also possible, including that for valves, pumps, motors or related process equipment, even if outside of the realm dictated by the HPE 3000. Significantly, the proximate state PS may be determined once or numerous times, as needed. For example, it may first be determined once a wearer W first encounters the HPE 3000 and then re-assessed repeatably until the wearer W has completed his or her task or tasks. Such repeated determination may take place in numerous forms, such as at repeated intervals (for example, every 5 seconds, 10 seconds, 30 seconds or the like), randomly or dynamically the last of which may be based on local operational or environmental changes in or around the HPE 3000 or other component at issue. In another form, such determination may be based on another element within the PAN P triggering such a scan. For example, the wearer W that is within the confined space 3000 gets an unknown reading from one of the sensors $S_1$, $S_2$, $S_3$ ... $S_n$ or end nodes 200 such that an assessment of the state is triggered. Within the present disclosure, the distance that corresponds to the proximate state PS may be thought of as that which is less than or equal to a specified maximum allowable distance (or alternatively, minimum acceptable distance) for the particular component at issue, such as the HPE 3000. In one form, different components within the industrial facility may have their own maximum allowable distance, while in another all locations of a single type (where groups and sub-groups or families of certain equipment types or location types) may have the same maximum allowable distance. In this way, if a wearer W is proximate the desired location, the corresponding Boolean-based logic for such proximate state PS is "yes" or "true". Using the HPE 3000 as a specific example, the proximate state PS may initially be assessed by the wearable electronic device 100 in its capacity as a source node, whereas ongoing proximate state PS determinations are verified by the HPE 3000 through its controllers, such as the controller 3500.

Figure 15A:
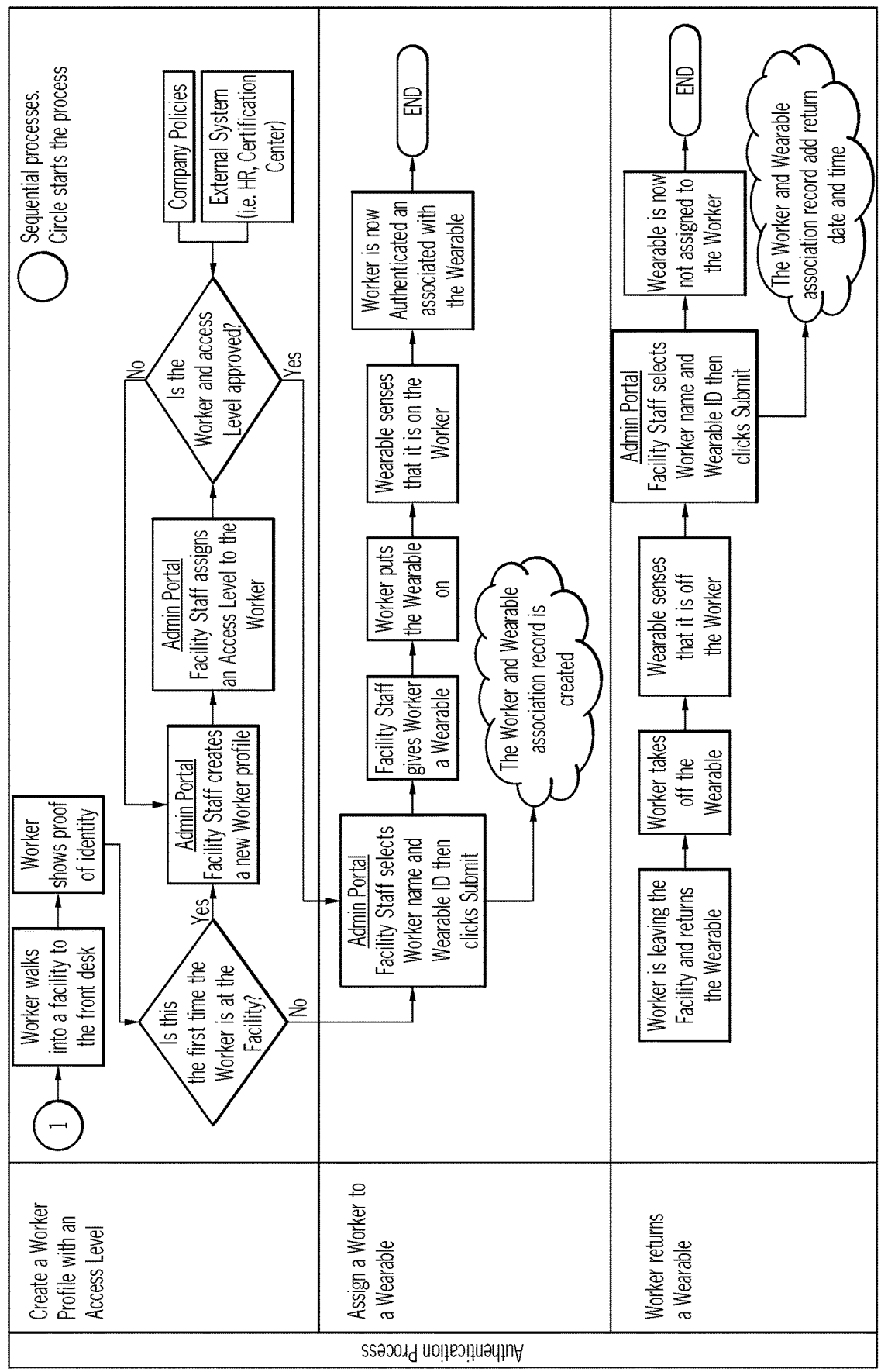
FIG. 15A depicts a program structure in the form of a flowchart for an authentication process that occur within the communication network of FIG. 12 to produce an authentication state.
Figure 15B:
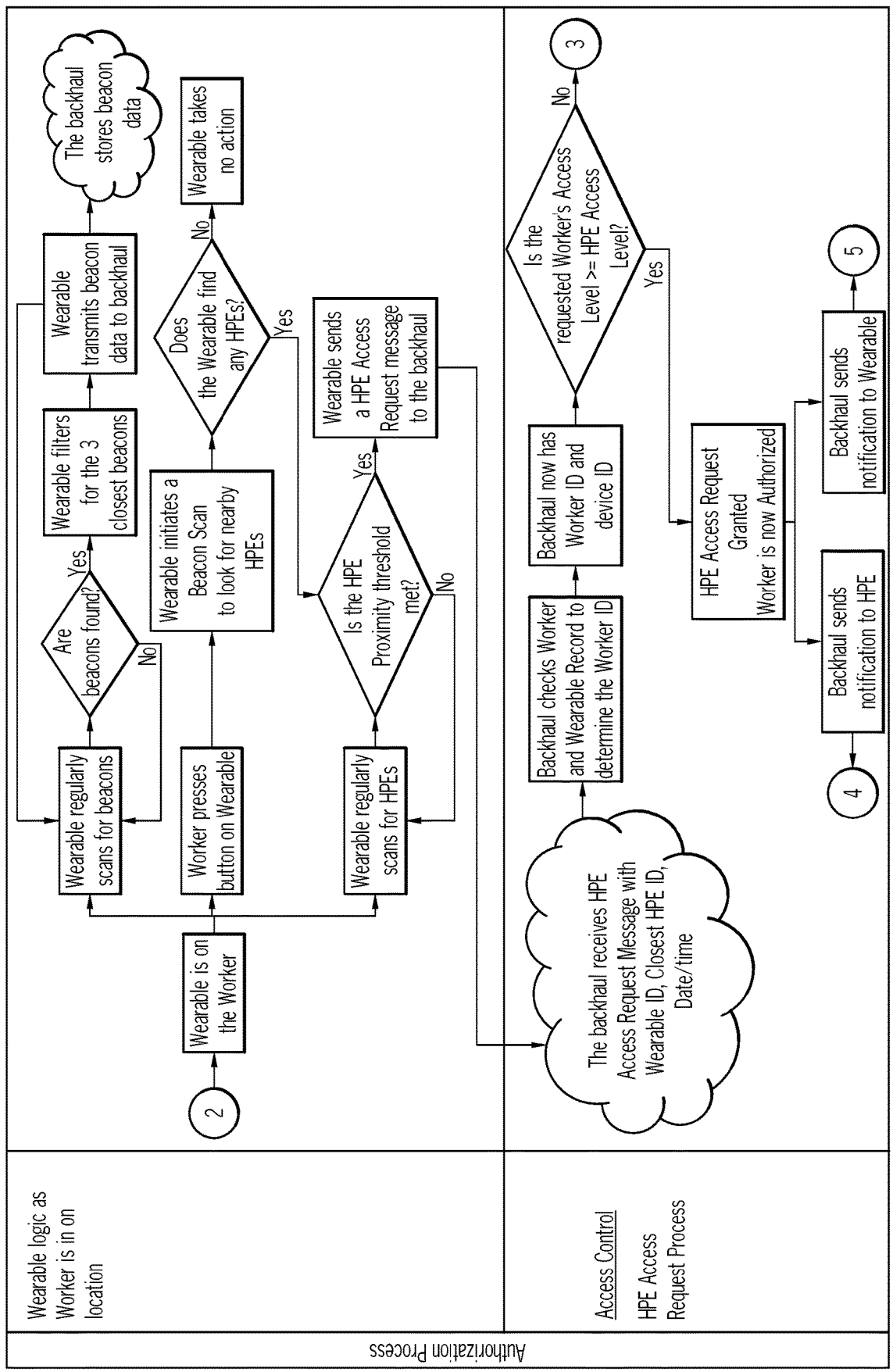
FIG. 15B depicts a program structure in the form of a flowchart for an authorization process that occurs within the communication network of FIG. 12 to produce an authorization state.
Figure 15B:
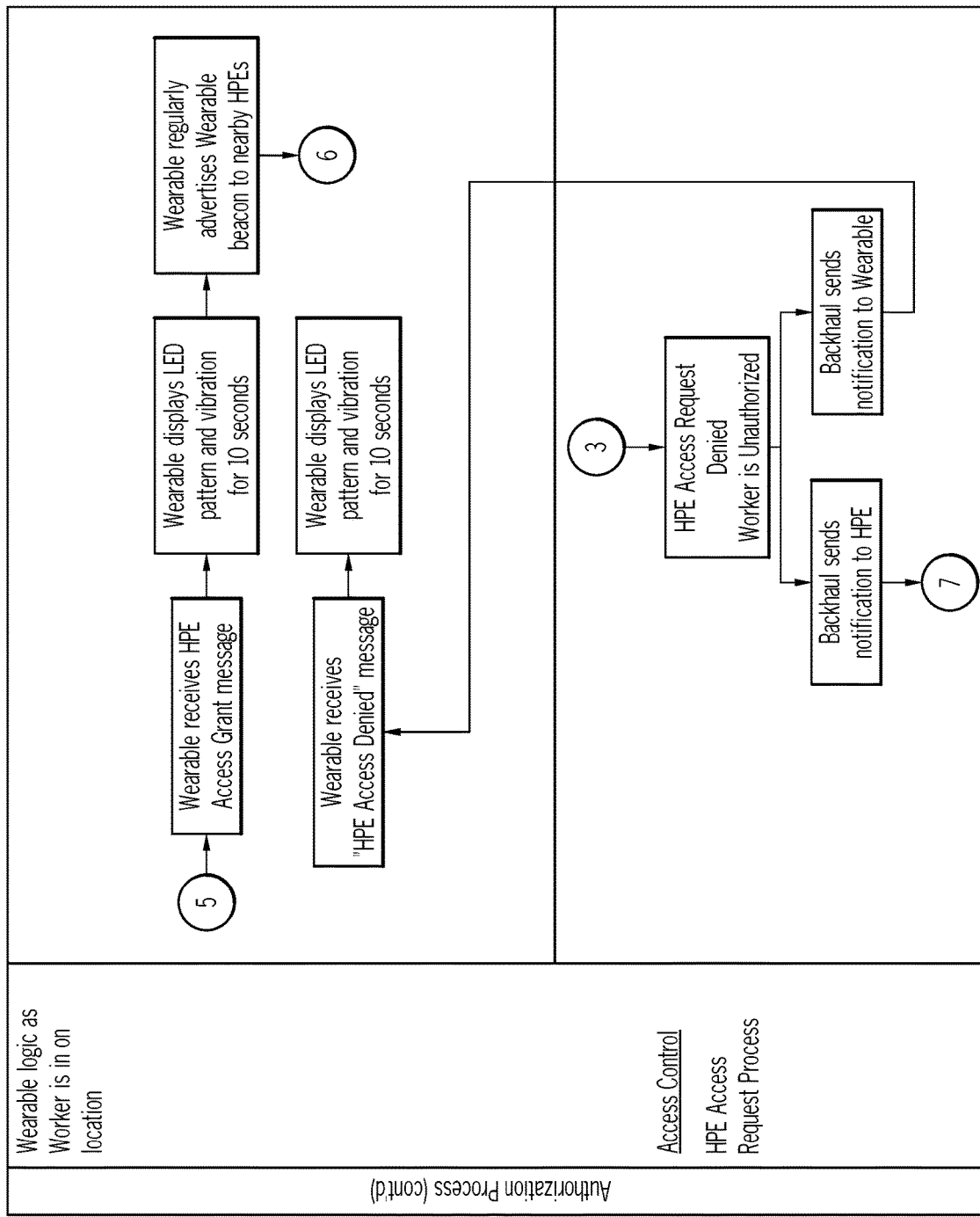
Figure 15C:
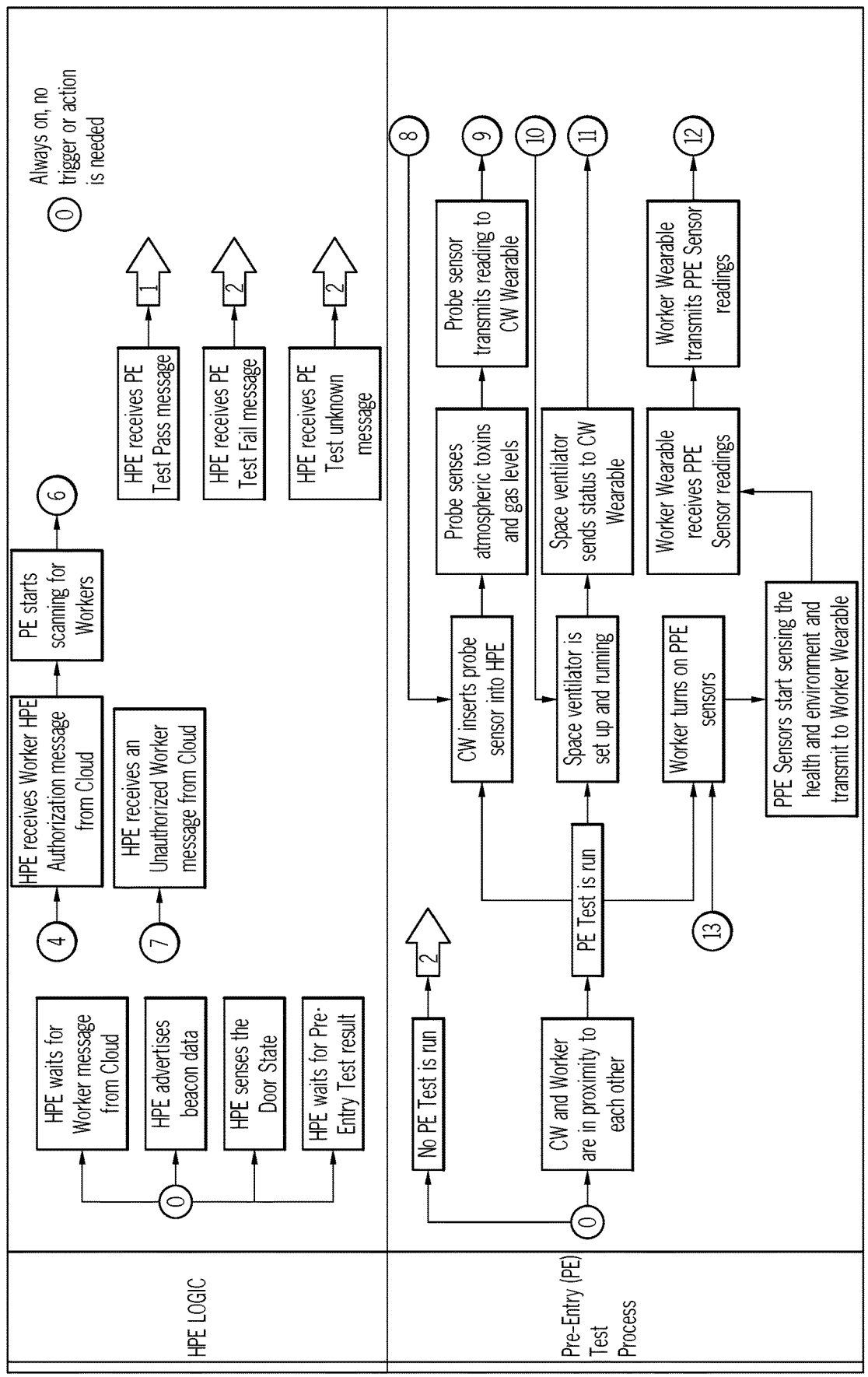
FIG. 15C depicts a program structure in the form of a flowchart for a pre-entry test process that occurs within the communication network of FIG. 12 to produce a sensor state.
Figure 15C:
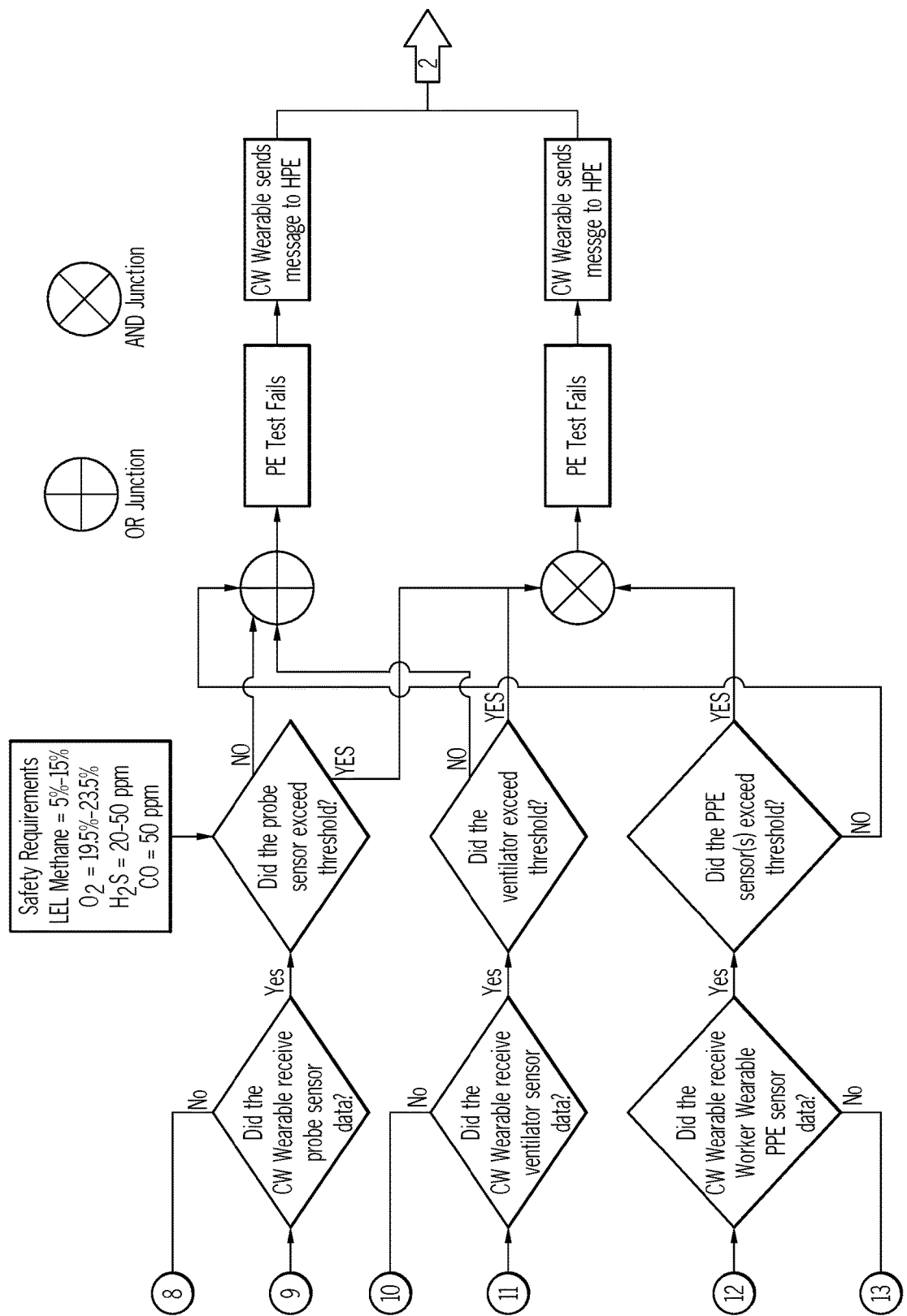

Contrarily, the authentication state AS, commanded state CS and authorized state ZS are algorithmically derived based upon satisfying certain Boolean-like conditional inquiries associated with the processes identified in FIGS. 15A through 15C. It will be appreciated that at least some of these Boolean-like conditional inquiries may be implemented through Boolean-based logic, logic flow charts or other methods. The logical imperatives presently shown form the basis for actions by a controller to provide instructions to the locking mechanism 3210. These imperatives include answers (mostly in the form of Boolean "1s" or "0s", with a couple of exceptions as noted as follows) related to the sensor state SS (for example, of the door 3200), the proximate state PS (such as that which is determined using the short-range communication protocol of the PAN P) and the authorization state ZS, as well as the signals that correspond to notification or related feedback to the wearable electronic device 100. A brief discussion of each of the derived states is as follows.

The commanded state CS pertains to those components within the communication system 4000 and the HPE 3000 in particular that operate in response to an external set of instructions. While FIG. 14 shows with particularity that the locking mechanism 3210 of FIG. 13 is one component that responds to a commanded state CS, it will be appreciated that other components (not shown) similarly connected may include motors, pumps, valves, linear actuators, rotatory actuators or related equipment that would ordinarily be found within the industrial setting in order to control or manipulate the operation of one or more components operating at the behest of the HPE 3000.

The authentication state AS provides answers to conditional inquiries to ensure that proper identity (that is to say, the worker is who he or she says they are) and that such worker is permitted (such as through skill level or the like) to do certain tasks on a specific resource. In one form, it may be subjected to an identity and access management (IAM) system in order to authenticate a worker. In one form, the IAM system, which establishes a framework for allowing the identity management of individuals within an organization in order to ensure secure access to resources for only certain individuals, resides within the facility administration portal 5000 or other parts of the backhaul. In operation, the IAM system assures that the credentials of the worker are either present in the system or (if not) enables the worker to enter such credentials, or have a facility representative enter the credentials into the system (either directly or indirectly the latter of which through a representative within the facility administration portal 5000 on behalf of the worker. In one form, authentication occurs when a worker that has entered the facility and provided the necessary credentials is paired with a particular wearable electronic device 100. Details associated with the authentication state AS will be discussed in more detail with FIG. 15A.

The authorized state ZS ensures that a worker who has been authenticated through the authentication state AS process (and hence is now deemed wearer W) can then be subjected to a backhaul-based access control process in order to request access to a particular HPE 3000 as a precursor to performing a certain task within. Details associated with the authorization state ZS will be discussed in more detail with FIG. 15B.

Referring next to FIGS. 15A through 15C, flowcharts depicting processes used to ascertain the authentication state AS, the authorization state ZS, as well as whether the wearer W will be granted access to the HPE 3000 as a result of these and other states, are shown. As previously discussed, events give rise to various forms of data collection. As such, event data is—as previously mentioned—associated with (that is to say, comes from) either the various peripheral nodes (directly) or peripheral devices (indirectly) to one or more components that make up the communication network 4000. Accordingly, an event is understood to include an occurrence that triggers one more of system operation and data logging functions. In one form, there are two types of events: component events and system events. A component event is a record that indicates a change that has occurred on a particular component (such as the initiation of an absence of voltage test, an opened or closed door state, that the wearable electronic device 100 (which in the interest of brevity is noted as being a Wearable in FIGS. 15A through 17) has been removed from wearer W, as well as others). Contrarily, a system event is a record that indicates a system state change or other operational information of interest examples of which may correspond to the authentication state AS and the authorization state ZS, as well as execution of the commanded state CS. Likewise, an event log is that which records occurrences of events and their type; in one form, these may be implemented in a database, such as in cloud 500 or elsewhere (such as those controlled by the facility). In one form, the event log and event details are shared on a web-based dashboard (such as dashboard 700 of FIG. 6 or the display device 900 of FIG. 7, as well as locally on the confined space 3010 in FIG. 13, such as by mounting in a visible and accessible location) for the co-worker CW or other facility personnel. In such configurations, the dashboard 700, the display device 900 or a display screen associated with the wearable electronic device 100 forms a human-machine interface (HMI) where the level of display functionality can range from relatively simple (such as that associated with an e ink display) to comprehensive (such as that associated with larger computer systems).

Referring with particularity to FIG. 15A, authentication processes leading up to the authenticated state AS are shown. In one form, activities of the authentication processes include creating a worker profile with an access level, assigning a worker (such as service technician) to a particular wearable electronic device 100 and having the worker return the wearable electronic device 100 such that the worker is no longer associated with it.

Regarding the first activity of the authentication processes, in order to create a worker profile that will eventually determine a worker access level, the worker may in one form enter as a minimum his or her name along with other identifying information (for example, telephone number, employee status or other credentials, skill level, such as that which may be based on experience, training-based qualification or the like, as well as other data needed to perform the task to which he or she is being assigned, such as proof of identity or prior visits to the facility (if any). In one form, this entry of worker-specific identifying information may take place upon the worker entering the industrial, commercial or related enterprise or facility, such as through the kiosk 3900 of FIG. 12. In another form, such identifying information may be provided by the worker to a representative of the facility for subsequent entry into an appropriate database. In yet another form (such as where the industrial site is remotely located, such as a farm, mine, offshore oil platform or the like), the entry of such identifying information may take place through an internet-enabled device. In addition, the worker may provide answers in response to a questionnaire or the like (such as the nature of the service being contemplated) as a way to provide enhanced security or other evidence that proper facility procedures are being followed. Regardless of how the worker information is obtained, it can be entered into the facility administration portal 5000. The facility administration portal 5000, along with its connection to the servers 400, cloud 500 and other parts of the backhaul, provides database and services to support the various authentication processes disclosed herein. In one form, the worker access level determines the types of locations (including, for example, which HPEs 3000 that are selected from numerous HPEs 3000 within the facility) that a worker is permitted (that is to say, allowed) to access, where the guidelines for such determination of are made by policies and procedures (that is to say, the governance) established the management of the industrial setting or related facility. A facility representative adds the worker's access level into the facility administration portal 5000 where in one form such level may be determined via algorithm that uses some of the data provided by the worker and the facility's governance. As previously noted, storage of such credentials and device registration may take place in computer-readable media, including that situated within the facility administration portal 5000 or other parts of the backhaul, as well as at the edge on the wearable electronic device 100. As previously noted, in one form the association of a particular worker to a particular wearable device 100 may be done through an authentication procedure upon entry of the corresponding user data, such as through the kiosk 3900 of FIG. 12. By way of example, entry of the corresponding user data into the facility administration portal 5000 may be configured as a menu-drive webpage where the user may enter specific demographic or related personal identifying data that can be used to establish the necessary credentials.

Regarding the second activity of the authentication processes, upon approval of the worker for a particular access level, the worker is provided with a particular one of the available wearable electronic devices 100 each of which has been registered with a UUID, ID token or other device identifier information that is unique to that particular wearable electronic device 100 at which time this association between the worker and the wearable electronic device 100 is entered into the facility administration portal 5000. Depending on the previously-mentioned form factor of the wearable electronic device 100 (which is presently shown in a watch-like banded configuration), the worker places the wearable electronic device 100 on his or her wrist, thereby becoming wearer W at which time the wearable electronic device 100 senses the connectivity through one or more of its on-band sensors S that are depicted in FIG. 2. At this time, the wearer W is authenticated. This association is meant to last for the duration of the service call or other activities that are related with the visit. In one form, the ability of the wearable electronic device 100 to sense local forms of data directly from the wearer W may be used to provide an additional measure of security against inadvertent or unauthorized access to the HPE 3000. For example, if after the wearer W were to remove or lose the wearable electronic device 100, it can sense such loss and send a warning through one or both of the LPWAN LP sub-network and the internet protocol IP sub-network to the facility administration portal 5000 for reporting and possible subsequent action. In one form under such a circumstance, the wearable electronic device 100 may be configured to be proactive as well, such as by suspending any further ability to secure access until such time as reattachment or related connectivity is reestablished. In such case, the wearable electronic device 100 may also transmit a signal to be used as the access state instruction, particularly a control signal sent to the locking mechanism 3210 for access-granting or access-denying purposes. In a variation on this use case, additional security may be ensured in situations where the wearer W has an escort, such as that of a supervisor or the like that is accompanying trainees, apprentices or the like. In another form, safe zones may be set up so that the communication network 4000 monitors for entry or exit from designated restricted areas. In this case, one of the previously-mentioned geofences G may be set up by the wearable electronic device 100 and the PAN P in order to define such restricted area or areas. In still another form, security may be enhanced by including the ability to verify safe content delivery where the communication network 4000 delivers technical content or documentation to the wearer W. In addition, mobile SMS messages may be used to send reports 800, such as to dashboards 700 or displays 900 either of which may be in the form of or mobile telephone or laptop webpages or the other HMI devices discussed herein to ensure data delivery to interested personnel such as in the facility administration portal 5000. Likewise, augmented reality (AR) devices such as Google Glass or the like may be used by the wearer W or other interested individuals, such as to display one or more of the sensor readings being acquired in the HPE 3000.

Regarding the third activity of the authentication processes, once the wearer W has completed his or her assigned task (or tasks) and has removed and returned the wearable electronic device 100 (such as to the facility representative), a disassociation of the two may take place within the facility administration portal 5000 where identifying information (including date and time of return) is entered, such as to the same database where the identifying information was initially recorded upon entry to the facility by the worker.

Referring with particularity to FIG. 15B, authorization processes leading up to the authorized state ZS are shown. In one form, activities of the authorization processes include wearable electronic device 100 logic while the wearer W is in the facility and providing request-based access control to the HPE 3000.

Regarding the first activity of the authorization processes, once the worker profile and access level from the first activity of the authentication process has been established and the worker is now wearing the wearable electronic device 100 (and is now categorized as the wearer W), the wearable electronic device 100 commences scanning for beacons or beacon-like data transmitters (such as from a controller 3500 or other signally-compatible device within the HPE 3000) and HPEs 3000 that are present within the facility. As noted elsewhere, such signal compatibility may be in the form of BLE, WiFi, RFID, NFC or related short-range functionality of the first wireless communication sub-module 175A. Meanwhile, the wearer W is entering a request such as through pushing a button or related activation switch on the wearable electronic device 100. Regarding the beacons, they broadcast their identity (including UUIDs, ID tokens or the like) and in so doing may behave as a peripheral node in a manner similar to the aforementioned peripheral nodes 200. Moreover, the broadcasting of beacon data may be used for the determination of distance such as through RSSI and RSSI-related data. Significantly, the devices that are configured to function as a beacon can be physical or virtual where such distinction may be context- or configuration-dependent that in either form possesses node-based communication functionality. Depending on the density of beacons within a particular location, the wearable electronic device 100 may receive more than one beacon at which time it may filter for a particular beacon based on uniquely identifying information or the like. In one form, upon obtaining multiple signals, the wearable electronic device 100 may process the three most relevant, such as by proximity (which in one form may vary based on numerous signal propagation factors within the local environment and which is indicative of the necessary proximity, such as through RSSI, triangulation, trilateration, multilateration or other known distance and location-determining approaches) and transmit such beacon data over the LPWAN LP sub-network to the gateway 300 and then through the internet protocol IP (the latter over MQTT or other IoT messaging transport protocol as part of a gateway-to-network-server communication) sub-network to the facility administration portal 5000, cloud 500 or other part of the backhaul. As previously noted, the UUID or related ID tokens being broadcast may be through a short-range protocol (using BLE, WiFi, RFID, NFC or the like). In a related way, it is noted that in one form, session protocols such as the MQTT, as well as others such as AMQP, may be implemented to allow the wearable electronic device 100 to publish and subscribe without having to keep track of each of the devices, such as through a wearable electronic device 100 SDK, including for both persistent and non-persistent connectivity.

In a similar way, the wearable electronic device 100 is scanning for an HPE 3000 to see which one or ones are deemed to be within a proximity threshold. A threshold corresponding to such state may be context-dependent based on numerous factors such as how crowded the local electromagnetic environment is, relative closeness of the HPE 3000 to other similar or different equipment, relative number of other service technicians in the vicinity, the local signal propagation properties within the facility or the like. If no such detection was made, the wearable electronic device 100 repeats the request, such as at a pre-set time interval. Contrarily, upon detecting an HPE 3000 that is within the threshold, the wearable electronic device 100 conveys the access request to the backhaul. In one form, when the wearable electronic device 100 is requesting access, security or trust may be enhanced through access control of using tokens, certification or encryption such a Diffe-Helman key exchange or other symmetric or asymmetric encryption approaches. Once the access request has been initiated by the wearer W, the wearable electronic device 100 starts to scan for any HPE 3000 in a manner similar to that previously discussed related to when the wearable electronic device 100 is scanning for beacons. In one form, both the scanning and the access request may have a temporal component such that if the wearer W and the wearable electronic device 100 were to move away from the HPE 3000 (for example, if the wearer W is merely passing by the HPE 3000 on the way to another destination), such request may be rescinded, such as by building in a suitable time delay into the logic.

Regarding the second activity of the authorization processes, now that the access request for a particular HPE 3000 and identification information (now in one form including date and time stamps) for a particular wearable electronic device 100 has been conveyed by the communication network 4000 to the backhaul, the worker identification information that was previously entered during the authentication process may be checked by the facility administration portal 5000 in order to compare the access level of the worker (now wearer W) against the access level of the particular HPE 3000. It will be appreciated that different access levels or classes of each HPE 3000 within the facility's inventory may be stored in a database and depend on the complexity, hazard level or perceived skill level required such that more restrictive classes are only available to those with sufficiently high skill levels, experience or other related metric all of which may be determined and coordinated as part of the aforementioned authentication process. In one form, the database may exist either algorithmically or as a lookup table that correlates the complexity, voltage level, potential hazards or other metric related to the HPE 3000 or the various components or pieces of equipment therein. If the access level of the wearer W is equal to or greater than that required by the particular HPE 3000, then access is granted. This in turn means that the wearer W is now authorized for that particular HPE. Contrarily, if the access level of the wearer W is less than that required by the HPE 3000, then access is denied. Regardless of the outcome of the access request, at this stage, the facility administration portal 5000 or other part of the backhaul sends a corresponding notification to both the wearable electronic device 100 and the HPE 3000 the latter of which will be used for logic in the HPE 3000 and the pre-entry test process as discussed in conjunction with FIG. 15C. In the situation where access has been granted and the notification has been sent to and received by the wearable electronic device 100 for display or other reporting, the wearable electronic device 100 may then commence advertising its own beacon for receipt by one or more nearby HPEs 3000. In the situation where access has been denied and the notification has been sent to and received by the wearable electronic device 100 for display or other reporting, except now the wearable electronic device 100 does not advertise its own beacon.

In one particular-example, the confined space 3010 of FIG. 13 may be a room, such as a boiler or reactor room with a naval vessel. In one scenario, work therein may be permitted to do so only if the temperature of the room is under a certain temperature (for example, 80 degrees Fahrenheit). Temperature sensors in the boiler room could use the short-range connectivity between the sensor and the wearable electronic device 100 within the PAN P to perform a temperature check before engaging in the authorization processes of FIG. 15B. In another example, the PAN P could also be used when some combination of workers (including those where the various workers may have different access levels) may need to be in a particular place in order for the access control of the second of the authorization processes to occur. Such a situation may exist where multiple types of workers are needed to perform a particular repair within the HPEs 3000. In such a case, the source node wearable electronic device 100 of the PAN P may search for other wearable electronic devices 100 act to determine if an access request may take place.

Referring with particularity to FIG. 15C, various test-based processes leading up to the sensor state SS are shown. In one form, activities of the sensing processes include HPE 3000 logic related (such as related to the status of the door 3200) and the pre-entry tests. Regarding the first activity of the sensing processes, the HPE 3000 is (among other things) advertising its own beacon, sensing the door state (through door sensor 3220) and waiting for pre-entry test results, in addition to receiving the granting or denying of the access request from the access control portion of the authorization processes of FIG. 15B. In the event that access has been granted, the HPE 3000 stops sending its advertising beacon and instead starts scanning for the wearer W. In one form, this use of a conditional beacon as a part of the conditional unlocking or locking of the HPE 3000 may be used as part of an enhanced security protocol. Regarding the second activity, the pre-entry test is conducted where various activities related to wearer W preparation (such as donning the PPE) and the habitability of the HPE 3000. As discussed elsewhere, such habitability may be related to sensed values of atmospheric conditions, temperature conditions, lighting conditions, the presence of operating machinery or the like. Outputs related to various sensor sensors $S_1, S_2, S_3 \ldots S_n$ or end nodes 200 readings may be transmitted to various places, such as to the wearable electronic device 100 being worn by the wearer W, to the backhaul or elsewhere. These values may be compared against required or known standards (such as the atmospheric safety standards shown, but applicable to other location, environmental, activity, physiological or other parameters of interest as well). As can be seen, in situations where the sensed data falls outside an acceptable range for the one or more parameters of interest, the pre-entry test will fail. This in turn will be provided as input to the process depicted in FIG. 16B.

Relatedly, at least some of the software, firmware and other instructions that form the basis for interfacing and communicating between any one of the wearable electronic device 100, PAN P or controller 3500 and remote locations such as in the servers 400, cloud 500, or kiosk 3900 of FIG. 12 or portal may be stored or executed at such remote locations or on the wearable electronic device 100. As shown, the facility administration portal 5000 represents a specific example of such a remote location, particularly for the purpose of performing administrative, managerial or related oversight functions for the warehousing of acquired data as well as the various back-and-forth communication with the wearable electronic device 100 within the communication network 4000.

Figure 16A:
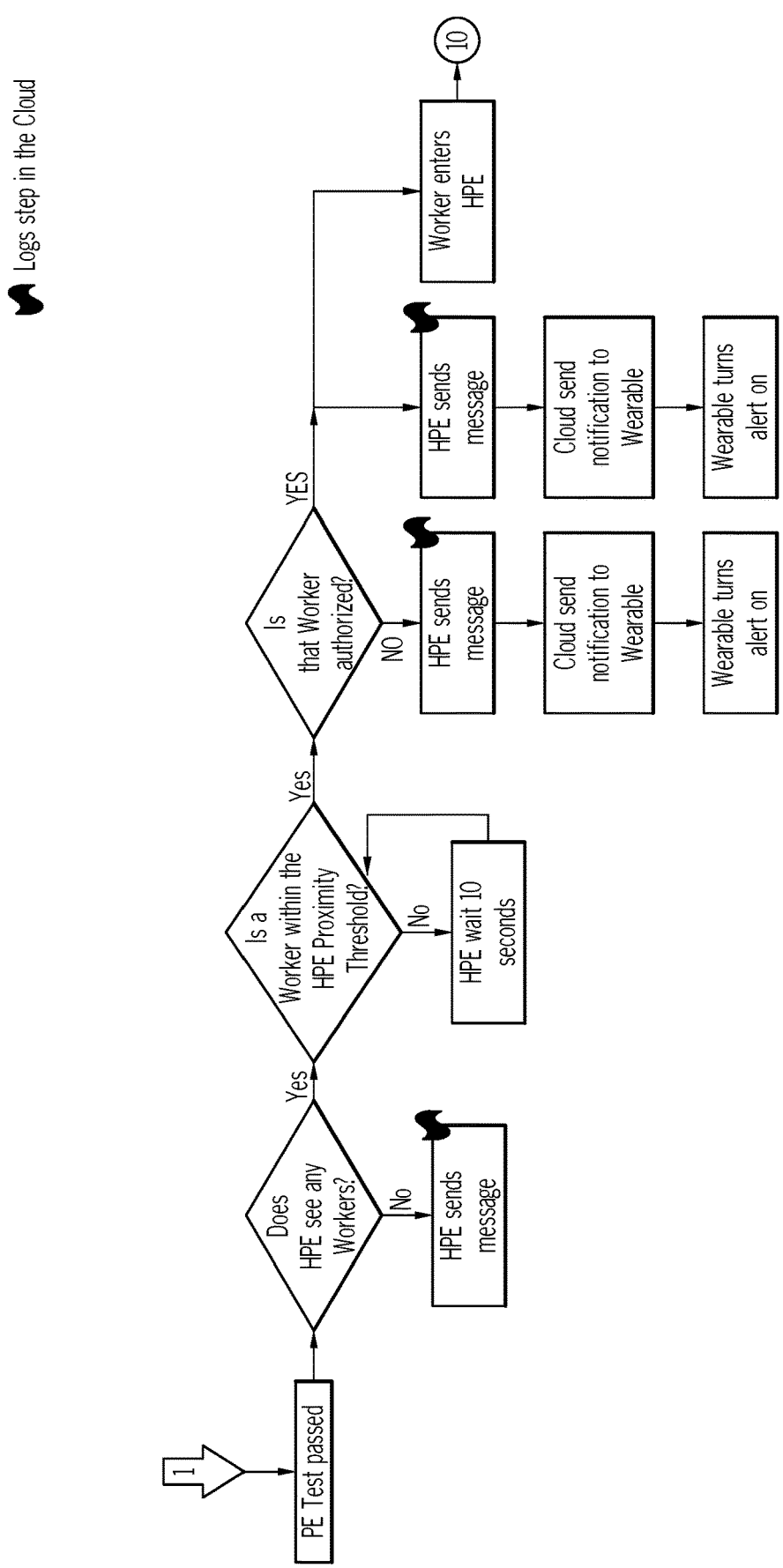
FIGS. 16A and 16B depict a program structure in the form of a flowchart to determine if a worker who is using the communication network of FIG. 12 and who has gone through the processes of FIGS. 15A through 15C will be permitted to gain access to the hazard-prone environment under numerous scenarios.
Figure 16B:
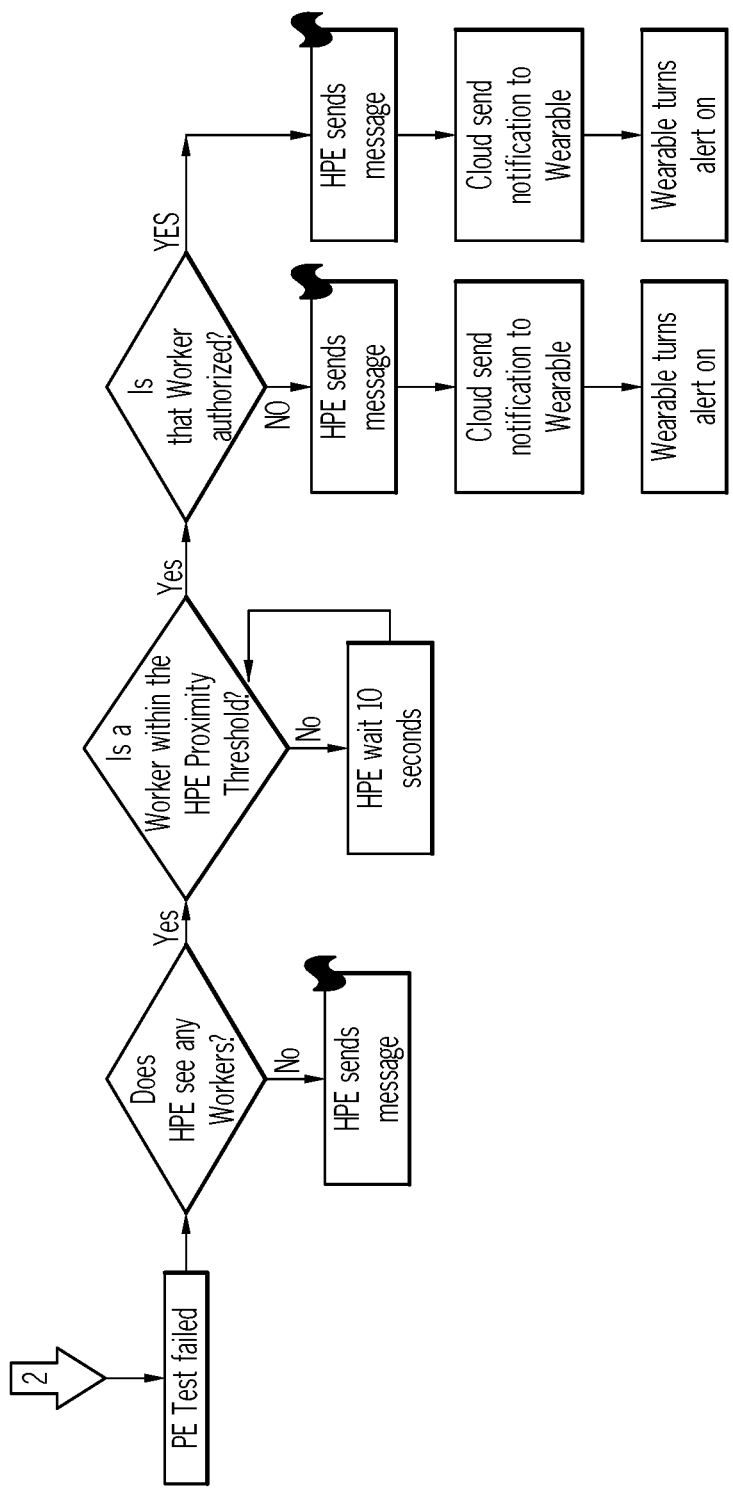
Figure 17:
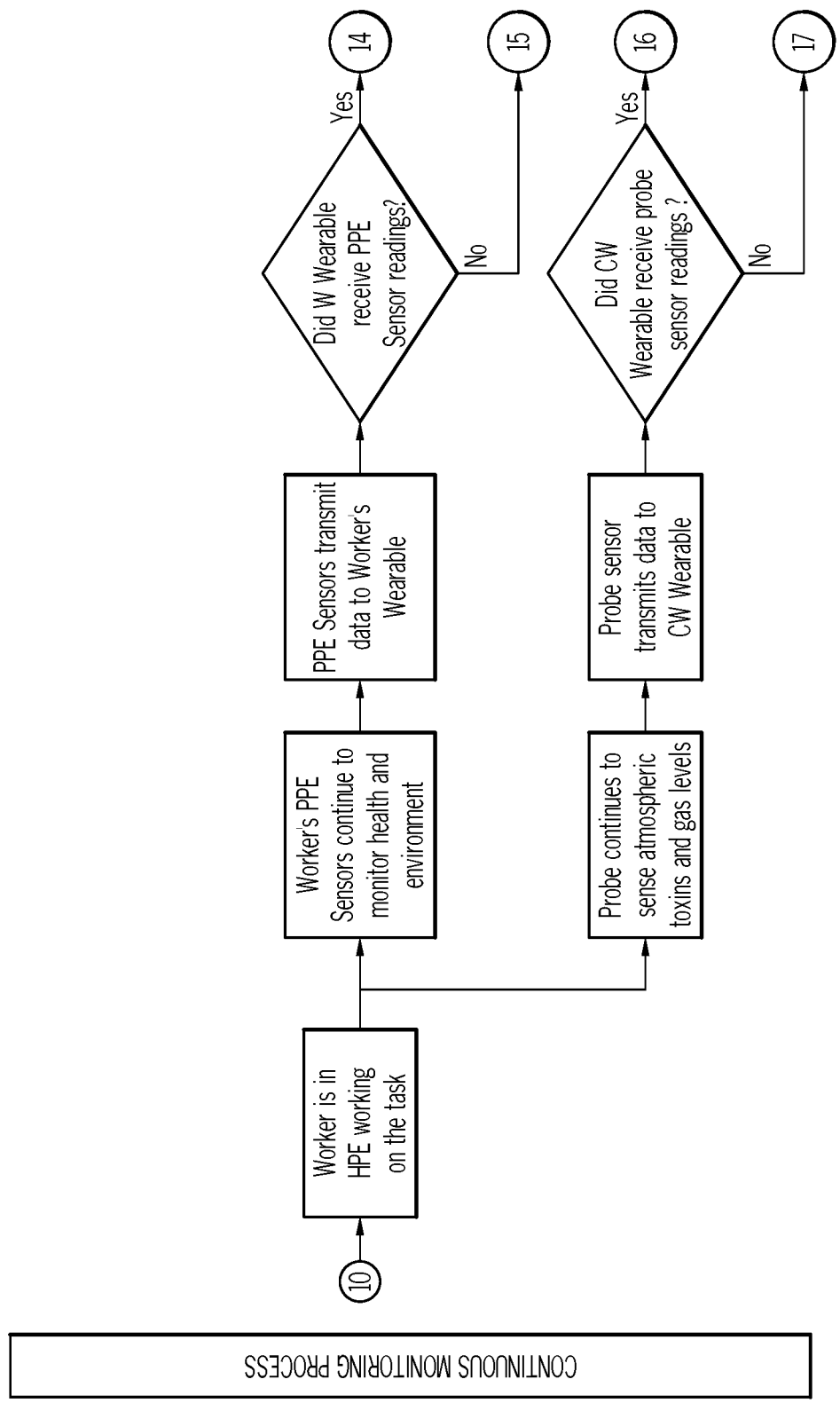
FIG. 17 depicts a program structure in the form of a flowchart to determine if a worker who has gained access to the hazard-prone environment is being continuously monitored under numerous scenarios.
Figure 17:
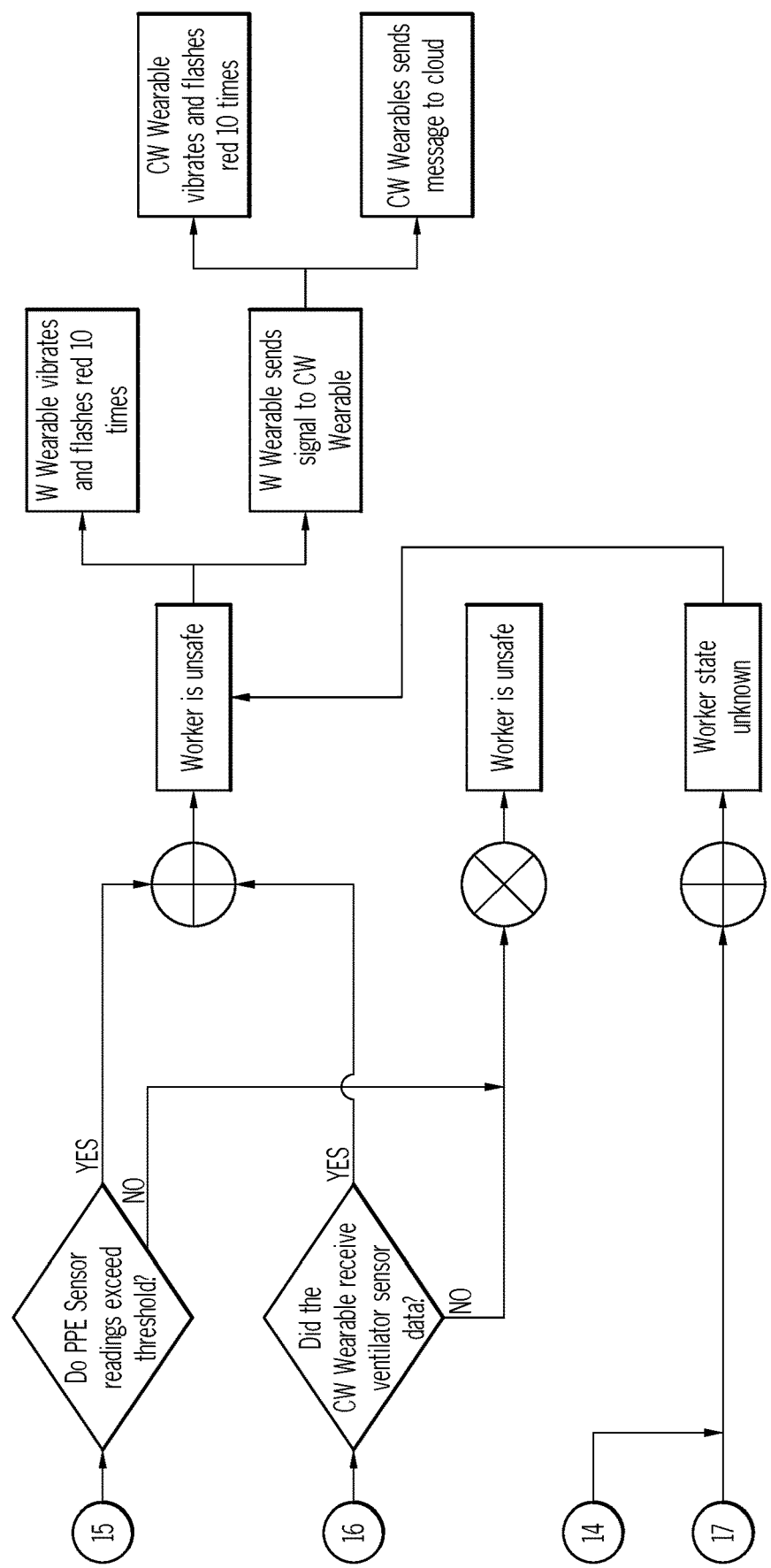

Referring next to FIGS. 16A and 16B, a program structure is shown in the form of a flow diagram of a sequence of events of how a user may be permitted to gain access to the HPE 3000. It will be appreciated that in the implementation shown in FIGS. 16A and 16B, as well as that depicted in FIGS. 15A through 15C that lead up to these figures, answering the conditional inquiries is not necessarily a set of serial decisions, but rather a series of concurrent processes, where the states and the actions taken based on the states may be grouped into various sets or operational scenarios that represent situation-specific interactions between the wearer W and the HPE 3000. It will be understood that whether they are semantically described as having concurrent or overlapping attributes or not is not meant to place limitations on the claims, but rather to describe the various situation-specific interactions of the worker and the HPE 3000 through the communication network 4000 at a detailed level in order to make the present disclosure more readily understood. As will be discussed throughout the present disclosure, such processes may include registration of the wearable electronic device 100, entry of worker data, assignment of a worker access level, assignment of access level for the HPE 3000, association of the wearable electronic device 100 and worker such that the worker becomes the wearer W, determining if the wearer W is within a proximity threshold, determining if the wearer W gained access to the HPE 3000, conducting a series of tests related to pre-entry access criteria and determining if the tests passed, determining if the door 3200 been commanded to be opened, sensing whether the door 3200 is or is not opened, and ongoing determinations of whether the wearer W still within the proximity threshold, among others. It will be understood that the term "program structure" is meant to indicate that tangible structure may be made up of codes that in turn may be depicted visually as a flow diagram or related sequence that operates on a given data structure that itself may be in one form an organized list, array, tree or graph of collected data. This in turn is not meant to imply that any such flow-based activity as shown in the figures should be construed to correlate one-to-one with lines or related segments of program code, but rather that the use of machine code 173E imparts particular structure to the architectures of the processor 173A, logic device 173, PCB assembly 170 (all as shown in FIG. 2) and the wearable electronic device 100.

Although not shown, if after the access had been granted and the door 3200 opened by the unlocking command sent to the locking mechanism 3210 and further after work has already been initiated or completed, certain of the Boolean-based conditional inquiries are not met (such as door 3200 remaining open as reported by the door sensor 3220 after the wearer W were to move away such that the proximate state PS is in a condition incompatible with such continued access), such data may be logged as a way to allow actionable commands (such as an alert, warning or the like) to be issued to the wearer W or other interested personnel. In a related manner, other incoming signals being introduced into the communication network 4000 related to equipment malfunctions may be logged as a way to allow similar actionable commands.

As shown, different operational scenarios may be present. These scenarios are based on various situation-specific interactions between the wearer W and the HPE 3000 as a way to present corresponding conditional inquiries the answers of which, depending on the various states, form the basis for instructions to be used by the HPE 3000 or a controller associated therewith. These scenarios are shown in more detail FIGS. 15A through 17, as previously discussed.

As previously noted with regard to FIG. 12, the backhaul may be configured as a computer system to work either as a part of or in conjunction with the communication network 4000 as a way to selectively grant a user access to the HPE 3000. In so doing, data (such as that depicted in FIG. 14) that is collected through the various sensors may be stored in a database such that processor-based operations applied to such data may convert the data into message-based states representative of door and voltage conditions present within the HPE 3000 (as depicted in FIG. 15) and then transmitted over the communication network 4000 for automated action through various authentication, authorization and sensing processes (as depicted in FIGS. 16A through 16C) that are used to instruct the HPE 3000 to either grant or deny access to a requesting worker in response to various algorithmic conditional inquiries that present themselves as the worker interacts with the HPE 3000. The communication network 4000 is further configured to provide automated notification of such granting or denial to the backhaul, as well to the worker. Moreover, the communication network 4000 is configured to provide human-decipherable indicia of the access state of the HPE 3000 (as depicted in FIGS. 16A and 16B). In one form, the automated action through various authentication, authorization and sensing processes that are used to instruct various components associated with the hazard-prone environment to either grant or deny access to a requesting worker in response to various algorithmic conditional inquiries uses a mathematical model (such as a series of Boolean-based decision trees or the like) to convert the stored data into numerical values that upon aggregation in response to a particular (that is to say, situation-specific) interaction between the worker and the HPE 3000 may be correlated to one or more instructions being provided to the HPE 3000.

Figure 18:
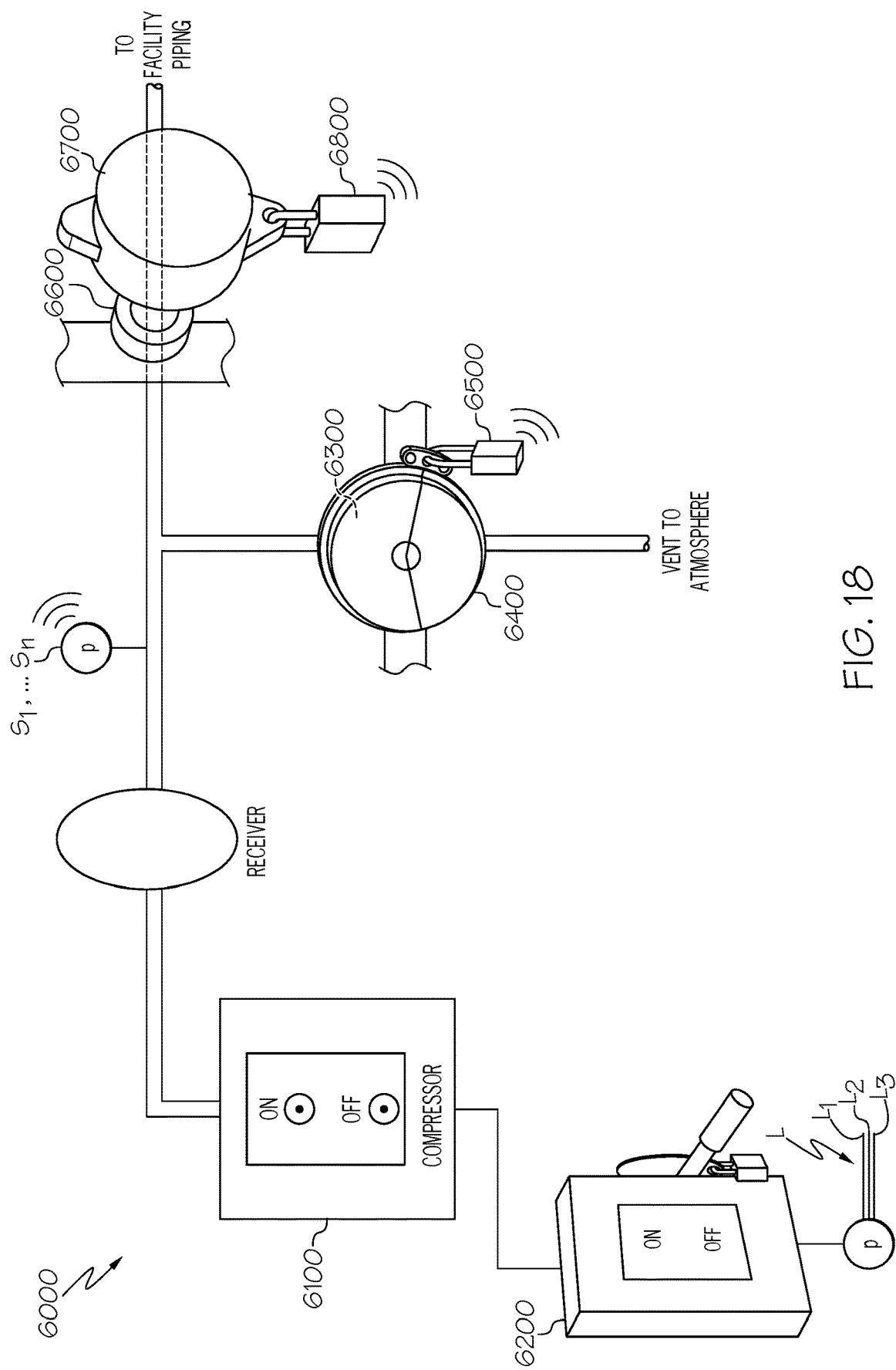
FIG. 18 depicts a representative lockout/tagout process using the communication network of FIG. 12.

Referring next to FIG. 18, as previously noted, the communication network 4000 disclosed herein may be used to help provide workers with the ability to isolate themselves from exposure to hazardous energy sources. By way of an example (not shown, whether with or independent of the confined spaces example), the communication network 4000 formed by the wearable electronic device 100 is particularly advantageous in situations involving other components, such as locking out or tagging out components in what is referred to herein as a lockout/tagout procedure an example of which is shown in the form of a fluid-handling environment 6000. In this and other examples, the ability to inspect or work on the tagged components may proceed in a manner analogous to that of the access to the confined space 3010. In such case, the OSHA standard for the control of hazardous energy (lockout/tagout, as noted in 29 CFR 1910.147), covers the servicing and maintenance of machines and establishes minimum performance requirements for equipment in which their unexpected energization or startup, as well as the release of stored energy from hazardous energy sources (whether electrical, mechanical, hydraulic, pneumatic, chemical, thermal, gravitational and other the like), could cause injury to employees. Regarding some of these industries, in general, OSHA requires that all employers have a lockout/tagout program to protect workers from injuries caused by the unexpected startup or release of energy. More particularly, in the construction industry, the Construction Safety Association of Ontario (CSAO) requires that all employers have a lockout/tagout program to protect workers from injuries caused by the unexpected startup or release of energy. Likewise, in the manufacturing industry, the National Fire Protection Association (NFPA) requires that all employers have a lockout/tagout program to protect workers from injuries caused by the unexpected startup or release of energy. Furthermore, in the healthcare industry, JCAHO requires that all employers have a lockout/tagout program to protect workers from injuries caused by the unexpected startup or release of energy. Moreover, in the mining industry, MSHA requires that all employers have a lockout/tagout program to protect workers from injuries caused by the unexpected startup or release of energy. In the particular case of electrical hazards, the applicable regulations are different and may be found in the OSHA standard pursuant to 29 CFR 1910.333, including those for lockout/tagout.

It is understood that lockout includes the placement of a lockout device on an energy isolating device, in accordance with an established procedure, ensuring that the energy isolating device and the equipment being controlled cannot be operated until the lockout device is removed. In one form, the lockout device utilizes a positive means such as a lock (for example, either a key or combination type) to hold an energy isolating device in a safe position and prevent the energizing of an associated machine or related piece of equipment. Examples include blank flanges and bolted slip blinds. In other forms, the lockout device can be a wireless lock, a padlock with a hasp or related mechanism, and be lockable through known means such as key, combination, cypher or the like that can be commanded to open or close through a controller-based wireless communication instruction. In addition, these devices may contain sensors or may use independent sensors to wirelessly communicate the open or closed state of the lock.

Tagging out (also referred to herein as tagout) includes the placement of a tagout device on an energy isolating device, in accordance with an established procedure, to indicate that the energy isolating device and the equipment being controlled may not be operated until the tagout device is removed. In one form, the tagout device is a prominent warning device, such as a tag and a means of attachment, which can be securely fastened to an energy isolating device in accordance with an established procedure, to indicate that the energy isolating device and the equipment being controlled may not be operated until the tagout device is removed.

Safety states associated with lockout/tagout procedures may be reported wirelessly from various sensors that are associated with the various assets being monitored. For example, for electrical assets, current or voltage sensors may be used, while for mechanical assets, rotation sensors, vibration sensors, air flow sensors, light curtains, laser scanners, vision systems or the like may be used. Relatedly, assets employing hydraulics may use pressure sensors, while those with pneumatics may use pressure sensors, valve state sensors or the like. Furthermore, chemical-based assets may use gas sensors, fluid-flow sensors or other detectors that can sense the presence of liquid or vapor (one example of which is discussed in the confined space of FIG. 13), while thermal-based assets and processes may include temperature sensors. It will be appreciated that the foregoing list is representative rather than exhaustive, and that other assets and their associated use of sensors within industrial and related settings are deemed to be within the scope of the present disclosure.

As previously discussed, various industries (such as the CPI or various others) use lockout/tagout procedures the help ensure worker safety. For example, in a manufacturing setting, lockout/tagout procedures may be used when maintenance or repairs are being performed on machinery. For example, if a worker needs to replace a broken part on a machine, he or she would first lock out the machine to ensure that it cannot be started while the work is being performed. Tagging the machine provides an indication that it is not to be used until the repair is complete, after which the tag may be removed. Likewise, in a construction setting, lockout/tagout procedures may be used when work is being performed on electrical equipment. For example, if an electrician is working on a circuit breaker, he or she would first lock out the breaker to ensure that it cannot be turned on while the work is being performed. Tagging the breaker provides an indication that it is not to be used until the repair is complete, after which the tag may be removed. Furthermore, in a mining setting, lockout/tagout procedures may be used when work is being performed on equipment such as conveyor belts or crushers. For example, if a worker needs to perform maintenance on a conveyor belt, he or she would first lock out the power source to the conveyor belt, and then tag the conveyor belt to indicate that it is not to be used until the repair is complete, after which the worker would remove the lock and tag from the conveyor belt. Moreover, in an oil and gas setting, lockout/tagout procedures may be used when work is being performed on equipment such as pumps or valves. For example, if a worker needs to perform maintenance on a pump, he or she would first shut off the power supply to the pump and then tag the pump to indicate that it is not to be used until the repair is complete, after which the worker would remove the lock and tag from the pump. In the healthcare industry, lockout/tagout procedures are typically used when working with medical equipment. For example, if a worker is going to be servicing a piece of medical equipment, he or she will first lockout the equipment, which prevents it from being turned on while the worker is working on it. The equipment is then tagged to warn others that the equipment is locked out and should not be turned on. Relatedly, in the food service industry, lockout/tagout procedures are typically used when working with food preparation equipment. For example, if a worker is going to be cleaning a food preparation machine, the worker will first lockout the machine, which prevents it from being turned on while the worker is working on it. The worker will then tag the machine to warn others that the machine is locked out and should not be turned on.

Within the context of the present disclosure, the authorization state ZS that has been determined by the processes of FIG. 15B may be used to identify workers and related individuals who are authorized to lockout a particular machine or piece of equipment using the communication network 4000. In one form, a lockout/tagout procedure (which may be adapted from the aforementioned OSHA 1910.147) may be used as part of an HPE 3000 energy control system. This procedure may take place through a series of steps.

In a first step, the authorized individual identifies the one or more energy sources that corresponds to the HPE 3000, understands the hazards of such energy source or sources and the method or methods used to control the energy before using a given procedure. In one form, software-based products may be lockout/tagout-specific such that it is used to provide structured approaches to the collection, organizing and displaying or printing of the application specific procedures and the being acquired. The communication network 4000 may be made to interface with such systems in order to share the relevant information. In one form, the lockout/tagout software may be part of that used for system administration or management and as such stored in the backhaul.

In a second step, all workers or related individuals that could be affected (including employees, contractors or the like) must be notified that the machine or equipment associated with the HPE 3000 is to be shut down and locked out for service or maintenance. Notification will be made to all workers or related individuals who may enter or be working in the area where the lockout is to be initiated. The communication network 4000 may be the means for notification of all the affected parties, as well as optionally include the requirement that all such affected individuals need to confirm receipt of such notification, such as through the inclusion of their own wearable electronic device 100. In one form, the confirmation may be sent through the wearable electronic device 100 directly, while in another to have the potentially affected individuals through the kiosk 3900 of FIG. 12, or yet in another through a test message sent from the backhaul to their mobile devices (such as a mobile phone) such that they then send an acknowledgment text prior to the announcement of an "all clear" message (such as through a text) goes out.

In a third step, the machinery or equipment associated with the HPE 3000 must be shut down using the normal stopping procedure as identified by suitable instructions, such as those provided by the equipment manufacturer.

In a fourth step, the machinery or equipment must be completely isolated from its energy source or sources. In particular, isolation items within the HPE 3000 (such as valves, process piping blinds, circuit breakers or power switchgears) may be locked out, such as through the short-range protocol associated with the PAN P and its cooperation with a locking mechanism such as that shown in conjunction with FIG. 13.

In a fifth step, each individual (such as wearer W) who will be performing work on the machine or equipment must use an individual lock on an energy isolating device. In one form, the communication network 4000 may use a data base and analysis means for verifying that all locks have been removed before informing affected parties that the process item has been returned to a survive mode. In one form, the lock may be placed manually by the individual doing the work, while in another, it can be implemented automatically through the communication network 4000 in a manner similar to controlling the locking mechanism 3210 of FIG. 13.

In a sixth step, if any residual or stored energy is present, it must be released or controlled. The sensors $S_1$, $S_2$, $S_3$ . . . $S_n$ or end nodes 200 within the communication network 4000 may be used to verify that the corresponding environment is safe. In one form, running state indicators of various parameters of interest (such as rotation of motors, local amperage values associated with motor- or actuator-driven machinery, pressures, temperatures, liquid-containing tanks liquids have been drained (such as through level sensors)) may be monitored for suitable indicia, such as whether the corresponding parameter is within an acceptable range or value. As noted elsewhere, this information can come from these local sensors with the PAN P, as well as from a traditional industrial automation operation such as supervisory control and data acquisition (SCADA) system that can be made to report information to the backhaul that in turn may report the information to a controller (such as the controller 3500 of FIG. 13) or to the wearable electronic device 100 that is associated with the co-worker CW.

In a seventh step, it must be verified that all energy sources are isolated in advance of attempting to start the machine or piece of equipment that is locked out. In addition, it must be ensured all start controls are returned to their "off" or "neutral" position.

In an eighth step (for electrically energized equipment), a qualified person must use electrical testing equipment on the load side of the equipment being locked out to verify there is no electrical energy present. In one form, an absence of voltage tester (such as that provided by either the I-Gard Corporation of Mississauga, Ontario or Panduit Corporation of Tinley Park, Illinois) can provide this information, while in another a suitably-qualified technician can affirm that no such electrical energy is present and that the corresponding assessment has been completed. Details associated with such absence of voltage testers and related processes, such as that which is delineated in the National Fire Protection Association's (NFPA's) Standard NFPA70E and in SIL 3 per IEC 61508-1, is described U.S. Pat. Nos. 11,215,646 and 11,162,983, as well as Published US Application 2022/0299547.

Likewise, when releasing the HPE 3000 from a lockout/tagout condition, numerous reverse steps are implemented in order to return the machinery or equipment to its normal operating condition. For example, in a first step, the machine or equipment and the immediate area are checked to make certain that all nonessential items (such as tools, materials or the like) have been removed and that the machine or equipment is ready to be energized. This further includes ensuring that all guards have been replaced, including interlocks if so equipped. In a second step, all individuals must be safely positioned away from the machine or equipment. In addition, in the third step, it must be verified that the controls are in their "neutral" or "off" position. In the fourth step, the lockout devices are removed, and the machine or equipment is re-energized. In the fifth step, all affected individuals are alerted that the servicing or maintenance has been completed and the machine or equipment is ready for use.

In one form, the use of both proximate state PS sensors (such as those associated with the aforementioned short-range wireless connectivity protocols) and the aforementioned authorization procedure may be combined to establish a safe environment free from energy release hazards or related unsafe state. It will be understood that there may be combinations of states that result in an unresolved overall safety state, and that in such situations an authorized representative of the facility (such as the facility representative, safety engineering team, third-party subject matter expert consultant or the like) may help to define appropriate warning or caution levels or thresholds that can be conveyed through the means disclosed herein. As previously discussed, threshold-exceeding events are those with corresponding measurable data the quantities of which can trigger a system response. Parameters of interest are those measurable quantities associated with the hazard-prone environment and contained within the acquired data that exceed these thresholds and as such are outside of a permissible range. Within the present context, threshold-exceeding measurements are those that are either too high or too low, depending on the parameter being measured. In addition, means for comparing the measured quantity may be done either algorithmically or by comparison to known quantities or standards, such as those stored in a lookup table, memory or like structure. The parameters of interest may include directly acquired sensor data (such as time, temperature, pressure, electrical current or voltage, gas readings or the like) as well as derived data (such as understanding the health of the wearer W based on the direct readings or other indicia, the condition of the atmosphere inside the confined space 3010, projected remaining permissible time in or around the HPE 3000 or the like). By the operation of the communication network 4000, such information may be conveyed to interested personnel in remote locations, such as a safety manager, emergency response teams or the like. Such remote personnel may be located adjacent (but outside) of the confined space 3010 or related HPE 3000, elsewhere within the facility, or even at another (off-site) location.

In the particular example shown in FIG. 18 in conjunction with FIG. 12, the communication network 4000 may be configured to monitor and control the fluid-handling that is presently shown as a compressed air-handling environment 6000. The compressed air-handling environment 6000 has a compressor 6100 that receives electrical power from an electrical circuit L (shown presently as an alternating current (AC) circuit with three-phase wiring in the form of individual lines L1, L2 and L3) through a safety switch 6200. Typically, the compressor 6100 also includes its own on/off buttons which activate relays in an electrical circuit to start or stop the compressor 6100 during general operational use. In the event that maintenance is required and a lock out tagout process is initiated, compressor 6100 operation would first be halted by pressing the "off" button. Upon operation, the compressor 6100 pressurizes air, where a fluidly-coupled receiver may act as a compressed gas storage device. One or more sensors S1, S2, S3 . . . Sn (shown presently as a pressure sensor) may be used to monitor the pressure in the compressed air circuit that through a series of valves 6300, 6600 may further route the pressurized air or to other equipment via the facility piping or to a pipe circuit for venting to atmosphere in the event the compressed air piping circuit needs to be depressurized prior to performing maintenance, equipment replacement or the like. While it is understood that compressor 6100 is used in this instance to compress air, a suitably-designed variant may be used with myriad different gases within an industrial setting (where all such uses and variants are deemed to be within the scope of the present disclosure). Alternatively, a pump (not shown) may replace the compressor 6100 to pressurize and pump liquids, and in this instance the receiver may be eliminated or replaced with a more complex pressurized liquid storage vessel. In one form, such a liquid-handling environment based on the embodiment of FIG. 18 or a variant thereof may be used in an automated car wash system where high-pressure water, detergent, wax or other materials are being dispensed. Although not shown, it will be understood that other equipment, such as additional pumps, or air compressors may be included in such a system. Similar fluid-handling equipment and related fluid handling systems used in other industries (such as those associated with oil & gas, CPI, distillation, food processing, power production or the like) may be similarly outfitted with the communication network 4000. Likewise, equipment used for controlling not just the electrical, but also the mechanical, hydraulic, pneumatic, chemical, thermal, and other hazardous energy sources within an HPE 3000 may be similarly implemented, and that all such industrial settings similarly situated are within the scope of the present disclosure.

In the system shown, the various pieces of equipment, by virtue of being pressurized, electrified or the like, is in need of lockout/tagout devices 6400, 6700 and associated locks 6500, 6800. As with the sensors S1, S2, S3 . . . Sn disclosed herein, in one form the lockout/tagout devices 6400, 6700 and associated locks 6500, 6800 may be outfitted with wireless signal functionality in order to communicate with the wearable electronic device 100, the PAN P or other parts of the communication network 4000. In such a configuration, the wearer W or other worker cannot approach the gaseous or liquid fluid-handling, environment 6000 (which is a form of HPE 3000) until all sources of hazardous energy have been locked out and reported to be in their safe state. In such scenario, the worker must be authenticated (such as through the processes delineated in FIG. 15A) and authorized (such as through the processes delineated in FIG. 15B) to conduct the requested maintenance duties. Although not shown, other devices such as motors (such as those used to drive rotating brushes, car conveyor lines, heaters, driers or the like) may make up a portion of the HPE 3000 that also can be disabled via lockout of their electrical or other energy supply.

In one particular example, the compressor 6100 may employ the communication network 4000 or portions thereof in order to ensure that pressurized fluid (for example, air or water) stored in the piping circuit, or in the case of compressed air, a receiver and portion of the fluid conduit has been isolated from the facility compressed air piping network and the receiver, as well as portions that may be vented to the atmosphere (such as through valve 6300). As shown, the valve 6600 that isolates the compressor 6100 discharge from the facility compressed air piping network is secured with its lockout/tagout device 6400 in the closed state, while the valve 6300 that vents the receiver vessel and compressor 6100 piping to atmosphere is secured with its lockout/tagout device 6700 in the in the open state. Prior to venting the receiver and system piping to atmosphere, the compressor 6100 is placed in the "off" state by its local switch. The electrical energy supply for the compressor 6100 is then isolated from it using the safety switch 6200 disconnect, including a feature that enables the use of a padlock (keyed or combination, not shown but in one form similar to locks 6500, 6800), to ensure that the safety switch 6200 remains in the "off" position. The one or more pressure sensors S1, S2, S3 . . . Sn is then monitored to assure that no high pressure fluid (such as air) is present and all of the sensors corresponding to the valves 6300, 6600 and the electrical power must be able to confirm that their corresponding devices are in the locked position prior to the wearer W commencing maintenance. As with the other HPE 3000 situations disclosed herein, the data corresponding to all of these states and actions may be stored in and acted upon by the wearable electronic device 100 or the backhaul.

In summary, the wearable electronic device 100 that forms the PAN P provides wireless signal connectivity and the ensuing communication network 4000 between a hazard-prone environment and administrative, managerial or related authority in the form of the facility administration portal 5000 within an industrial, commercial or related facility. In so doing, it participates in numerous data-informed determination processes as a way to satisfy a series of conditional inquiries that in turn enables a service technician or related user to gain access to such environment with an increased degree of confidence that the hazards attendant to normal operating conditions of the environment are not present at the time of access.

Although the present disclosure discusses the use of the LPWAN LP protocol with which to effect communication between the wearable electronic device 100 and the backhaul, it will be appreciated that in another form, an embodiment using instead either a narrowband internet of things (NB-IoT) or long term evolution machine type communication (LTE-M) is compatible with the communication network 4000 disclosed herein. Details associated such an embodiment may be found in US Published Application 2021/0319894 entitled WEARABLE ELECTRONIC DEVICE AND SYSTEM USING LOW POWER CELLULAR TELECOMMUNICATION PROTOCOLS that corresponds to pending U.S. patent application Ser. No. 17/223,231 that was filed on Apr. 6, 2021, is owned by the Assignee of the present disclosure and the entirety of which is incorporated herein by reference.

Within the present disclosure, the term "conditional inquiries" is used for semantic purposes only. As such, it will be appreciated that other inquiries or determinations, such as one or more determinations made by the wearable electronic device 100 or other suitably-configured equipment, may either form additional inquiries that are in addition to the ones listed or be subsumed into one or more of the same, and that all such variants of these inquiries are deemed to be within the scope of the present disclosure.

Within the present disclosure, while the precise term "Boolean" is understood as applying to variables with only two states, its extension through the use of the terms "Boolean-like", "Boolean-based" or the like is used to imply that there may (although not necessarily) exist variables that exist in more states. As such, in situations where a variable may have more than two states, such states may exist as part of a Boolean-based logic schema that may be indicated through decision-based flow charts or the like.

Within the first eleven figures of the present disclosure, the term "wearer" is meant to include a person, whether infected with a contagious disease or other known medical condition or not. In addition, the term may be applied to a person who is in need of health or location monitoring through the wearable electronic device 100, regardless of whether such person is or is not infected or at risk of becoming infected. Such other people may include those that are under the present care of a family member, doctor, nurse or other professional caregiver. In yet another form, the wearer may be a dog, cat, other pet, livestock or the like that may benefit from the geofencing capability discussed herein. Accordingly, the various terms used herein to identify the wearer of the wearable electronic device 100 as a "wearer", "person", "user", "individual", "worker" or "patient" are deemed to be equivalents within the present disclosure, and that any greater degree of specificity of such terms will be apparent from the context. As previously noted in conjunction with FIG. 12, such wearer W will be understood to refer to the service technician or related worker that intends on engaging with the hazard-prone environment as part of his or her inspection, repair, diagnostics or related official duties and has attained a suitable authentication state AS.

Within the present disclosure, it will be understood that the operations, functions, logical blocks, modules, circuits, and algorithm or model steps or events described may be implemented in hardware, software, firmware or any combination thereof. Moreover, if implemented in software, such operations may be stored on or transmitted over as one or more instructions or code on a computer-readable medium. The steps or events of a method, algorithm or ensuing model disclosed herein may be embodied in a processor-executable software module, which may reside on a tangible, non-transitory version of such computer-readable storage medium such that the medium be in any available form that permits access to the events or steps by a processor or related part of a computer. By way of example, and not limitation, such non-transitory computer-readable medium may comprise RAM, ROM, EEPROM, CD-ROM or other optical disk storage, magnetic disk storage or other magnetic storage devices, flash memory or any other form that may be used to store desired program code in the form of instructions or data structures and that may be accessed by a processor or related part of a computer. Combinations of these examples and their equivalents are also included within the scope of non-transitory computer-readable media discussed herein. Additionally, the operations of a method, algorithm or model may reside as one or any combination or set of codes or instructions on such tangible, non-transitory machine readable medium or computer-readable medium, which may be incorporated into a computer program product.

Within the present disclosure, terms such as "preferably", "generally" and "typically" are not utilized to limit the scope of the claims or to imply that certain features are critical, essential, or even important to the disclosed structures or functions. Rather, these terms are merely intended to highlight alternative or additional features that may or may not be utilized in a particular embodiment of the disclosed subject matter. Likewise, it is noted that the terms "substantially" and "approximately" and their variants are utilized to represent the inherent degree of uncertainty that may be attributed to any quantitative comparison, value, measurement or other representation. As such, use of these terms represents the degree by which a quantitative representation may vary from a stated reference without resulting in a change in the basic function of the subject matter at issue.

Within the present disclosure, the use of the prepositional phrase "at least one of" is deemed to be an open-ended expression that has both conjunctive and disjunctive attributes. For example, a claim that states "at least one of A, B and C" (where A, B and C are definite or indefinite articles that are the referents of the prepositional phrase) means A alone, B alone, C alone, A and B together, A and C together, B and C together, or A, B and C together. By way of example within the present disclosure, if a claim recites that data is being acquired from at least one of a first sensor, a second sensor and a third sensor, and if such data is being acquired from the first sensor alone, the second sensor alone, the third sensor alone or any combination of the first, second and third sensors, then such data acquisition satisfies the claim.

Within the present disclosure, certain terms are used to establish a degree of connectivity or related structural, physical, electrical, signal or other cooperation between various components, as well as between such components and users or wearers of the wearable electronic device. Such terms, such as "associated with" or the like, are understood to form an exclusive or non-exclusive relationship between the components or wearers to which they refer, and will be understood as one or the other, depending on the context.

Having described the subject matter of the present disclosure in detail and by reference to specific embodiments, it is noted that the various details disclosed herein should not be taken to imply that these details relate to elements that are essential components of the various described embodiments, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure may be identified as preferred or particularly advantageous, it is contemplated that the present disclosure is not necessarily limited to these aspects.

It will be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. A method of selectively granting a user to access to a hazard-prone environment, the method comprising:
    arranging a communication network to comprise a wearable electronic device such that upon use the wearable electronic device signally connects the hazard-prone environment to a backhaul over the communication network using:
        a short-range communication protocol between the hazard-prone environment and the wearable electronic device;
        a low power wide area network protocol between the wearable electronic device and a gateway; and
        an internet protocol between the gateway and the backhaul; and
    configuring the communication network to participate in a plurality of access-granting processes comprising:
        an authentication process where the user becomes associated with the wearable electronic device;
        an authorization process where the wearable electronic device sends an access request for the hazard-prone environment to the backhaul; and
        a sensing process that receives results from the authentication and authorization processes such that messages that are generated by the sensing process are combined in response to a series of situation-specific conditional inquiries to form an instruction that is used by the hazard-prone environment to selectively grant or deny the user access thereto.

2. The method of claim 1, wherein the authentication process comprises a plurality of activities comprising at least one of creating a profile with an access level for the user and assigning the wearable electronic device to the user.

3. The method of claim 1, wherein the authorization process comprises a plurality of activities comprising using the wearable electronic device to convey an access request signal to the backhaul and providing a determination to the hazard-prone environment of whether or not the user is authorized to gain access thereto.

4. The method of claim 1, wherein the sensing process comprises acquiring state data related to one or more components that make up the hazard-prone environment.

5. The method of claim 1, wherein the hazard-prone environment comprises a confined space with at least one covered access portal through which the user may pass, the covered access portal cooperative with a locking mechanism to selectively keep the covered access portal in either an open or closed state.

6. The method of claim 5, wherein the communication network instructs the locking mechanism to selectively lock or unlock the covered access port.

7. The method of claim 1, wherein the instruction that is used by the hazard-prone environment is further used to generate indicia of the access state to the user through the wearable electronic device.

8. The method of claim 1, wherein during operation the short-range communication protocol forms a dynamic geofence between the wearable electronic device and the hazard-prone environment.

9. The method of claim 1, wherein the backhaul comprises at least one of a facility administration portal, server and the cloud.

10. The method of claim 1, wherein the series of situation-specific conditional inquiries comprise Boolean-based conditional inquiries.

11. A communication network to selectively grant a user access to a hazard-prone environment within an industrial setting, the communication network comprising:
a source node configured to exchange data over a plurality of wireless communication protocols; and
a peripheral node situated within the industrial setting, wherein the source node and the peripheral node are signally cooperative with one another to create a plurality of sub-networks within the communication network, the plurality of sub-networks comprising:
a personal area network to communicate signals between the source node and the peripheral node using a short-range communication protocol; and
a low power wide area network to communicate signals between the source node and at least one gateway such that a signal received by the gateway from the peripheral node through the source node is conveyed to a backhaul by the gateway over an internet protocol network, whereupon the communication network participates in a plurality of access-granting processes comprising:
an authentication process where the user becomes associated with the source node;
an authorization process where the source node sends an access request for the hazard-prone environment to the backhaul; and
a sensing process that receives results from the authentication and authorization processes such that messages that are generated by the sensing process are combined in response to a series of situation-specific conditional inquiries to form an instruction that is used by the source node to selectively grant or deny the user access to the hazard-prone environment.

12. The communication network of claim 11, wherein the source node comprises a wearable electronic device.

13. The communication network of claim 12, wherein the instruction is formed on a computer system that is formed as a part of at least one of the wearable electronic device and the backhaul.

14. The communication network of claim 13, wherein the computer system is configured to aggregate the series of situation-specific conditional inquiries into a Boolean-based access state.

15. The communication network of claim 11, wherein the personal area sub-network comprises a Bluetooth Low Energy communication protocol.

16. The communication network of claim 11, wherein a dynamic geofence is formed between the source node and the peripheral node.

17. A communication network to selectively grant a user access to a confined space within an industrial setting, the communication network comprising:
a source node configured to exchange data over a plurality of wireless communication protocols; and
at least one peripheral node situated within the industrial setting, wherein the source node and the at least one peripheral node are signally cooperative with one another to create a plurality of sub-networks within the communication network, the plurality of sub-networks comprising:
a personal area network to communicate signals between the source node and the at least one peripheral node using a short-range communication protocol; and
a low power wide area network to communicate signals between the source node and at least one gateway such that a signal received by the gateway from the at least one peripheral node through the source node is conveyed to a backhaul by the gateway over an internet protocol network, whereupon the communication network participates in a plurality of access-granting processes comprising:
an authentication process where the user becomes associated with the source node;
an authorization process where the source node sends an access request for the confined space to the backhaul; and
a sensing process that receives results from the authentication and authorization processes such that messages that are generated by the sensing process are combined in response to a series of situation-specific conditional inquiries to form an instruction that is used by the source node to selectively grant or deny the user access to the confined space.

18. The communication network of claim 17, wherein the source node comprises a first wearable electronic device and the at least one peripheral node comprises at least one of an access portal, a hinged cover, a confined space ventilation sub-system, a handheld atmospheric gas meter and a second wearable electronic device.

19. The communication network of claim 18, wherein the wearable electronic device is configured as an edge-based platform.

* * * * *